US012223510B2

(12) United States Patent
Brinig et al.

(10) Patent No.: US 12,223,510 B2
(45) Date of Patent: *Feb. 11, 2025

(54) METHOD FOR RECOMMENDING AND IMPLEMENTING COMMUNICATION OPTIMIZATIONS

(71) Applicant: LitLingo Technologies, Inc., Austin, TX (US)

(72) Inventors: Kevin Brinig, Austin, TX (US); Todd Sifleet, Austin, TX (US); Torbjorn Loken, Seattle, WA (US)

(73) Assignee: LitLingo Technologies, Inc., Austin, TX (US)

( * ) Notice: Subject to any disclaimer, the term of this patent is extended or adjusted under 35 U.S.C. 154(b) by 667 days.

This patent is subject to a terminal disclaimer.

(21) Appl. No.: 17/363,223

(22) Filed: Jun. 30, 2021

(65) Prior Publication Data

US 2021/0390553 A1  Dec. 16, 2021

Related U.S. Application Data

(63) Continuation-in-part of application No. 16/906,439, filed on Jun. 19, 2020, now Pat. No. 11,853,701.
(Continued)

(51) Int. Cl.
*G06F 40/30* (2020.01)
*G06F 40/169* (2020.01)
(Continued)

(52) U.S. Cl.
CPC ......... *G06Q 30/016* (2013.01); *G06F 40/169* (2020.01); *G06F 40/253* (2020.01); *G06F 40/284* (2020.01); *G06F 40/30* (2020.01)

(58) Field of Classification Search
CPC ........ G06F 40/30; G06F 40/10; G06F 40/169; G06F 40/242; G06F 40/268;
(Continued)

(56) References Cited

U.S. PATENT DOCUMENTS 7,853,544 B2 * 12/2010 Scott ..................... G06F 16/353
706/45
9,128,906 B2   9/2015 Peters et al.
(Continued)

OTHER PUBLICATIONS

Non-final Office Action dated Mar. 2, 2023, in connection with U.S. Appl. No. 16/906,439, 17 pages.
(Continued)

*Primary Examiner* — Abdelali Serrou

(57) ABSTRACT

Examples disclosed herein relate to a system including: one or more processors and at least one memory device; the one or more processors may receive communication data and initiate a procedure to the received communication data to generate a machine representation of the received communication data, the one or more processors may utilize one or more idea mapping functions on the machine representation to generate one or more identifiers and one or more idea links for the machine representation, the one or more processors may generate an interpreted communication data based on the one or more idea links; and the one or more processors may transmit an initiation action signal based on the one or more idea links.

6 Claims, 36 Drawing Sheets

Related U.S. Application Data

(60) Provisional application No. 63/046,784, filed on Jul. 1, 2020, provisional application No. 62/865,238, filed on Jun. 23, 2019.

(51) Int. Cl.
  *G06F 40/253* (2020.01)
  *G06F 40/284* (2020.01)
  *G06Q 30/016* (2023.01)

(58) Field of Classification Search
  CPC .... G06F 40/289; G06F 40/279; G06F 40/284; G06F 40/253
  See application file for complete search history.

(56) References Cited

U.S. PATENT DOCUMENTS

| | | | |
|---|---|---|---|
| 10,547,574 B2 * | 1/2020 | Pham | G06F 3/04842 |
| 10,706,232 B2 * | 7/2020 | Parikh | G06F 40/205 |
| 11,062,700 B1 * | 7/2021 | Azimi | G10L 25/54 |
| 11,163,836 B2 | 11/2021 | Ray et al. | |
| 11,176,176 B2 | 11/2021 | Bordawekar et al. | |
| 11,269,929 B2 | 3/2022 | Spangler et al. | |
| 11,270,001 B2 * | 3/2022 | Shibahara | G06F 21/552 |
| 11,283,929 B2 * | 3/2022 | Edwards | G06F 11/3409 |
| 2015/0135053 A1 | 5/2015 | Doornenbal et al. | |
| 2016/0034260 A1 | 2/2016 | Ristock et al. | |
| 2016/0259778 A1 | 9/2016 | Cookson et al. | |
| 2016/0337295 A1 | 11/2016 | Bennett et al. | |
| 2016/0378742 A1 | 12/2016 | Doornenbal et al. | |
| 2017/0132815 A1 | 5/2017 | Peev et al. | |
| 2018/0176173 A1 | 6/2018 | Keysers et al. | |
| 2018/0196873 A1 | 7/2018 | Yerebakan et al. | |
| 2019/0079921 A1 * | 3/2019 | Terry | G06F 16/35 |
| 2019/0354544 A1 | 11/2019 | Hertz et al. | |
| 2020/0076538 A1 | 3/2020 | Soultan et al. | |

OTHER PUBLICATIONS

Notice of Allowance dated Aug. 9, 2023, in connection with U.S. Appl. No. 16/906,439, 9 pages.
Final Office Action dated Nov. 2, 2022, in connection with U.S. Appl. No. 16/906,439, 17 pages.
Non-Final Office Action dated Mar. 23, 2022, in connection with U.S. Appl. No. 16/906,439, 14 pages.

* cited by examiner

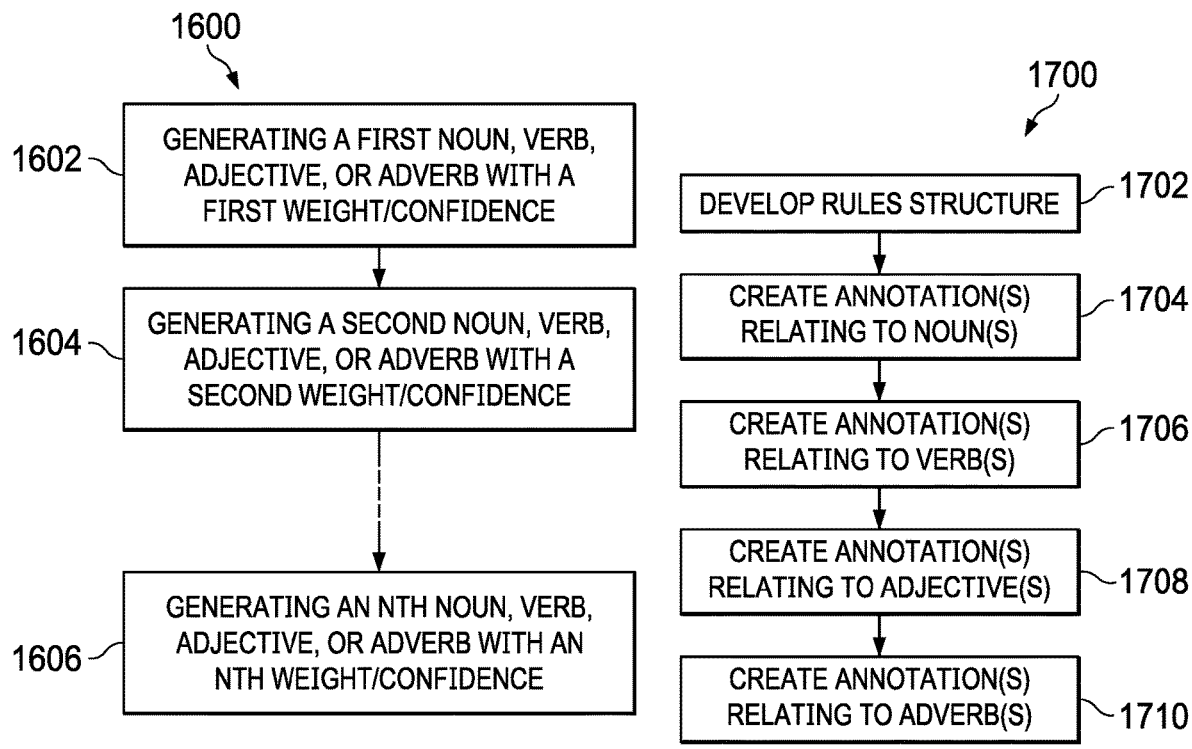
FIG. 16
FIG. 17
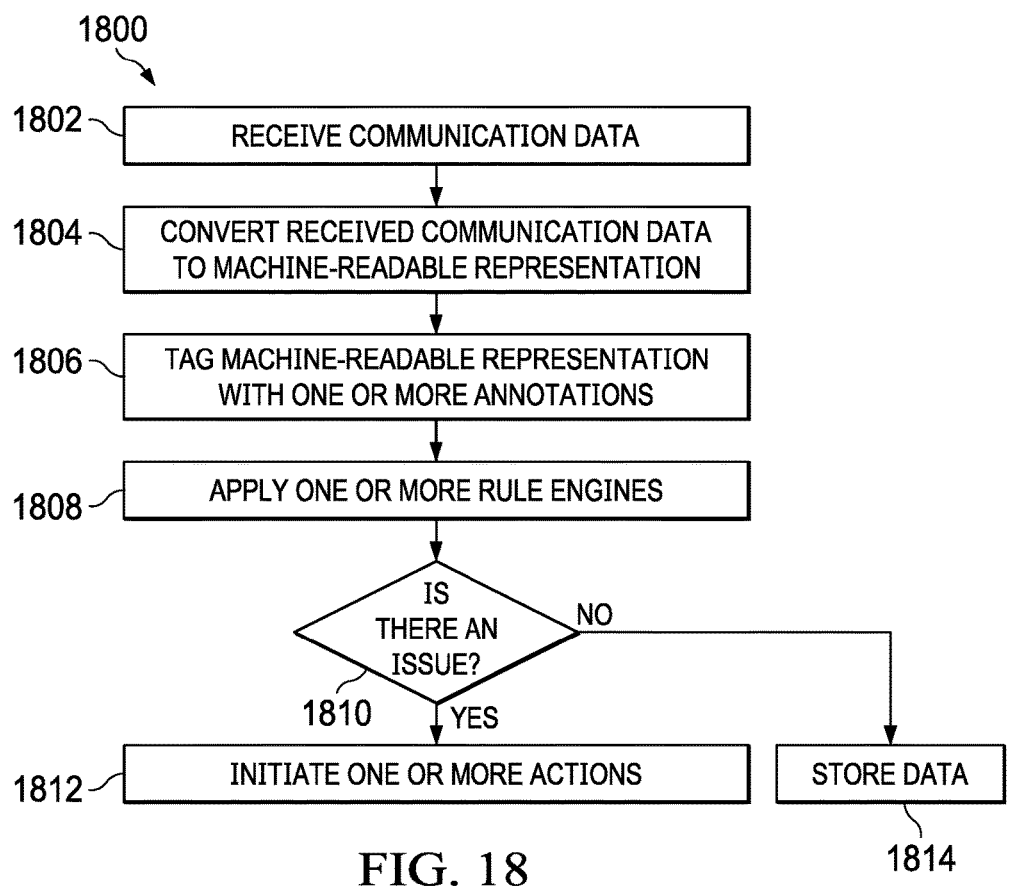
FIG. 18

METHOD FOR RECOMMENDING AND IMPLEMENTING COMMUNICATION OPTIMIZATIONS

REFERENCE

The present application claims priority to U.S. provisional patent application Ser. No. 63/046,784, entitled "Method for Recommending and Implementing Communication Optimizations", filed on Jul. 1, 2020 and claims priority to and is a continuation-in-part of U.S. patent application Ser. No. 16/906,439, entitled "Method for Recommending and Implementing Communication Optimizations", filed on Jun. 19, 2020, which claims priority to U.S. provisional patent application Ser. No. 62/865,238, entitled "Method for Recommending and Implementing Communication Optimizations", filed on Jun. 23, 2019, which are all incorporated in their entireties herein by reference.

FIELD

The subject matter disclosed herein relates to systems, devices, and/or methods to monitor, evaluate, manage, optimize, and/or control communication systems. More specifically, the systems, devices, and/or methods may utilize one or more tools (e.g., annotators, rules, campaigns, etc.) to monitor, evaluate, manage, optimize, and/or control communication systems.

INFORMATION

All industries have numerous ways to dispense information. These numerous ways include letters, emails, texts, chats, social media platforms (e.g., Facebook, etc.), phone calls, customer service phone calls, presentations, employee group platforms, customer platforms, websites, brochures, any other communication method, and/or any combination thereof. This disclosure highlights enhanced systems, devices, and/or methods to monitor, evaluate, manage, optimize, and/or control communication systems.

BRIEF DESCRIPTION OF THE FIGURES

Non-limiting and non-exhaustive examples will be described with reference to the following figures, wherein like reference numerals refer to like parts throughout the various figures.

FIGS. 9B-1 to 9B-3 is another illustration of a communication modeling, according to one embodiment.

FIG. 16 is another procedural flow chart, according to one embodiment.

FIG. 17 is another procedural flow chart, according to one embodiment.

FIG. 18 is another procedural flow chart, according to one embodiment.

DETAILED DESCRIPTION

Figure 1:
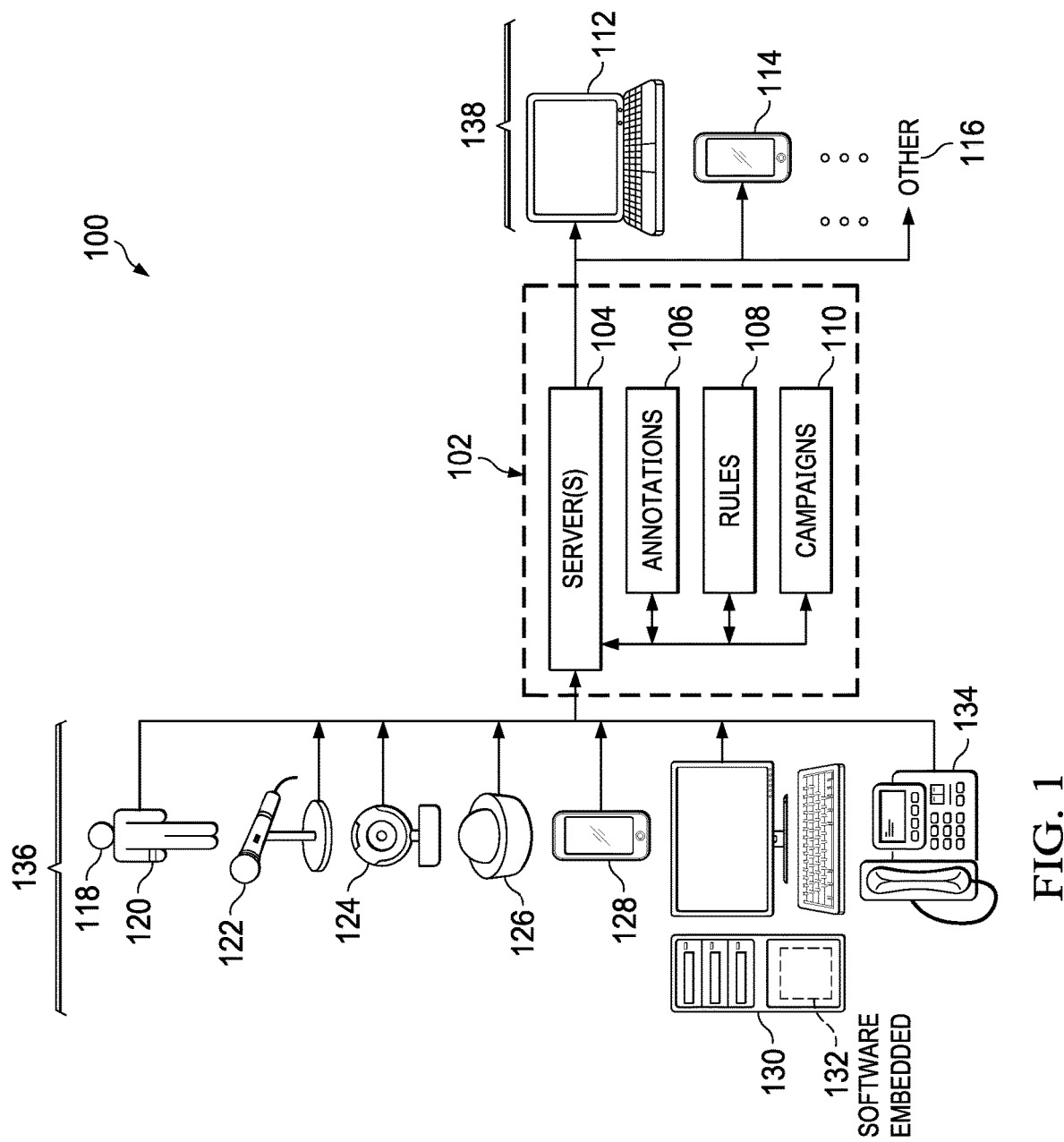
FIG. 1 is an illustration of a communication monitoring system, according to one embodiment.

In FIG. 1, an illustration of a communication monitoring environment 100 is shown, according to one embodiment. The communication monitoring environment 100 may include a communication monitoring system 102, input data sources 136, and/or output data sources 138. The communication monitoring system 102 may include one or more servers 104, one or more annotation systems 106 (and/or devices and/or modules, etc.), one or more rule engines 108, and/or one or more campaigns 110. The input data sources 136 may include one or more wearable devices 120 on a person 118, one or more microphones 122, one or more computer cameras 124, one or more cameras and/or sensors 126, one or more mobile devices 128, one or more computers 130 with and/or without embedded software 132, one or more phones 134 (e.g., landline phone, mobile, IP phone, etc.), and/or any other data source disclosed in this document and/or its equivalent. The output data sources 138 may include one or more computers 112, one or more mobile devices 114, and/or any other output data source disclosed in this document and/or its equivalent.

The communication monitoring system 102 may analyze numerous communication characteristics which include any characteristic(s) disclosed in this document and/or their equivalent. In various examples, communication factors may be a length of a missive, a length of a sentence(s), a length of a word(s), use of jargon, misspelling, incomplete sentences, tone, etc. For example, short, curt emails may be identifiers of sentiment of the sender and may also be evaluated against subsequent actions of the recipient to judge the effectiveness of the communication. In another example relating to tone, certain phrases and words or body language (via a camera) may be used to evaluate the tone of the communicator.

In addition, the communication monitoring system 102 may analyze biases (gender, inclusion, etc.), frequency of contacts (past contacts or the lack thereof), capitalization, syntax, and punctuation (or the lack thereof), keywords (presence or lack thereof), sentiment (certainty, vagueness, uncertainty, anger, happiness, excitement, anxiety, formality, etc.), topics (spread of topics, directness, presence of multiple topics), individual words, phrases, paragraphs, thoughts, or the entire document, specific type of email (command, request, informal, friendly, feedback, etc.), body language (speed of movement, sitting/standing, hand motions, etc.), and/or any other communication characteristic(s) disclosed in this document.

In addition, the communication monitoring system 102 may initiate and/or complete an effectiveness analysis. For example, context ingestion and communications may be evaluated for effectiveness. The specific type of communication (e.g., command, request, informal, friendly, feedback, etc.) can be analyzed to determine if subsequent action was taken by the recipient(s). This effectiveness scoring can be used to train further models or users.

In one example, a first project was completed by a first project team with a communication score of 90 in 10 weeks while a second project (similar to the first project) was completed by a second project team with a communication score of 70 in 20 weeks. In this example, the communication score for both the first project team and the second project team was based on one or more of biases (gender, inclusion, etc.), frequency of contacts (past contacts or the lack thereof), capitalization, syntax, and punctuation (or the lack thereof), keywords (presence or lack thereof), sentiment (certainty, vagueness, uncertainty, anger, happiness, excitement, anxiety, formality, etc.), topics (spread of topics, directness, presence of multiple topics), individual words, phrases, paragraphs, thoughts, or the entire document, specific type of email (command, request, informal, friendly, feedback, etc.), body language (speed of movement, sitting/standing, hand motions, etc.), and/or any other communication characteristic(s) disclosed in this document.

Figure 2:
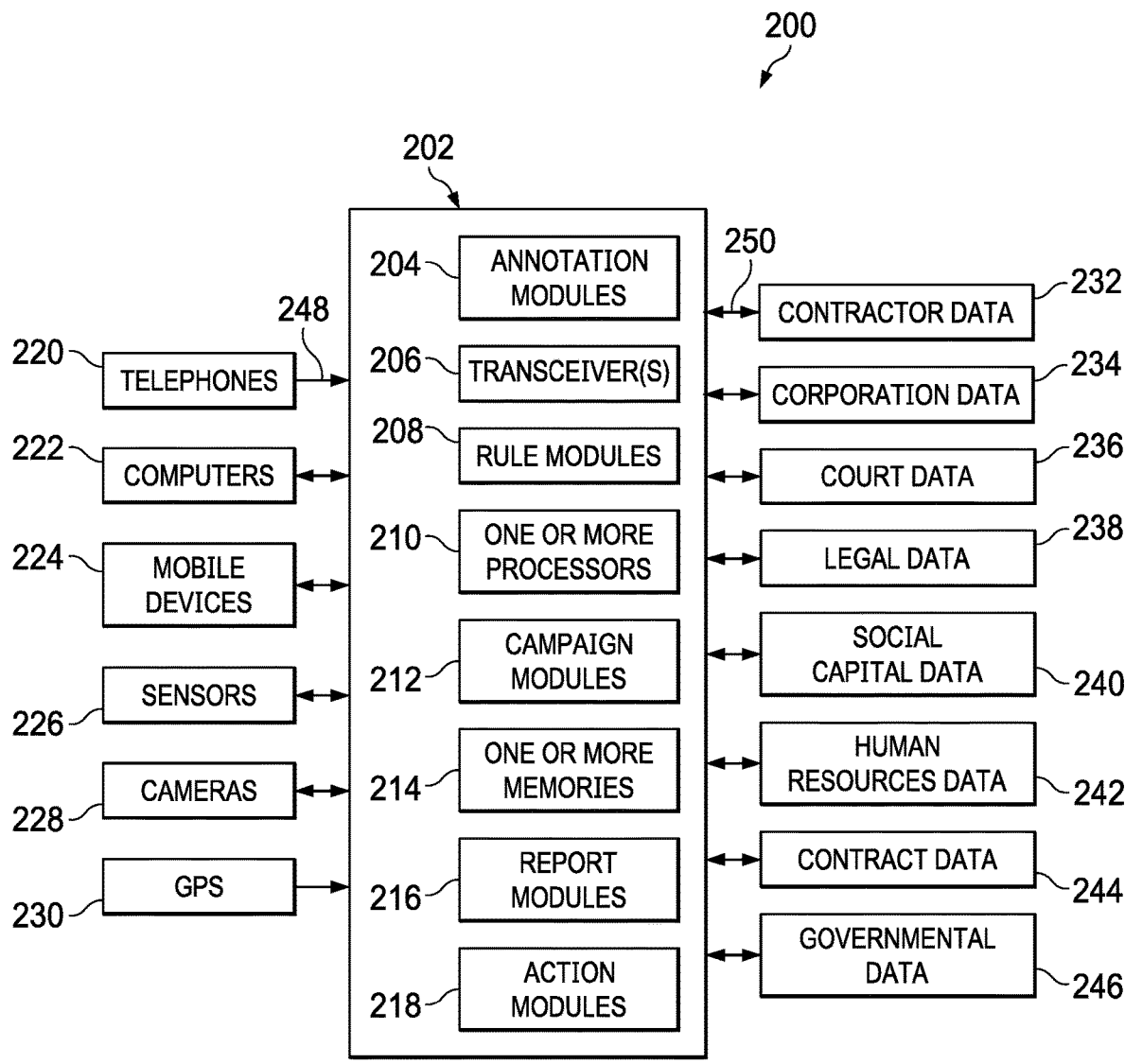
FIG. 2 is another illustration of a communication monitoring system, according to one embodiment.

In FIG. 2, a block diagram a communication monitoring environment 200 is shown, according to one embodiment. The communication monitoring environment 200 may include a communication monitoring system 202. The communication monitoring system 202 may include one or more annotation modules 204, one or more transceivers 206, one or more rule(s) modules 208, one or more processors 210, one or more campaign modules 212, one or more memories 214, one or more report modules 216, one or more action modules 218, and/or any other device, module, or functional feature disclosed in this document and/or its equivalent. The communication monitoring system 202 may receive and/or transmit data (via one or more communication links (e.g., a unidirectional link 248 and/or a bidirectional link 250)) to and/or from one or more telephones 220, one or more computers 222, one or more mobile devices 224, one or more sensors 226, one or more cameras 228, one or more GPS devices 230, one or more contractor data sources 232, one or more corporation data sources 234, one or more court data sources 236, one or more legal data sources 238, one or more social capital data sources 240, one or more human resources data sources 242, one or more contract data sources 244, one or more governmental data sources 246, and/or any other data source disclosed in this document and/or its equivalent.

The communication monitoring system 202 (and/or the communication monitoring system 102 and/or any other communication monitoring system disclosed in this document) may sit at the terminal layer (may also sit at browser application layer; may also sit at the server level). Note that any reference to a communication monitoring system, method, and/or device are interchangeable with any other reference to a communication monitoring system, method, and/or device—therefore, any and all elements are interchangeable in any disclosure. In addition, the communication monitoring system has organizational knowledge received from one or more data sources. The communication monitoring system may have personal knowledge of communicator(s) (composer, speaker, sender, initiator, etc.) and recipient(s). In addition, the communication monitoring system may know what application(s) the user is in when they are working. Further, various input sources could include multi-input mechanisms, microphone, video camera, keyboard, text to speech, any other device disclosed in this document, and/or any combination thereof. In addition, if a user is utilizing a text expanding software or copy and paste, this may be known to the system. The communication monitoring system may have data relating to the user capabilities, such as, lawyers or power users capabilities. In various examples, a person may be given one or more roles as a configuration user and/or a person may be given one or more roles as a user-user.

In addition, the communication monitoring system may apply to non-human generators of content as an overlay. Further, users can create specific campaigns. In addition, the communication monitoring system may complete a sentiment spell check (this is the interface—a way to describe how it works—underline specific terms, grade it holistically). Any and all communication types can be monitored by the communication monitoring system which include but are not limited to internal chats, external chats, emails, letters, external communications (e.g., Zendesk), text messages, and/or any other communication form disclosed in this document.

In one example, the communication monitoring system can utilize different organization(s) and sub-organization level(s) (e.g., level grading, lack of communications, etc.). In one example, if an individual has multiple organizations, the communication monitoring system can grade them against each other. As the communication monitoring system drills down, the communication monitoring system can grade organizations and sub-organizations. As the communication monitoring system drills down further, the communication monitoring system can attribute the sensitivity of grades to specific individuals that either have a contributive or dilutive effect on the organization's grade. The communication monitoring system can develop one or more plans to work with those people to fix the issue. In one example, Bob is a poor communicator (e.g., a communicator that could use training) because Bob's messages are infrequent, unclear, and lack focus. Whereas, Jill is a good communicator because Jill's messages are frequent, clear, and positive.

In another example, if the communication monitoring system utilizes multiple organizations and sub-organizations; the communication monitoring system can determine where communication is happening and where it is not happening. Programmatically identify organizations that aren't communicating effectively. It's equally valuable to quantify which organizations are communicating effectively (and why) and then benchmark against those. In addition, the communication monitoring system can overlay the performance evaluation system, pager duty, and/or github lines of code.

In addition, training integration can occur as part of real time alerts—can pop to the user to provide educational information. Based on our data, the training prescription changes based on the performance of a user. If Stacy is a poor performer and constantly messes up, she has to either take more training or a stricter training regimen. For example, Stacy was communicating to Bob but utilized words that made Bob sound like an employee instead of the contract work that he is. Stacy has a history of this problem; therefore, X happened to Stacy. Whereas, Reggie has communicate to numerous people like Bob and has never had a problem. If Reggie is really good at this communication stuff, he doesn't have to take a stricter training regimen and he can even be freed from the training in order to save valuable resources.

In one example relating to the question of do all genders have the same experience; the communication monitoring system can analyze the tonal trends of a communicator (composer, speaker, sender, initiator, etc.). For example, the system can evaluate the language used in communications used directed towards one group of individuals and compare that language to language used in communications directed towards one or more other groups of individuals. The system can alert the communicator (composer, speaker, sender, initiator, etc.) or another interested party to the results of this comparison. In one example, Mike's communications are analyzed by the system and Mike communicates to women differently than men. More specifically, Mike's emails to women seem to downplay their importance whereas Mike's emails to men are more encouraging. In this example (and all the examples in this disclosure), the communication monitoring system, device, and/or method may have specific examples to show why the results indicated that Mike communicated differently with one group versus another group. All examples in this disclosure that result in a conclusion may be supported by one or more data points which determine the result.

In one example relating to contract workers and employment litigation, an internal power users who may be assigned a role (e.g., an HR professional or a lawyer; this is an example of Power Users and role recognition) may be assigned elevated permissions based on client preference. This user may have the ability to define users and their subsequent treatment. For example, a lawyer at a company that has litigation risk in the employment/contractor world, might want to prevent the creation of documents by some or all of a list of users. The communication monitoring system may take an action based on the inputs from any number of input/ingestion mechanisms of the user (This is an example of multimodal input ingestion). The communication monitoring system may prevent the submission of words, phrases, or tonal language, etc. as defined by algorithms or pre-identified outputs of another process (This is an example of list ingestion, algorithmic output ingestion, or machine learning analysis). In short, if user A wants to write word B in an email to person X (or persons XYZ), the communication monitoring system may perform an action contrary to the typical expected action of input. If user A inputs input B in Application X using computer device Z, the communication monitoring system can perform any number of actions preventing, changing, and/or removing the input.

In another example relating to manufacturing defect speculation avoidance, when a company employs, contracts with, and/or communicates with 3rd parties, often these third parties will freely communicate in the normal course of business on personal and company managed devices. In the normal course of business there are often speculative statements made in those communications. The communication monitoring system can capture inputs and alter the way the computing device acts following the inputs. For example, the communication monitoring system may analyze the communication that states "We guarantee that this new design will work" and change (or recommend to change) the wording to "We should try the new design."

In an example relating to contractual performance or non-performance, an oil exploration company signs a lot of contracts to drill for mineral rights. The contracts tend to specify that a well must be capped if it is uneconomic. An employee recently learns about the concept of an "uneconomic well" and speculates that a performing well is actually uneconomic in a company email despite having no background or expertise in the area. The communication monitoring system can analyze the email during the process of composition, recognize a specific word (or phrase or sentiment) like the word "uneconomic" and within the context of the broader language (including the communicator or composer, speaker, sender, initiator, etc.'s information if necessary) and prevent the email from being sent or prevent the word (or phrase, or sentiment, etc.) from being included in the email.

In another example, the communication monitoring system may compare time periods with communication trends (e.g., has there been a precipitous drop in healthy communication). Having established baseline scoring levels for an organization, the system can evaluate those scores over time. This may allow interested parties to analyze changes over time. Further, the system has the ability to ingest external information for comparative purposes. The system can ingest information such as stock price, language used at earnings calls or corporate presentations, headcount growth rates, geographical expansion or contraction, etc. and overlay this information in a comparative manner to the language trends within the organization.

In one example relating to meeting performance, the communication monitoring system can detect the physical presence of individuals in the room or on the call. The communication monitoring system can then determine (or can know previously ingested information about the) voices or speech patterns of individuals present (regardless of language spoken). The system can also detect whether individuals are not present (whether expected or not). Further the system can detect when individuals arrive to the meeting. The system can analyze the respective communication "presence" of individuals and determine if there are outsized voices in the room whether from a volume perspective, or a count of words, speed of speech, or other speech patterns. This information can be evaluated based on known information about the meeting itself, about the parties present, etc. The system can make recommendations or conclusions about the quality of the meeting, length, fairness, etc. The system may also make recommendations via a connected internet device in real time, for example, if a specific individual is overbearing in a meeting as determined by the system, that user may be warned via a smartwatch or smart phone. The system may have pre-defined understanding of what "equality of voice" should pertain to a specific meeting. This information may be combined with other information to create a holistic picture to identify bullying, victimization, under-representation, etc.

In one example relating to body language, using a visual ingestion device and a sound ingestion device, the communication monitoring system can overlay visual and vocal information where one or more parties are communicating. The communication monitoring system can evaluate changes in volume, tone, pitch, and speed of speech in addition to changes in speed of movement, height or elevation of the speaker (relative to original position and relative to other parties), the position of body parts, etc. The system can score the communication with respect to the goals of the meeting or presentation. This score can be attributed to the meeting itself, individuals involved, meeting type, etc. This information can be stored and evaluated over time.

In one example relating to forced training, the system can have the ability to force users into training modules depending on recent performance, historical performance, and/or trends and changes in performance.

In one example relating to certainty identification, the system may determine whether language has a measure of certainty. The system may have the ability to quantify differing levels of certainty. Further, this scoring mechanism may be used to train algorithms or users to improve communication.

In one example relating to user identification, the system can identify multiple users via self-identification mechanisms and voice keyed user roles. The user's voice can be automatically identified as well from previous conversations or recordings and a user ID can be assigned based on first encounter. In one example, communications between a specialized user and a non-specialized user (e.g., doctor to patient, engineer to marketing, lawyer to client, etc.) can be verified via the user identification procedure.

In one example, the communication monitoring system may put the definition of a word in parentheses, identify when somebody is "speaking out of their league" or "above their pay grade"—like a podiatrist talking about heart cancer or a call center worker skipping 4 management levels to speak with a VP, and/or use a word cloud of each employee type and you can cluster their wording and determine how different certain people's words are from their peers.

In one example relating to location data, the system has the ability to capture individuals location in a room based on the vocal inputs received from a recording device. In one example relating to rules engine(s), the system may allow a user (or an algorithm) to create a multitude of scenarios or configurations that can apply different rules to a particular communication depending on the desired monitoring outcomes. The system may offer an interface for the human configuration of said rules. The rules may be applied based on a number of factors.

In one example relating to evaluating a composer, the communication monitoring system may evaluate the characteristics of a communicator (composer, speaker, communicator, initiator, etc.) or composer using one or more templates. Evaluating the contents of the document with respect to those templates and identifying disparity. In addition, the communication monitoring system may receive a verbal, visual, and/or electronic input from a device. (via a network). Further, the communication monitoring system may prevent outcomes and/or predict outcomes. In addition, the communication system may provide a timing optimization function and/or analysis. For example, the system may gather information about the communicator (composer, speaker, communicator, initiator, etc.) and the recipient and determine when the optimal time to send an email might be and may make recommendations of that sort. For example, a review of Michael's emails indicates that he is most productive from X period to Y period on day of the week Z. Therefore, important emails are sent at this time while less important emails are held until after this time. Recipient(s) productivity may also be evaluated and the system may recommend that a communication be tailored to maximize productivity.

In one example relating to gendered fields, utilizing historical gendered fields, or fields with other biases, the system may be able to make specific targeted recommendations. In one example relating to prisoner use-case, the communication monitoring system may black out inappropriate communications to and/or from prison. In one example relating to evaluating subsequent actions of recipient, the communication monitoring system may evaluate the subsequent actions of the recipient(s) to evaluate the effectiveness of a communication. This may be done in a number of ways including automated detection of actions (e.g., the creation of meetings or future responses indicating something has been "completed"). In another example relating to language evaluation, the communication monitoring system may have the ability to evaluate existing documents retroactively. This can include internal communications as well as external facing communications like documents. In another example, companies may post blog articles with improper use of words in association with independent contractors which the communication monitoring system may flag for review and/or automatically delete.

In various examples of training models, the communication monitoring system may have training relating to certainty, fairness, effectiveness, bullying, under-representation, sexual harassment, productivity, time of day/week to communicate, and/or any other training relating to any concept disclosed in this document.

The communication monitoring system may have inputs, input capture, and multimodal capture and/or combination of inputs. For example, the communication monitoring system may have the ability to ingest context from a mouse, keyboard, microphone, camera, or any other sensing/perception device. This may include heart rate monitors, accelerometers, speedometers, internet of things connected devices, other connected computing devices, GPS devices, Bluetooth devices, thermal cameras, lie detector machines, smart phones, SDKs, APIs, etc. This may be done device by device, in a bundled fashion, or multistream. Capture, ingestion, compute, and compare need not happen simultaneously.

In one example relating to role assignment and power users, the communication monitoring system can treat different users with different treatments. For example, a user may have elevated view or configure privileges relative to the typical user. Further, the configured system may have the ability to apply certain rules or treatments to individual users or groups of users on a treatment by treatment basis or a user by user basis or a session by session basis.

In another example, the communication monitoring system can accept inputs that are the outputs of other processes offline or in real time. Further, context ingestion or information ingestion may incorporate raw data or it may incorporate outputs of other computational processes. For example, the system may ingest a raw video feed or the system may ingest a video feed (or footage) that has been analyzed or tagged in an additional step. This is possible for all ingestion types.

The communication monitoring system may initiate action(s), alteration(s), deletion(s), prevention of inputs, and/or any other action disclosed in this document. The system is capable of altering, editing, deleting, creating, responding to, preventing the creation or transmission of, delaying, ingesting into future processes, saving, counting, storing for review, and/or storing information. Further, the system may implement any number of user interface elements to any individual or group of users based on those inputs in real time, retroactively, or prior to ingestion in a predictive fashion. Further, the communication monitoring system may include predictive recommendations based on user characteristics and/or actions may be intelligently performed based on the context of the communicator(s) or the recipient(s)/audience. In addition, the timing of actions may be based on additional context of the situation, sentiment, and/or context.

Figure 3:
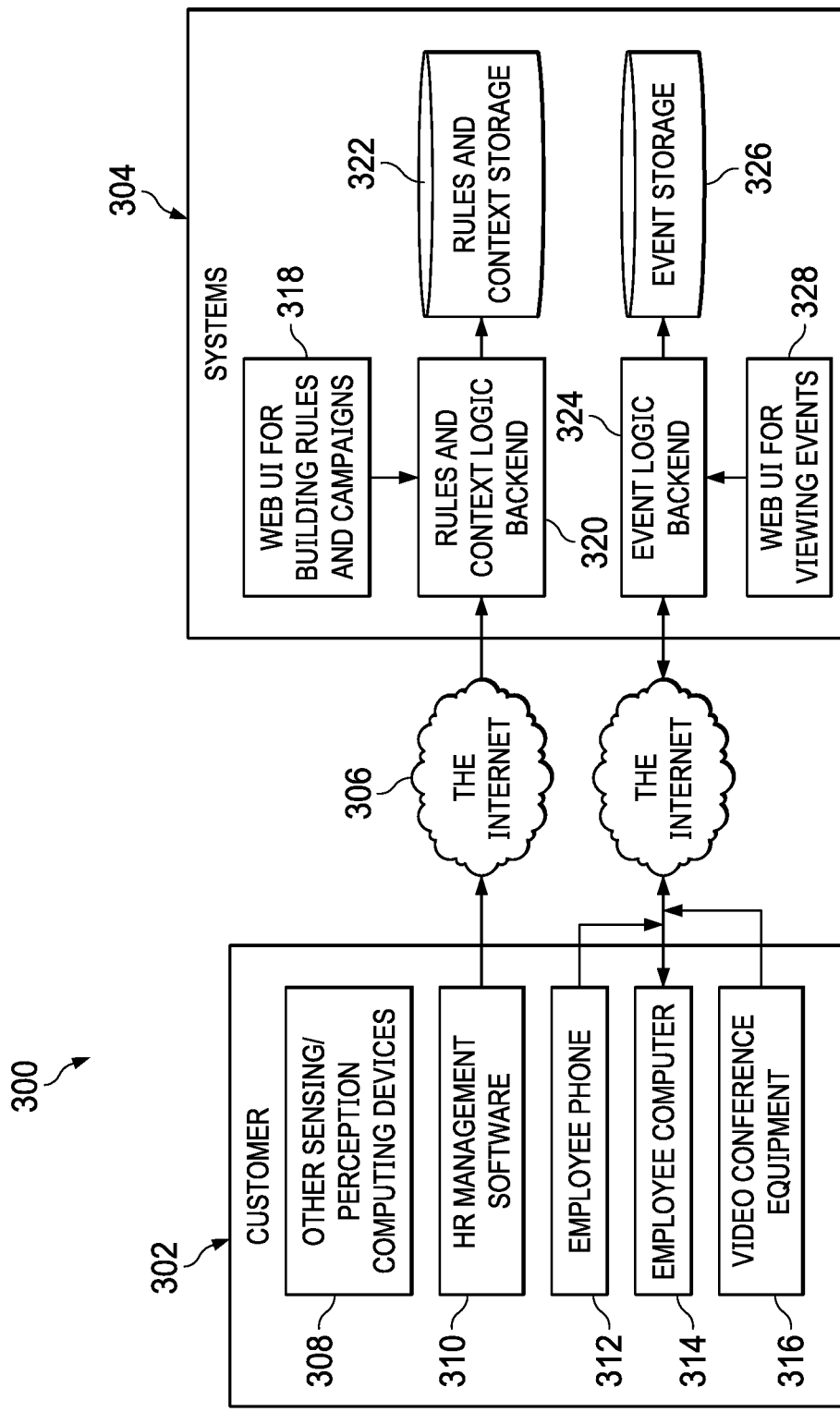
FIG. 3 is another illustration of a communication monitoring system, according to one embodiment.

In FIG. 3, an illustration of a communication monitoring environment 300 is shown, according to one embodiment. The communication monitoring environment 300 may include a customer side 302 and a communication monitoring side 304. The customer side 302 may include an other sensing/perception computing devices 308, a human resources management software 310, one or more employee phones 312, one or more employee computers 314, one or more video conference devices 316, and/or any other device disclosed in this document and/or its equivalent. The communication monitoring side 304 may include one or more web user interfaces for building rules and/or campaigns 318, one or more rules and context logic backends 320, one or more rules and context storage areas 322, one or more event logic backends 324, one or more event storage areas 326, one or more web user interfaces for viewing events 328, and/or any other device disclosed in this document and/or its equivalent. In addition, the communication monitoring side 304 and the customer side 302 may communicate via the Internet 306 and/or any other communication systems. In another example, the communication monitoring system can be integrated into the customer side 302.

Figure 4:
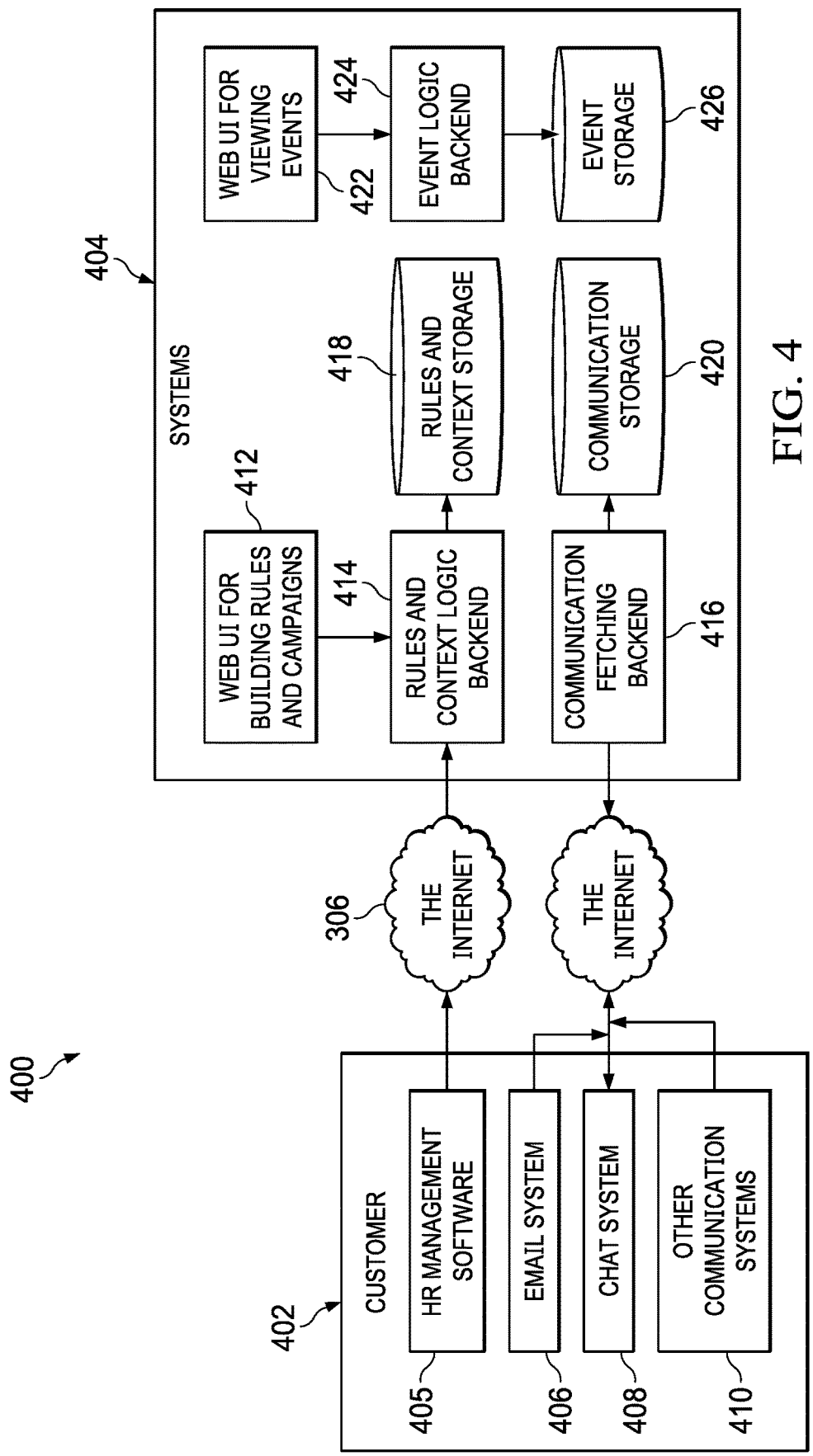
FIG. 4 is another illustration of a communication monitoring system, according to one embodiment.

In FIG. 4, an illustration of a communication monitoring environment 400 is shown, according to one embodiment. The communication monitoring environment 400 may include a customer side 402 and a communication monitoring side 404. The customer side 402 may include one or more human resources management softwares 405, one or more email systems 406, one or more chat system 408, one or more other communication systems 410, and/or any other communication system disclosed in this document and/or its equivalent. The communication monitoring side 404 may include one or more web user interface building rules and campaigns 412, one or more rules and context logic backends 414, one or more communication fetching backends 416, one or more rules and context storage areas 418, one or more communication storage areas 420, one or more web user interface for viewing events 422, one or more event logic backends 424, one or more storage areas 426, and/or any other device disclosed in this document and/or its equivalent. In addition, the customer side 402 and the communication monitoring side 404 may communicate via the Internet 306 and/or any other communication systems. In another example, the communication monitoring system can be integrated into the customer side 402.

Figure 5:
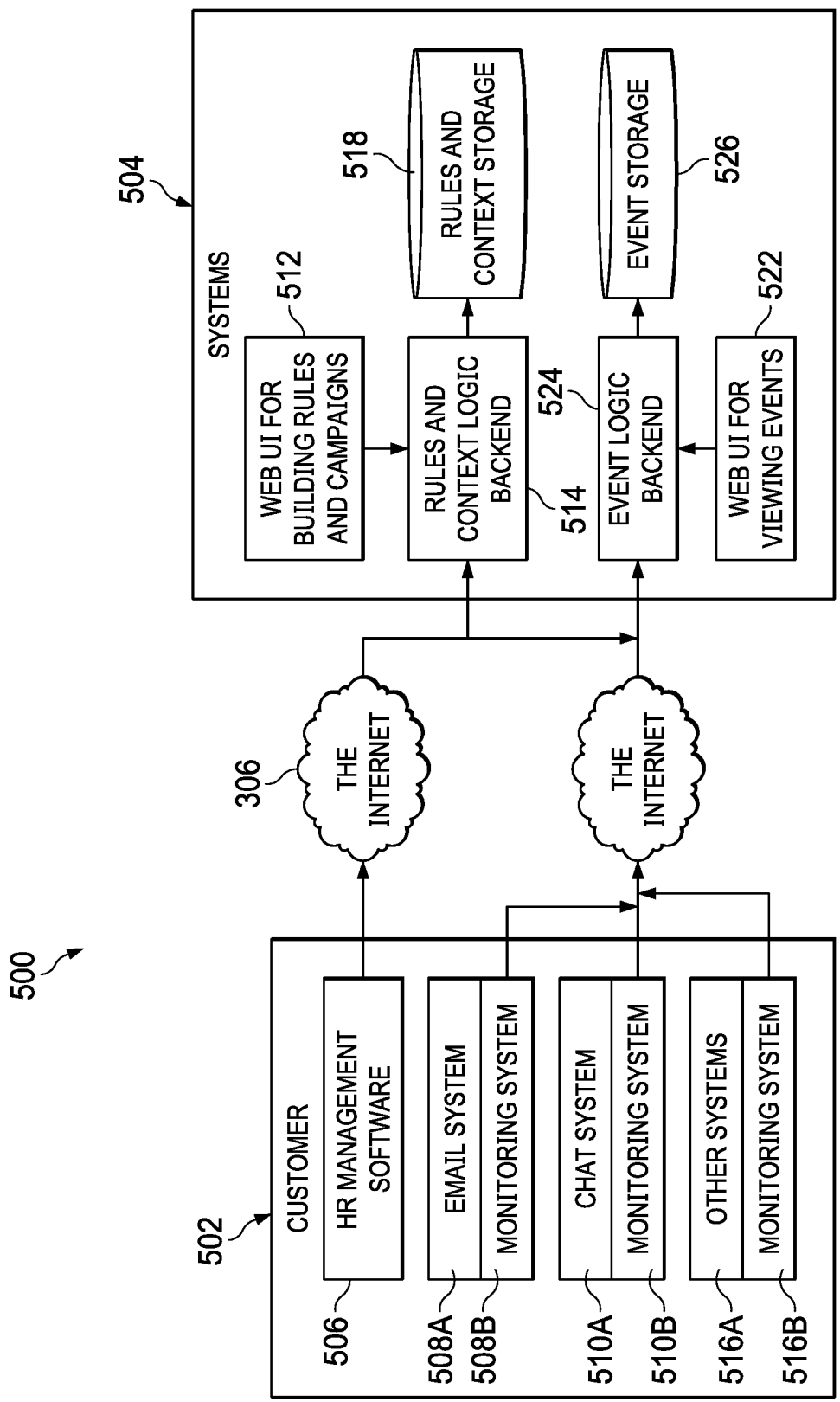
FIG. 5 is another illustration of a communication monitoring system, according to one embodiment.

In FIG. 5, an illustration of a communication monitoring environment 500 is shown, according to one embodiment. The communication monitoring environment 500 may include a customer side 502 and a communication monitoring side 504. The customer side 502 may include one or more human resources management softwares 506, one or more email systems 508, one or more chat system 510, one or more other communication systems 516, and/or any other communication system disclosed in this document and/or its equivalent. The communication monitoring side 504 may include one or more web user interface building rules and campaigns 512, one or more rules and context logic backends 514, one or more rules and context storage areas 518, one or more web user interface for viewing events 522, one or more event logic backends 524, one or more storage areas 526, and/or any other device disclosed in this document and/or its equivalent. In addition, the customer side 502 and the communication monitoring side 504 may communicate via the Internet 306 and/or any other communication systems. Further, one or more email systems 508 may be an integrated system with a customer email 508A and an email monitoring system 508B. The one or more chat system 510 may be an integrated system with a customer chat system 510A and a chat monitoring system 5106. The one or more other communication systems 516 may be an integrated system with a customer system 516A and a monitoring system 516B. In another example, the communication monitoring system can be integrated into the customer side 502.

Figure 6:
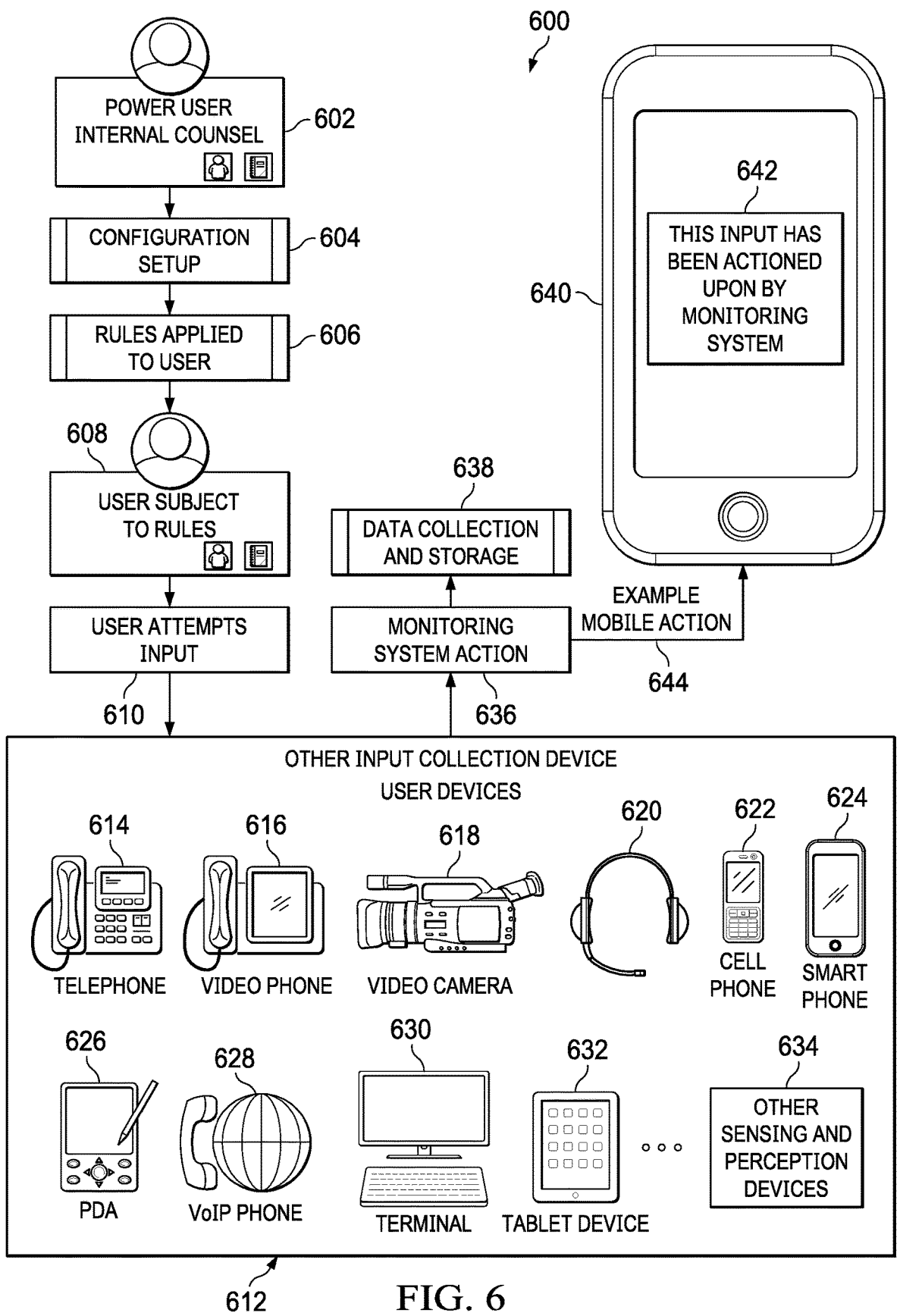
FIG. 6 is another illustration of a communication monitoring system, according to one embodiment.

In FIG. 6, an illustration of a communication monitoring system and procedural flow chart is shown, according to one embodiment. A communication monitoring system 600 may include a user internal counsel function (step 602). The communication monitoring system 600 may include a configuration setup (step 604). The communication monitoring system 600 may include applying rules to the user (step 606). The communication monitoring system 600 may determine whether the user is subject to one or more rules (step 608). The communication monitoring system 600 may include a user attempting to input data (step 610) via one or more of a telephone 614, a video phone 616, a video camera 618, a headset 620, a cell phone 622, a smart phone 624, a personal digital assistant 626, a VoIP phone 628, a terminal 630, a tablet 632, and/or any other sensing and perception device 634. The communication monitoring system 600 may include the monitoring system initiating one or more actions (step 636). The communication monitoring system 600 may include collecting and storing data (step 638). The communication monitoring system 600 may include initiating a message 642 on another mobile device 640 (step 644). In this example, the message 642 states "This input has been actioned upon by the system". In one example, the communication monitoring system determines that a fraud is about to occur by examining the terms "lets short the company stock" and "no one will ever know" and flags the communication.

Figure 7A:
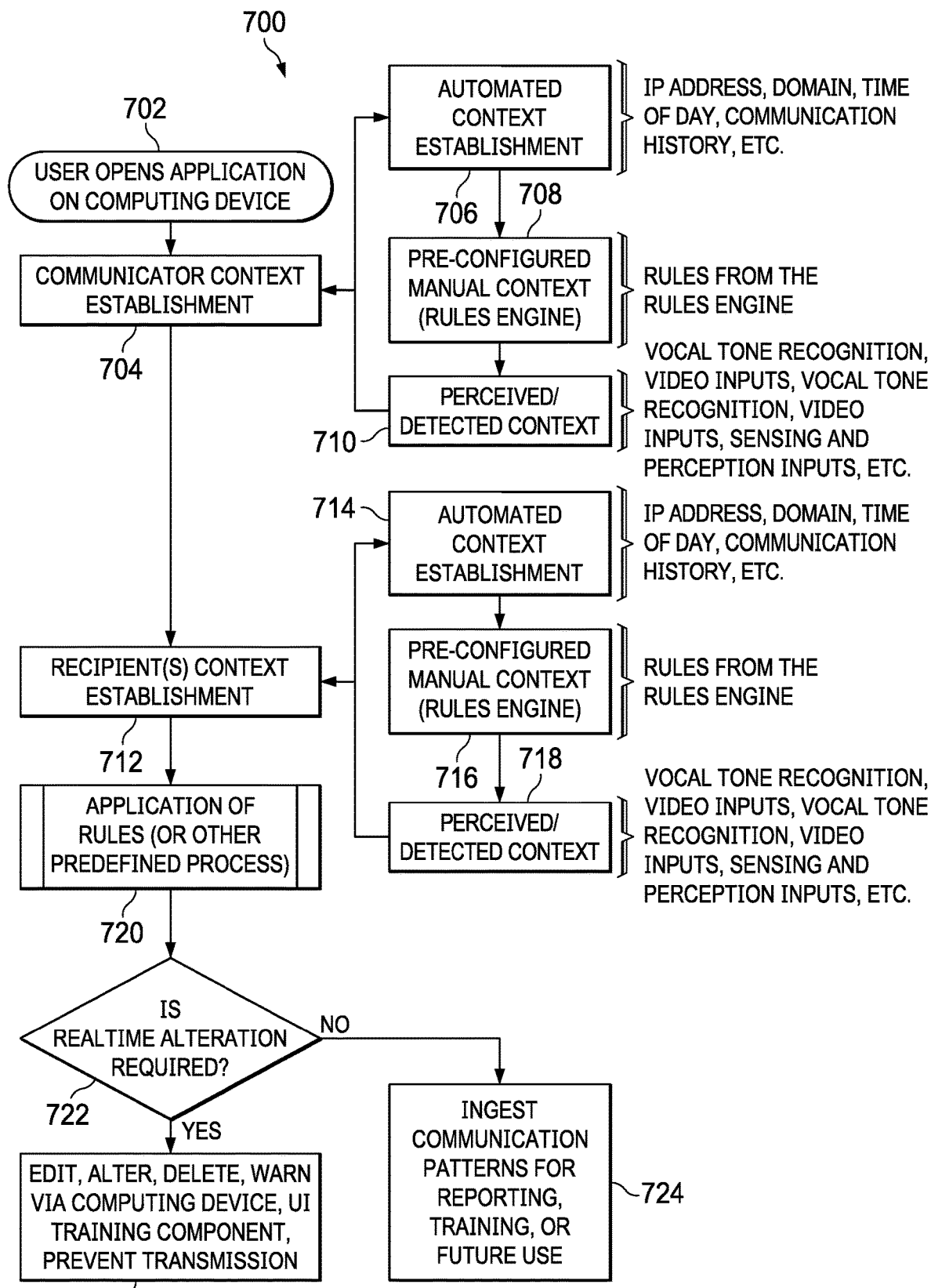
FIG. 7A is a procedural flow chart, according to one embodiment.

In FIG. 7A, a procedural flow chart is shown, according to one embodiment. A method 700 may include a user opening up an application on a computing device (step 702). The method 700 may include a communicator context being established (step 704). The method 700 may include a first automated context establishment function (step 706). The method 700 may include a first pre-configured manual context (rules engine(s)) function (step 708). The method 700 may include a first perceived/detected context function (step 710). The method 700 may include a recipient(s) context establishment function (step 712). The method 700 may include a second automated context establishment function (step 714). The method 700 may include a second pre-configured manual context (rules engine(s)) function (step 716). The method 700 may include a second perceived/detected context function (step 718). It should be noted that there may be up to Nth automated context establishment functions, Nth pre-configured manual context (rules engine(s)) function, and/or Nth perceived/detected context functions. The method 700 may include an application of rules (or other predefined process(es)) function (step 720). The method 700 may include one or more processors determining whether a real-time alteration is required (step 722). If no real-time alteration is required, then the method 700 may include ingest communication patterns for reporting, training, feedback procedures for the system itself, feedback to other processes, and/or any other use disclosed in this document (step 724). If a real-time alteration is required, then the method 700 may include editing, altering, deleting, warning, stopping, sending data to an approval procedure, and/or any other action disclosed in this document via the computing device, the user interface training component, and/or prevent any and all transmissions (step 726).

The technical implementation may utilize video inputs, comments on shared documents, Outlook extension version, Slack/chat bot version, Chrome Extension Version, Microphone ingestion version, Chatbot version, Terminal Layer, Smart Devices (sensing and perception logic e.g., multiple phones in the same room in proximity to each other), and/or any other device, system, and/or method disclosed in this document.

The system can be positioned in different ways for different use cases. The system positioning may also be a combination of implementations depending on the scope of client requests to achieve desired outcomes. The server level system may be primarily beneficial for ingestion and storage, while an implementation higher up in the stack may be more useful for immediate real time actions (e.g. alterations, blocking, notifications, etc.). The system can be implemented via imbedding into an organization's backend. This allows all data to remain on-premises for customers that have concerns about data sharing and privacy. This implementation can take the most severe actions like preventing information creation. The device-level implementation can be used for real-time, immediate actions in the strictest sense as well (in all applications across all devices). In this implementation, the system is installed onto individual devices (or networks they communicate with). This implementation has the ability to prevent the creation of information. For example, if a customer wanted to log every input from every device in a work environment, that customer would opt to install the software that sits at the terminal layer on managed devices and force installation via mechanisms currently available (e.g., managed systems or administration level installation). An example of where this is particularly valuable is in customer managed chat applications. If a customer is interested in de-risking these informal conversations, that customer would choose the application layer implementation. If a customer was interested in a less severe implementation and desires after-the-fact batch processing risk reduction, the system may be implemented at the storage layer. A customer can implement multiple combinations of the above to achieve the desired result.

Figure 7B:
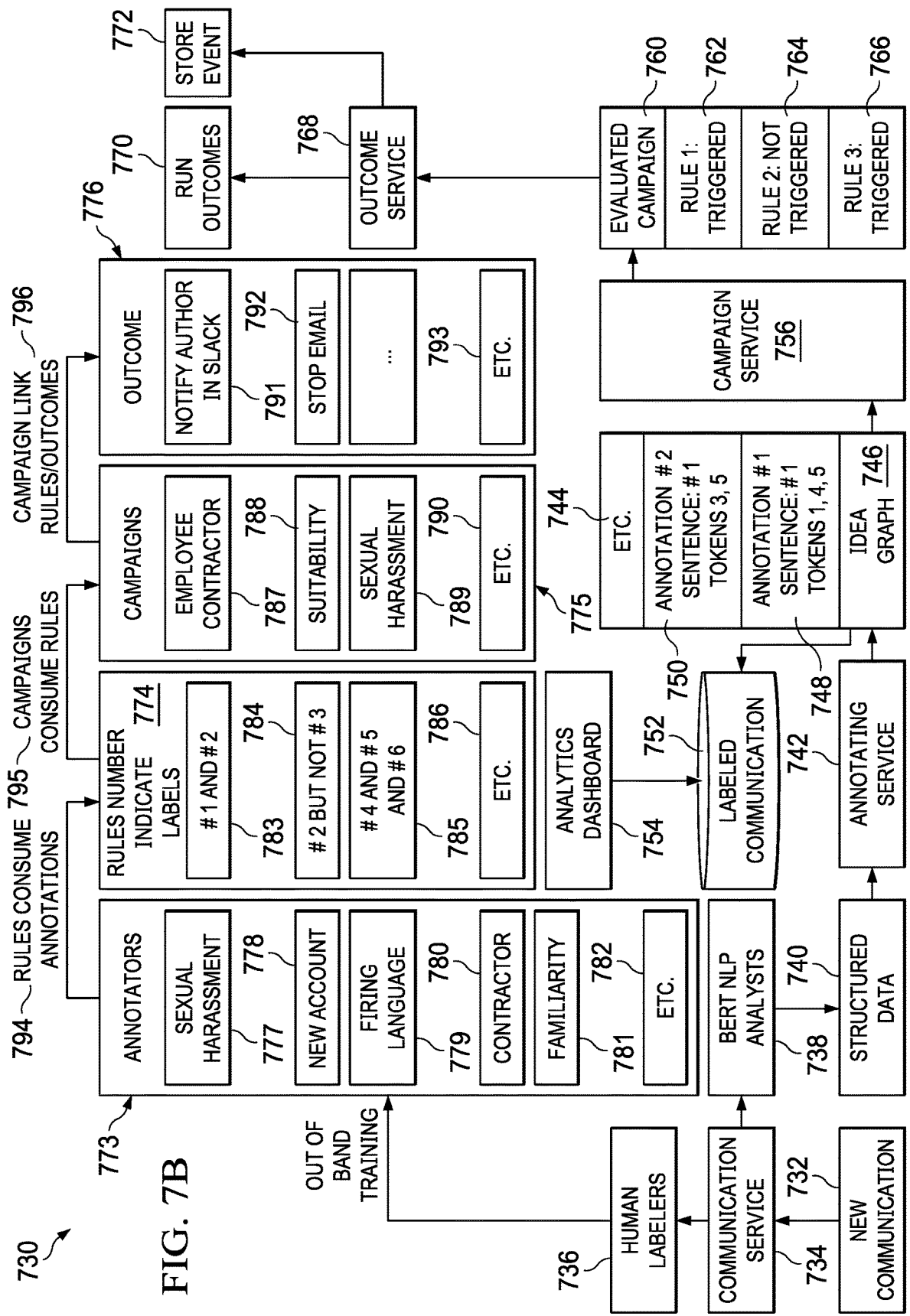
FIG. 7B is another procedural flow chart, according to one embodiment.

In FIG. 7B, another procedural flow chart is shown, according to one embodiment. A method 730 may include a new communication being created (step 732). The method 730 may include a communication service function (step 734). The method 730 may include a human labelers function (step 736). The method 730 may include a BERT NLP analysts (step 738). BERT is an open source machine learning framework for natural language processing (NLP). BERT is designed to assist computers in the process of understand the meaning of ambiguous language in text by using surrounding text to establish context. The method 730 may include a structured data function (step 740). The method 730 may include an annotating service function (step 742). The method 730 may include an annotator structure function (step 744). The annotator structure function 744 may include an idea graph function 746, a first annotator structure 748, and/or an Nth annotator structure 750). The method 730 may include a labeled communication function (step 752) and an analytics dashboard function (step 754). The method 730 may include a campaign service function (step 756). The method 730 may include a campaign function (step 758) where the campaign function 758 may include an evaluated campaign function (step 760), a first triggered rule (step 762), a first non-triggered rule (step 764), an Nth triggered rule (step 766), and an Nth non-triggered rule. The method 730 may include an outcome service function (step 768), a run outcomes function (step 770), and/or a store event function (step 772). Further, the method 730 may include an annotators function (step 773), a rules number indicate labels function (step 774), a campaigns function (step 775), and/or an outcome function (step 776). In this example, the method 730 may include a rules consume annotations function (step 794), a campaigns consume rules function (step 795), and/or a campaign link rules/outcomes function (step 796). In addition, the annotators function (step 773) may include a first category function 777, a new account function 778, a second category function 779, a third category function 780, a fourth category function 781, and/or an Nth category function 782. The rules number indicate labels function (step 774) may include a first criteria function 783, a second criteria function 784, a fourth criteria function 785, and/or an Nth criteria function 786. The campaigns function (step 775) may include a first campaign structure 787, a second campaign structure 788, a third campaign structure 789, and/or an Nth campaign structure 790. The outcome function (step 776) may include a first action 791, a second action 792, and/or an Nth action 793.

In various embodiments, the communication monitoring system may utilize a method for recommending communication optimizations, utilize a method for encoding professional expertise into models, utilize a method for matching meaning to models, and/or utilize a method for layering rules for identifying business risk.

In various examples, annotators, word matchers, AI annotators, combination annotator, and/or combinations thereof may be utilized by the communication monitoring system. In one example, an annotation can be as simple as a list of financial products. The list is encoded into the communication monitoring system, the part of speech is identified and attributed to the list and then the system is able to ingest any language and annotate that language (at the point of a match) with the meta-data that a financial product is being discussed in the communication. In another example, a language matcher is a feature that allows the system to use combinatorial processes to identify meaning for more complex topics that a basic annotation. For example, a language matcher annotator can consist of a list of nouns, noun phrases and verbs (and the resulting permutations thereof) to indicate a relationship between an actor and an action, for example. Language matcher annotators also take into consideration syntax and sentence structure. Language matcher annotators can also be any combination of parts of speech. When the communication monitoring system evaluates a communication, it creates a machine-readable representation of a communication and then maps the relationships between the communicated words and the meaning ascribed in the annotator in order to decide how to annotate the communication and map the meaning. For example, if an expert wanted to ascribe meaning to behavior relating to the firing of a certain type of worker, the expert could create an annotator comprised of all nouns that could be interpreted as representing "contractors" and all verbs that could be construed as "firing" (e.g., let go, fire, layoff, cast off, make redundant, etc.). In this way, the system can be encoded to describe all behaviors or actions representable in language. In another example, a context annotator can evaluate information about a communication in addition to simply the language. For example, a context annotator can understand that a message is of type: email or that it is an email sent from an individual to another individual or if it is a message sent from an individual to herself via a different email address. A context annotator can also annotate language based on 3rd-party integrations for example CRMs or people management databases/software. A context annotator can also determine data residency as it relates to things like export controls. In another example, an AI annotator is a machine-learned algorithm that has been trained to recognize sentiment, meaning, implications, or other human understanding concepts. An AI annotator similarly ingests communicated language and decides whether and how to annotate the communication. An AI annotator can be as simple as determining the overall sentiment of a communication as being "negative." In another example, combination annotators use basic annotators, word matchers, and AI annotators in combination to form an additional, unique annotator capable of assigning additional annotations to communications.

In one example of annotation, once a piece of language has been annotated, the system can ingest the resultant annotations to express expected meaning. For example, the following email illustrates how annotations can be applied to a communication.

Figure 22:
FIG. 22 is an illustration of a communication data, according to one embodiment.
Figure 36:
FIG. 36 is an example of a communication data, according to one embodiment.

FIG. 22 and FIG. 36 show an example of a communication data, according to one embodiment.

1—Sender Gender—Context Annotator evaluates either the name of sender (and ascribes a confidence to the determination to annotate or, via 3rd-party integration knows Marcus' gender). This information may be obtained via any other data source disclosed in this document.

2—Sender Tenure—3rd-party or employee database integration allows the system to confidently annotate Marcus' tenure. This information may be obtained via any other data source disclosed in this document.

3—Sender Age—3rd-party or employee database integration allows the system to confidently annotate Marcus' age. This information may be obtained via any other data source disclosed in this document.

4—Sender Count of Direct Reports—Employee database allows the system to confidently annotate Marcus' direct reports (and the fact that Marcus is a manager). These can be 2 separate annotations. This information may be obtained via any other data source disclosed in this document.

5—Sender Job Title—Communication indicates Marcus' title. The system is able to identify the footer of an email based on the communication type. This information could also be determined from an employee database. This information may be obtained via any other data source disclosed in this document.

6—Recipient Count—System counts the number of recipients. The system also knows whether certain recipients are groups.

7—Recipient Gender—If a single recipient, system knows recipients gender and annotates as such.

8—Recipient Tenure—See line 2. This information may be obtained via any other data source disclosed in this document.

9—Recipient/Sender Reporting Relationship—Context annotator evaluates sender/recipient relationship based on 3rd-party integration or employee database. This information may be obtained via any other data source disclosed in this document.

10—Message type—System knows the type of communication being sent based on URL or application.

11—Message Sentiment—AI annotator determines sentiment of overall communication and piecemeal excerpts.

12—Frustration—Annotator evaluates specific language indicative of frustration.

13—Mentions Financial Product.

14—Mentions Selling Behavior.

15—Profanity.

16—Boasting language.

17—Communicates Management Pressure/Names Manager.

18—Mentions Subtly Unethical Behavior.

19—Discusses under-represented or disadvantaged class. This information may be obtained via any other data source disclosed in this document.

20—Informal language.

21—Patronizing language.

22—Mentions Regulators.

23—Mentions Financial Suitability.

24—War Analogies/Language (Kill, destroy, conquer).

In one example relating to applying rules, using annotators similar to those above, a user could create a rule that identifies when inappropriate selling behavior (e.g., a first targeted action) is taking place. This rule would be defined by the presence (and weighting) of a number of annotators. For example: annotator determining that the author has a sales role; annotator indicating previous misbehavior by the author; annotator indicating the presence of the verb sell (or its synonyms); annotator indicating the object of the selling action is a financial product; annotator indicating that the communication comes from a company that sells financial products; annotator indicating a the product is not financially suitable for the customer (e.g., customer is low-income, bankrupt, behind on payments, not qualified for product X); and/or annotator indicating that there might be reservations about behavior in the communication. The communication monitoring system allows experts to create as many annotators as they want and eloquently combine them to represent a confidence level in meaning. Each annotator can be a binary or can be weighted to define a threshold of confidence because annotators do not all have the same effect on the decision making process with regard to meaning. Not all annotators must be triggered or included in the ultimate confidence in the decision to trigger a rule, but their presence or absence enhances the systems understanding of meaning.

The communication monitoring system may also have the ability to test different versions of rules against previous communications and against previous versions of the same rule, thereby learning and improving the decision making process. The user may combine a number of rules and annotators to expand the topic coverage within a specific campaign. For example, rules relating to inappropriate selling behavior (e.g., a first targeted action) could be combined with rules relating to sales language relating to guarantees (where the salesman/saleswoman does not have authority to be making guarantees). Further, the user could layer on a rule relating to quid pro quo or bribery (e.g., a second and/or Nth targeted action) into a campaign that ensures salespeople are behaving within the law and within policy. All of these rules (in aggregate) comprise the campaign around "Sales Policy" and allow users to logically group rules. Additionally, the communication monitoring system can recommend groupings of rules as new campaigns based on observed behavior within an organization or based on behavior observed in other organizations.

In an example relating to annotator interface, the communication monitoring system provides an interface that allows the user to populate the information necessary to create annotators in the language of their choice. The system allows a user to interact with annotators in numerous ways. This includes creating, reading, updating, or deleting. The annotators can be created and saved for future use (in the rules interface).

In one example relating to comparing communications to annotators and rules, when a sentence is ingested by the communication monitoring system, the communication monitoring system mathematically represents the sentence using pathways. Pathways are a means of representing all the meaning in a sentence across countless dimensions. Pathways are a mathematical, spatial representation of how meaning develops and exists within a communication. They can exist within sentences, across sentences, between phrases, between or amongst words and symbols, or amongst documents or communications.

In another example, annotators also have pathways that may be similar or different when compared to the pathways existent in a communication or block of text. The system has the ability to mathematically compare the communication pathway to the universe of annotator pathways. The comparative process is analogous to a goodness of fit process that runs recursively. Unlike a regression or sum of squared errors model, however, the pathway comparison is optimizing for meaning and business value and constantly learns new meaning pathways for the communication and new definitions for the annotation pathways. Representing the pathways as spatial models allows the system to perform a minimization process to determine goodness of fit. The resulting calculation determining distance from perfect allows the system to attribute a confidence level to each annotation, which can then be combined with the annotation's weight within a specific rule to arrive at a confidence level and reduce false positives.

In another example relating to rules interface, through the process for combining annotators and creating relationships between them, a user can express any communication risk. The user can select from the thousands of annotators or create an annotator of their liking to express any concept. That annotator can operate immediately or the user can decide to begin training the annotator using distributed machine learning techniques. By combining annotators, the user can create rules. The incremental complexity of a given rule (via layering annotators and annotator relationships) improves the accuracy and power of the rule. In one example, using the rules engine interface, a user can select any annotator they like, assign it weights, assign vectors to express directionality, assign relationships between (and amongst) other annotators, and label the rule to express their desires.

In another example of utilizing rules, a user could create an annotator that comprised all the nouns relating to the concept of gratuity (e.g., tip, tipping, gratuity, etc.). Then that user could create an annotator for the concept of inclusion with service using phrases containing adjectives and/or verbs (e.g., included, part of the fare, comes with the price, etc.). The user could then create an annotator that indicated that a communication was being sent by a customer service representative. The user could then create an annotator identifying the recipient of a communication as being a 1099 contractor working for a gig-economy company. If the user combined these four annotators into a rule for customer service agents, the rule would trigger any time a customer service agent errantly attempted to write to a contractor indicating that "tip is included" in the fare.

In another example relating to campaigns and actions, the user interface further allows users to combine rules into campaigns. This allows the user to logically group rules into subject areas (or policies, or initiatives) of their liking.

In one example relating to actions, actions can be set on the campaign level or specified at the campaign user interface level to apply to specific rules within that campaign. Actions can include, but are not limited to: notifying the author, notifying the author and the recipients, notifying a 3rd-party not originally privy to the communication (e.g., legal counsel or compliance department, or HR), notifying a group of 3rd-parties not originally privy to the communication (e.g., multiple lawyers or multiple compliance officers), triggering a forced training for the author (written or multimedia), opening another application on the author's device, closing an application on the author's device, blocking access to the communication platform used to send the communication, logging a user out of certain applications, revoking permissions on specific applications or devices or logging a user (usually the author) out of their machine entirely, blocking the message prior to send or submit, logging an event in a database, modify the document, any action disclosed in this document, and/or any combination thereof.

For example, if a user had a campaign consisting of rules relating to employee conduct as it relates to the treatment of co-workers, the campaign could contain a rule relating to harassment. The actions assigned to a given rule or campaign can be dependent on the egregiousness of the violation. If an author attempted to harass a co-worker via office chat for example, any number or combination of the above actions could be taken by the system under the employee conduct campaign.

In one example relating to targeting, the communication monitoring system allows a user the ability to target a campaign to specific applications, devices, and users. For example, if a user wanted to set up a campaign relating to "authorized sales activities," the user could limit the deployment of that campaign to members of the sales team. Further, the user could assign different thresholds of acceptability for phone conversations vs. written conversations. Lastly, the user could apply one set of thresholds to emails sent from office accounts and a separate rule-set for text messages on cellular phones.

In one example relating to encoding expert knowledge, the communication monitoring system allows experts to define annotators, rules, and campaigns. An individual who has a great deal of expertise in a particular field (e.g., risk mitigation, laws, human or behavioral psychology, organizational behavior, criminal behavior, etc.) can encode their expertise in a way that allows for the immediate, real-time monitoring and surveillance of all communications flowing into and from an organization.

In another example, the communication monitoring system learns from the topics that experts focus on. The system is able to determine which areas are common amongst organizations and in which areas particular organizations may be lacking. The system can make recommendations for new annotators, rules, and campaigns in situations where it is deemed prudent.

In one example of dashboarding and metrics, the communication monitoring system aggregates information from all platforms of communications to present the user with an overview of system performance and organizational behavior.

In one example, the communication monitoring system is intelligently managing annotations to prevent overloading the system. In one example relating to rules engine(s), the communication monitoring system can combine annotations in the form of rules to express desired meaning. For example, an expert can indicate that the presence of annotations 1, 3, 7, and 15, but the lack of annotation 16 or annotation 17 would indicate that a communication is indicative of potential illegal activity based on a professional understanding of a specific law. This allows the system to encode professional expertise into a machine learning system. Further, the expert can assign suggested weights to the differing annotations within the rule to evaluate business impact as opposed to simple sum of squared errors. These suggested weights can be tested and validated using back testing and moderated review.

In various examples, the communication monitoring system has the ability to intervene before a communication is saved or sent because it monitors and analyzes in real-time as the end-user types. Technically, any "action" (as defined above) can be triggered in real-time.

In one example relating to using annotators to ingest additional context, the communication monitoring system may integrate with CRMs, databases, etc. to ingest items of context. The communication monitoring system then annotates communications with these pieces of context In various examples, the communication monitoring system may utilize and understand different language types, jargon, sentence structure(s), implied level of education, and/or any other language characteristic.

Figure 8:
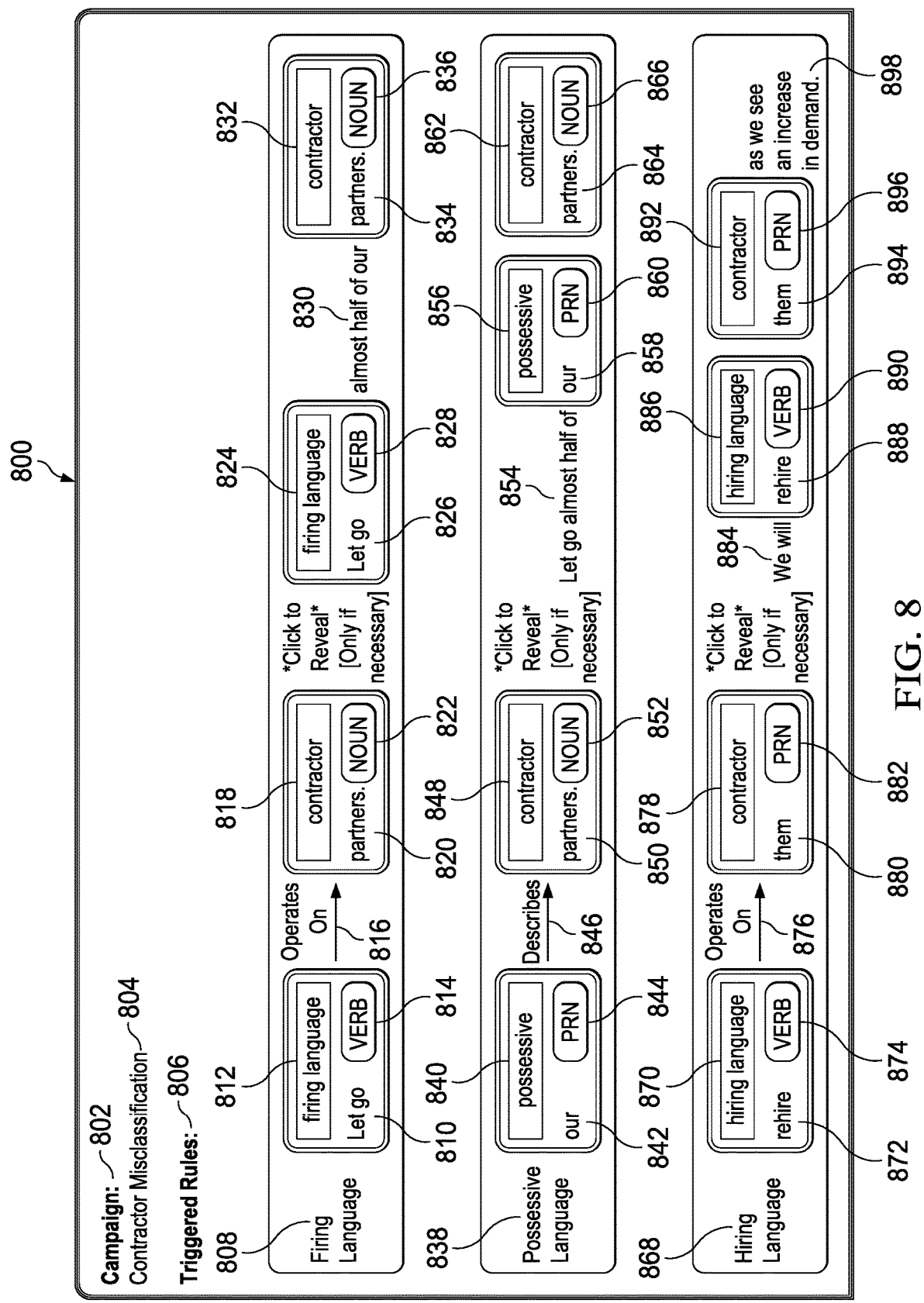
FIG. 8 is an illustration of a communication modeling, according to one embodiment.

In FIG. 8, an illustration of a communication modeling 800 is shown, according to one embodiment. The communication modeling 800 is of a message from a first person (e.g., Mclain) to a second person (e.g., John) which stated "John, I wanted to fill you in on how the virus has impacted our business here in Austin. Local demand was down 50% YoY for March & April—May is projected to finish down ~45%. As a result we have: Let go almost half of our partners. We will rehire them as we see an increase in demand. Added additional incentives for customers to further differentiate our services from the likes of Handy, Shortlist, ETC. I'll keep you updated as things progress. Best, Mclain." The monitoring system may look at the entire message and/or any portion of the message. In this example, the monitoring system has analyzed the entire message and has determined that the following portion should be further examined. As a result we have: Let go almost half of our partners. We will rehire them as we see an increase in demand. In this example, a title area 802 with a title 804 is shown. Further, a triggered rules area 806 is shown with a first category 808, a second category 838, and an Nth category 868. The first category 808 may be firing language. In this example, a first analyzed term 810 (e.g., Let go) has a first word identifier 812 (e.g., verb) and a first annotator identifier 812 (e.g., firing language). Further, a second analyzed term 820 (e.g., partners) has a second word identifier 822 (e.g., noun) and a second annotator identifier 818 (e.g., contractor). In addition, there is a first link 816 (e.g., operates on) between the first analyzed term 810 and the second analyzed term 820. In another example, a third analyzed term 826 (e.g., Let go) has a third word identifier 828 (e.g., verb) and a third annotator identifier 824 (e.g., firing language). Further, a fourth analyzed term 834 (e.g., partners) has a fourth word identifier 836 (e.g., noun) and a fourth annotator identifier 832 (e.g., contractor). In addition, there are additional words 830 in this sentence that have little to no valve in the analysis.

The second category 838 may be possessive language. In this example, a first analyzed term 842 (e.g., Let go) has a first word identifier 844 (e.g., pronoun) and a first annotator identifier 840 (e.g., possessive). Further, a second analyzed term 850 (e.g., partners) has a second word identifier 852 (e.g., noun) and a second annotator identifier 848 (e.g., contractor). In addition, there is a second link 846 (e.g., describes) between the first analyzed term 842 and the second analyzed term 850. In another example, a third analyzed term 858 (e.g., Let go) has a third word identifier 860 (e.g., pronoun) and a third annotator identifier 8856 (e.g., possessive language). Further, a fourth analyzed term 864 (e.g., partners) has a fourth word identifier 866 (e.g., noun) and a fourth annotator identifier 862 (e.g., contractor). In addition, there are additional words 854 in this sentence that have little to no valve in the analysis.

The Nth category 868 may be hiring language. In this example, a first analyzed term 872 (e.g., rehire) has a first word identifier 874 (e.g., verb) and a first annotator identifier 870 (e.g., hiring language). Further, a second analyzed term 880 (e.g., them) has a second word identifier 882 (e.g., pronoun) and a second annotator identifier 878 (e.g., contractor). In addition, there is a third link 876 (e.g., operates on) between the first analyzed term 872 and the second analyzed term 880. In another example, a third analyzed term 888 (e.g., rehire) has a third word identifier 890 (e.g., verb) and a third annotator identifier 886 (e.g., hiring language). Further, a fourth analyzed term 894 (e.g., them) has a fourth word identifier 896 (e.g., pronoun) and a fourth annotator identifier 892 (e.g., contractor). In addition, there are additional words 884 in this sentence that have little to no valve in the analysis.

The communication monitoring system utilizes, highlights, and/or analyzes the differences between words. One of the key take-away is that the communication monitoring system is able to express the relationships between words or phrases (e.g., the arrows that indicate A operates on B or A describes B). For example, A, B, C . . . are in the same sentence. A did B; therefore, A operates on B. In another example, A describes B or A is decoupled from B, C.

Figure 9A:
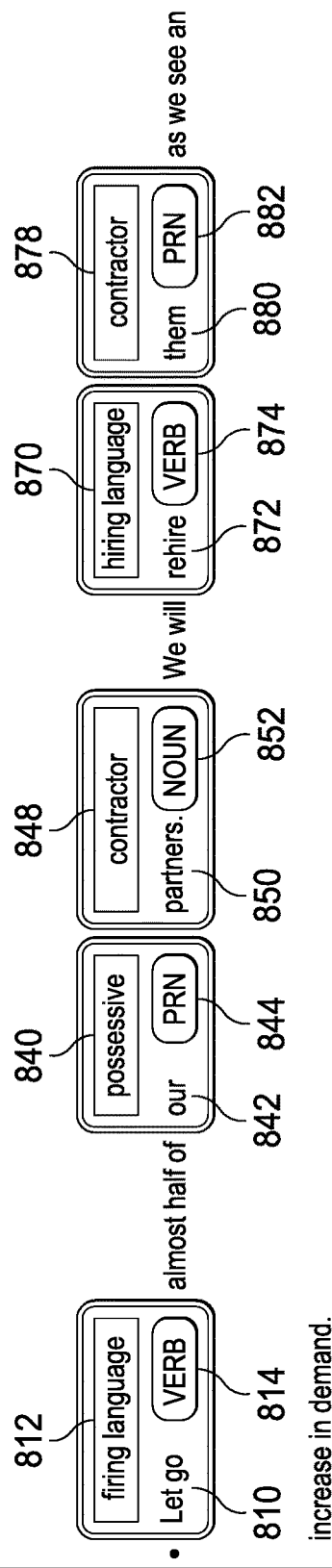
FIG. 9A is another illustration of a communication modeling, according to one embodiment.
Figures 1, 9B:
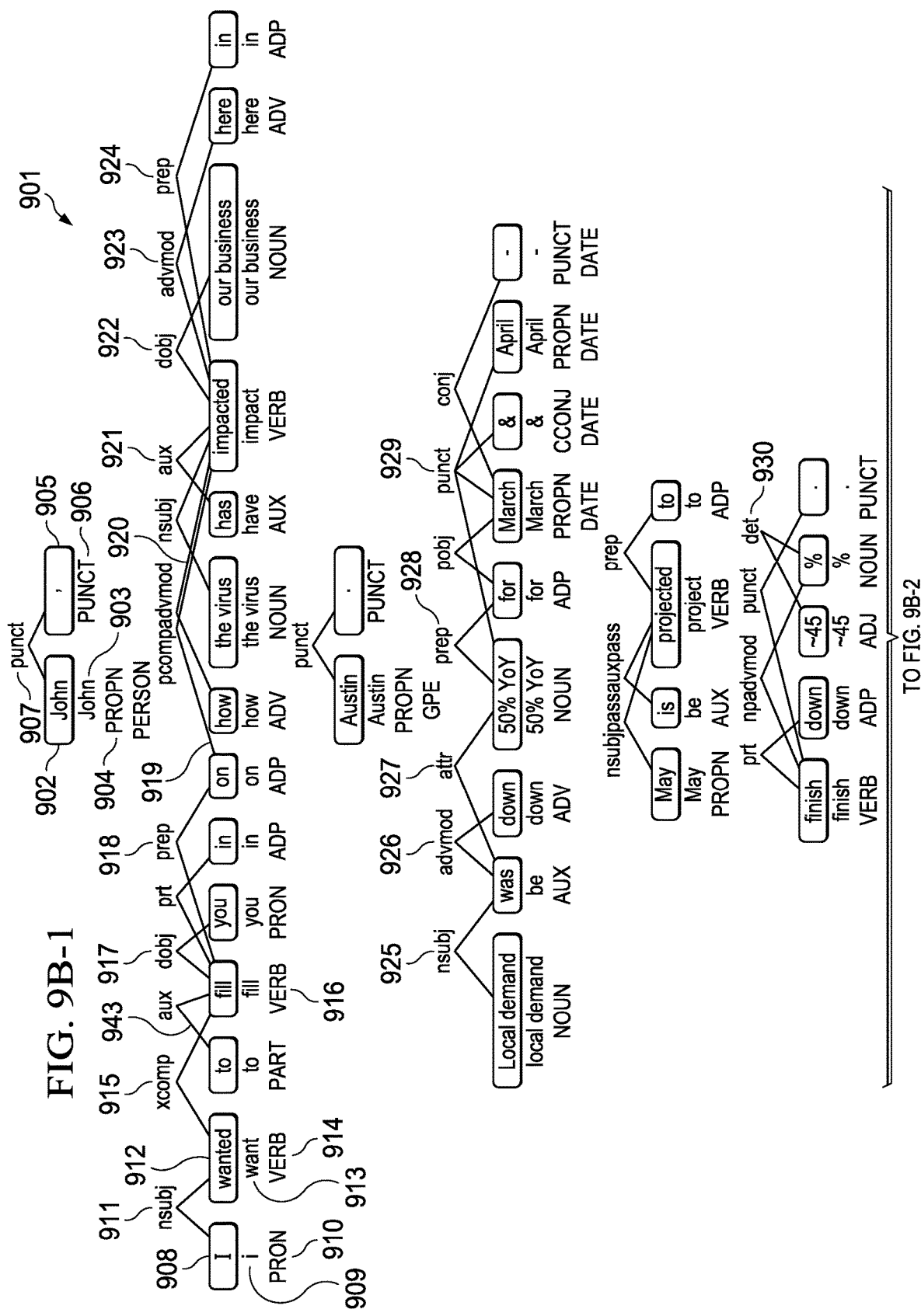
Figures 2, 9B:
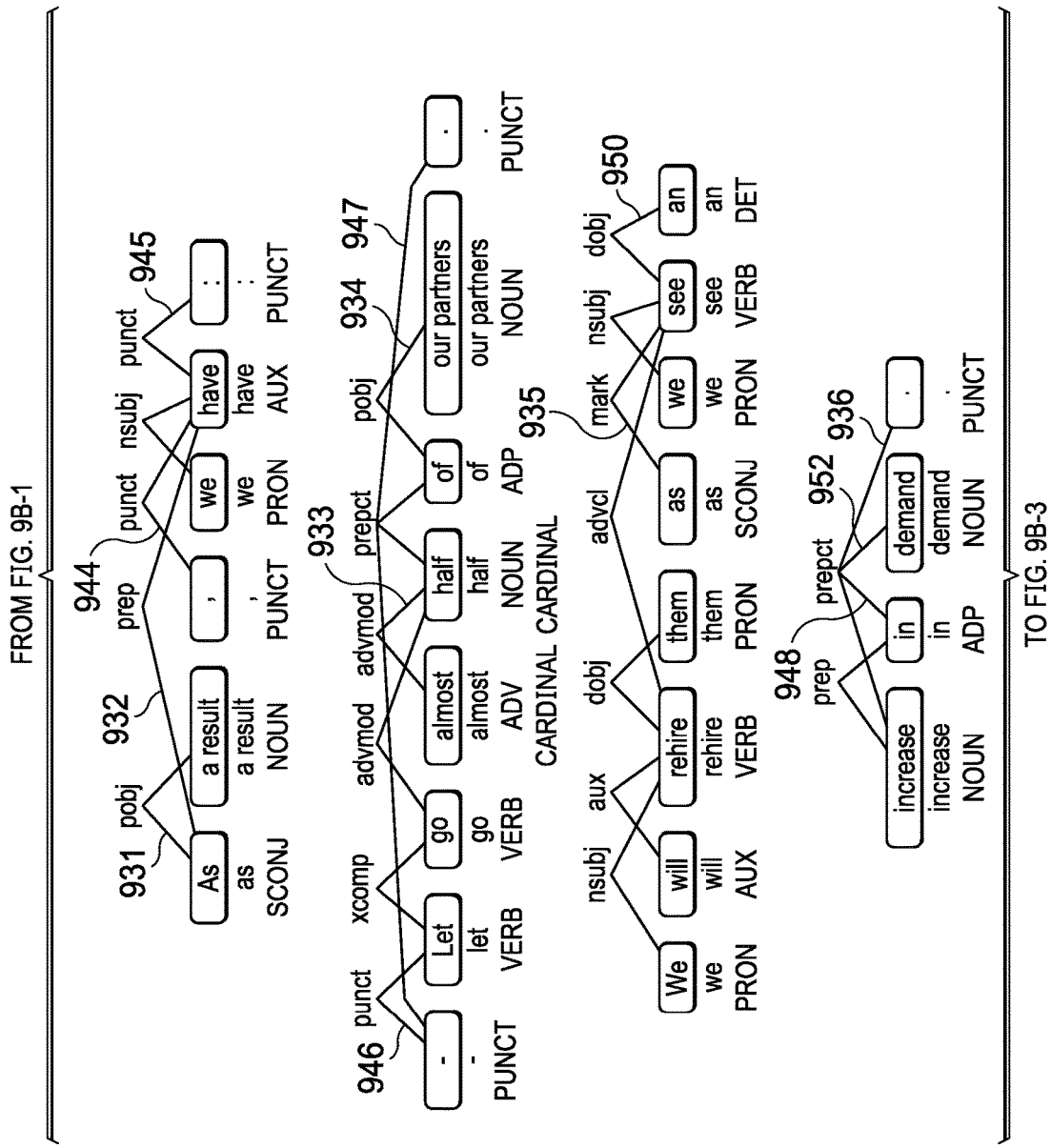
Figures 3, 9B:
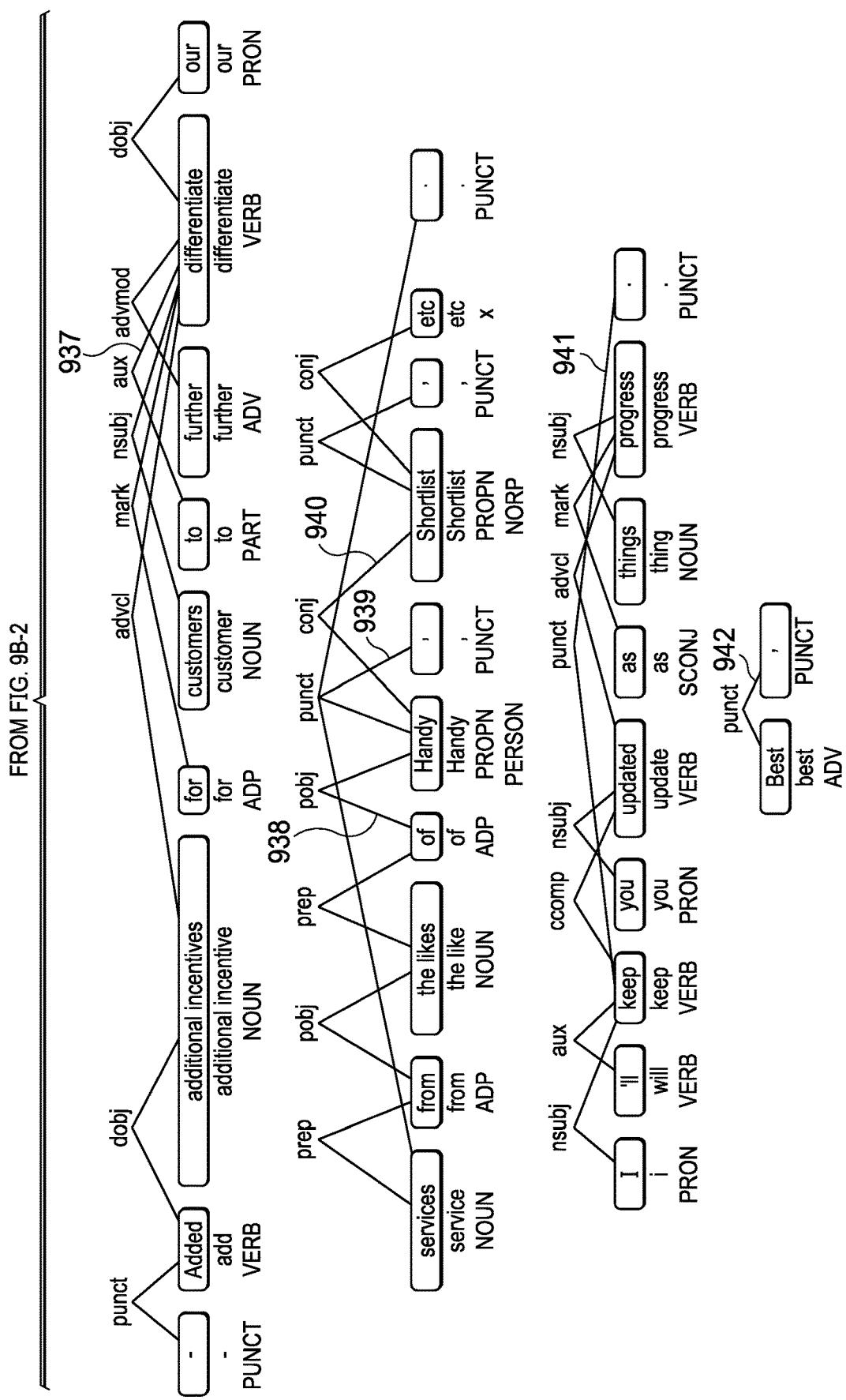

In FIGS. 9A to 9B-3, illustrations of communication modelings are shown, according to one embodiment. In the example shown in FIG. 9A, the monitoring system has analyzed an entire message 900 and has determined that the following portion should be further examined. As a result we have: Let go almost half of our partners. We will rehire them as we see an increase in demand. In FIGS. 9B-1 to 9B3, multiple relationships are shown. In one example, a first term 902 (e.g., John) is broken down into a simplified word 903 and a first word category 904 (e.g., proper noun or PROPN for short). Further, a second term 905 is broken down into a second word category 906 (e.g., punctuation or PUNCT for short). The first term 902 and the second term 905 are linked by a first link 907 which indicates that the link is based on punctuation. In another example, a third term 908 (e.g., I) is broken down into a simplified word 909 and a third word category 910 (e.g., pronoun or PRON for short) and a fourth term 912 (e.g., wanted) is broken down into a simplified word 913 (e.g., want) and a fourth word category 914 (e.g., verb) are linked via a second link 911 which indicates that the link is based on noun subject (e.g., nsubj). In addition, the fourth term 912 is linked via a third link 915 to a fifth term fill 916 which indicates that the link is based off of xcomp. In addition, there is a fourth link 943 between the terms to and fill based on aux. Further, there is a fifth link 917 between the terms file and you based on dobj. In addition, there is a sixth link 918 between the terms fill and on based on prep. Further, there is a seventh link 919 between the words on and impacted based on pcompadvmod. In addition, there is an eighth link 920 between the terms how and impacted based on pcompadvmod. Further, there is a ninth link 921 between the words has and impacted based on aux. Further, there is a tenth link 922 between the words impacted and our business based on dobj. In addition, there is an eleventh link 923 between the terms impacted and here based on advmod. Further, there is a twelfth link 924 between the terms impacted and in based on prep. In addition, there is a thirteenth link 925 between the words local demand and was based on nsubj. Further, there is a fourteenth link 926 between the terms was and down based on advmod. In addition, there is a fifteenth link 927 between the words was and 50% YoY based on attr. In addition, there is a sixteenth link 928 between the terms 50% YoY and for based on prep. Further, there is a seventeenth link 929 between the terms Mach and & based on punctuation. Further, there is an eighteenth link 930 between the words ~45 and % based on det. Continuing on FIG. 9B-2, there is a nineteenth link 931 between the words as and a result based on pobj. Further, there is a twentieth link 932 between the words as and have based on prep. In addition, there is a twenty-first link 944 between the terms, and have based on punctuation. Further, there is a twenty-second link 945 between the terms have and:. In addition, there is a twenty-third link 946 between the terms—and let based on punctuation. In addition, there is a twenty-fourth link 933 between the words almost and half based on advmod. Further, there is a twenty-fifth link 934 between the words of and our partners based on pobj. Further, there is a twenty-sixth link 947 between the terms—and . based on punctuation. In addition, there is a twenty-seventh link 935 between the words as and see based on mark. Further, there is a twenty-seventh link 950 between the words see and an based on dobj. Further, there is a twenty-eighth link 948 between the terms in and . based on prepct. In addition, there is a twenty-ninth link 952 between the words in and demand based on prepct. Further, there is a thirtieth link 936 between the terms in and . based on prepct. Turning to FIG. 9B-3, a thirty-first link 937 between the terms to and differentiate is established based on aux. Further, a thirty-second link 938 between the terms of and Handy is based on pobj. In addition, a thirty-third link 939 between the terms Handy and is based on punctuation. In addition, a thirty-fourth link 940 between the terms Handy and Shortlist is based on conj. Further, a thirty-fifth link 941 between the terms keep and . is based on punctuation. In addition, a thirty-sixth link 942 between the terms Best and, is based on punctuation.

In one example, stemma means to utilize the suffix of a word. For example, the suffix of wanted is want. Xcomp may be an open clausal complement. In one example, an open clausal complement (xcomp) of a verb or an adjective is a predicative or clausal complement without its own subject. The reference of the subject is necessarily determined by an argument external to the xcomp (normally by the object of the next higher clause), if there is one, or else by the subject of the next higher clause. These complements are always non-finite, and they are complements (arguments of the higher verb or adjective) rather than adjuncts/modifiers, such as a purpose clause. The name xcomp is borrowed from Lexical-Functional Grammar. In a specific example, "He says that you like to run" xcomp(like, run). In another example, "I am ready to go" xcomp(ready, go). In another example, "Bob asked Mike to respond to his offer" xcomp (ask, respond). In another example, "Steve considers him a fool" xcomp(considers, fool). In another example, "Steve considers him honest" xcomp(considers, honest). In one example, dobj may be a direct object. The direct object of a verb phrase is the noun phrase which is the (accusative) object of the verb. For example, "Bob gave me a raise" dobj(gave, raise). In another example, "We won the lottery" dobj(won, lottery). In one example, prep may be prepositional modifier. A prepositional modifier of a verb, adjective, or noun is any prepositional phrase that serves to modify the meaning of the verb, adjective, noun, or even another preposition. In the collapsed representation, this may be used only for prepositions with noun phrase complements. For example, "Jennifer saw a cat in a hat" prep(cat, in). In one example, nsubj may be a nominal subject. A nominal subject is a noun phrase which is the syntactic subject of a clause. The governor of this relation might not always be a verb: when the verb is a copular verb, the root of the clause is the complement of the copular verb, which can be an adjective or noun. For example, "Joe defeated Chris" nsubj (defeated, Joe). In another example, "The dog is cute" nsubj(cute, dog). In one example, advmod may be an adverb modifier. An adverb modifier of a word is a (non-clausal) adverb or adverb-headed phrase that serves to modify the meaning of the word. For example, "Artificially modified food" advmod(modified, artificially). In another example, "less frequent" advmod(frequent, less). In one example, an attributive (Attr) may be a relation intended for the complement of a copular verb such as "to be", "to seem", "to appear", etc. In one example, a determiner (det) may be the relation between the head of an noun phrase and its determiner. For example, "The woman is here" det(woman, the). In another example, "Which car do you prefer?" det(car, which). In one example, pobj is an object of a preposition. The object of a preposition is the head of a noun phrase following the preposition, or the adverbs "here" and "there". (The preposition in turn may be modifying a noun, verb, etc.) Unlike the Penn Treebank, we here define cases of VBG quasi-prepositions like "including", "concerning", etc. as instances of pobj. (The preposition can be tagged a FW for "pace", "versus", etc. It can also be called a CC—an is distinguish from conjoined prepositions.). In the case of preposition stranding, the object can precede the preposition (e.g., "What does ATM stand for?"). In another example, "Bob sat on the chair" pobj(on, chair). In one example, prepc is a prepositional clausal modifier. In the collapsed representation, a prepositional clausal modifier of a verb, adjective, or noun is a clause introduced by a preposition which serves to modify the meaning of the verb, adjective, or noun. For example, "She purchased it without paying a premium" prepc without(purchased, paying). In one example, aux may be an auxiliary. An auxiliary of a clause is a non-main verb of the clause, e.g., a modal auxiliary, or a form of "be", "do" or "have" in a periphrastic tense. In another example, conj may be a conjunct. A conjunct is the relation between two elements connected by a coordinating conjunction, such as "and", "or", etc. In one example, the communication monitoring system treats conjunctions asymmetrically: The head of the relation is the first conjunct and other conjunctions depend on it via the conj relation. In one example, "Bob is big and honest" conj(big, honest). In another example, "The family either ski or snowboard" conj(ski, snowboard). All of these examples may be combined in any fashion and/or procedure.

The communication monitoring system may convert words to an idea graph. The communication monitoring system may obtain communication data. The communication monitoring system may then use NLP tools to represent the words and their relationships with one another. The communication monitoring system may annotate the communication and express it in a "graphical representation" (e.g., a sentence labeling diagram including meaning in addition to parts of speech). The individual document, sentences, paragraphs, and "tokens" (words or word phrases) are then assigned different annotations that represent that meaning as seen in FIGS. 9B-1 to 9B3. After this process, the communication monitoring system may never look at the words or language itself again. All the rules engine processes operate on the annotation layer (i.e., on the meaning ascribed to the communication) as opposed to the communication itself.

Figure 10:
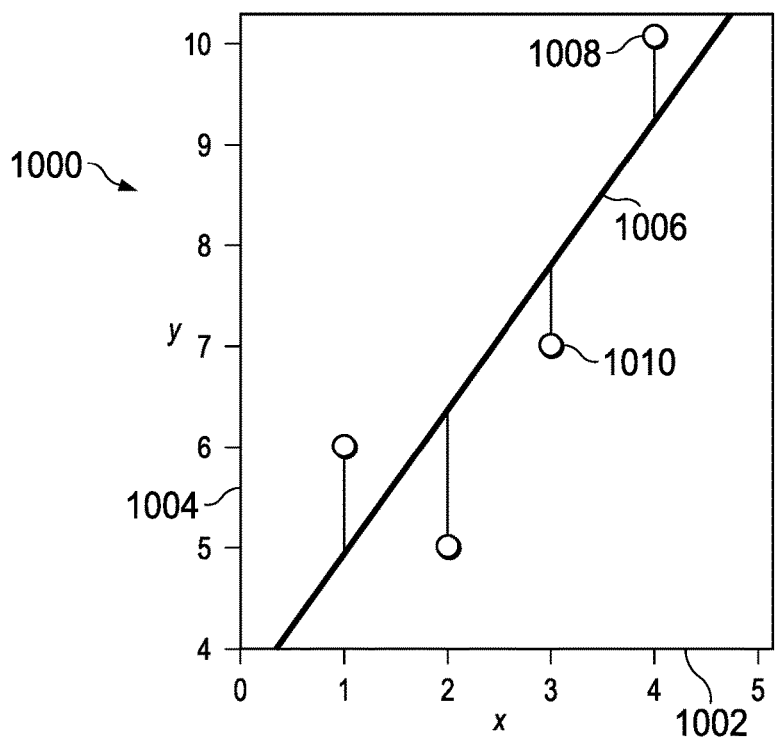
FIG. 10 is an illustration of an annotator point line, according to one embodiment.

In FIG. 10, an illustration of an annotator point line is shown, according to one embodiment. A graph 1000 has an X-axis 1002, a Y-axis 1004, a Z-axis (not shown and is optional), an annotator line 1006, one or more incremental annotators 1008, and one or more decremental annotators 1010.

In one example, the communication monitoring system utilizes a confidence vs. sensitivity level procedure. When an AI annotator runs, the communication monitoring system ingest a paragraph, a sentence, or a "token" (a single word or word phrase). The annotator analyzes these and determines whether to apply an annotation or not to that location in the communication. This decision comes with a confidence level. In other words, the annotator process is applying the annotation with X % confidence. The higher the confidence level, the more certain the annotator process is that the communication actually deals with a particular topic (or displays a particular characteristic). Sensitivity, on the other hand, is a human-configured parameter. It is configured at the rules layer, after the annotation process has occurred on a document. So, at this point all annotations have already been made.

For example, if an annotator is looking for flirtatious language and evaluating a customer service communication that includes the phrase "my pleasure," this annotator would annotate the token (word phrase) as being flirtatious, but it would have a low confidence level in that annotation, say 14%.

At the rules layer, if the communication monitoring system were looking to warn agents about using flirtatious language, the communication monitoring system may have a rule with a sensitivity of 60% or higher. This means that it would only trigger the warning above 60%.

In another example of combinatory nature of annotators, the communication monitoring system may use a process related to a linear regression (and/or any other mathematical modeling(s), mathematical analysis, etc.) where a bunch of points plotted on a graph. Please note that linear regression analysis is being utilized because it is the easiest way to explain the process. However, a multi-dimensional analysis and/or modeling could be and is being utilized. The simplest way to express a relationship between them is by minimizing the mean squared errors to represent them with a line. In this example, points above the line increase the plot, points below it decrease it. This is similar to how certain annotators can increment or decrement the slope of the graph. For example, the word "moron" may be incremental (reference number 1008) to an annotator relating toxic language and the word "hard-worker" may decrement (reference number 1010) that annotator. The combination of these two words/ phrases (tokens) are weighed against each other in determining confidence. The line itself may be an abstraction of the plotted points, but it serves as a means of representing the trend. The analogy of the line is similar to idea graph and the plotted points are annotators. Once the communication monitoring system plots the points and draw the line, we now have a graphical representation of meaning.

The communication monitoring system then may take that line and compare it to a bunch of other lines to look at similarity. These other lines may be the rules engine(s). If a rules engine line is similar enough to our meaning line, then we trigger the rule. In one example, the lines are vectors and instead of 2 dimensional space, we do it in a multidimensional way.

Figure 11A:
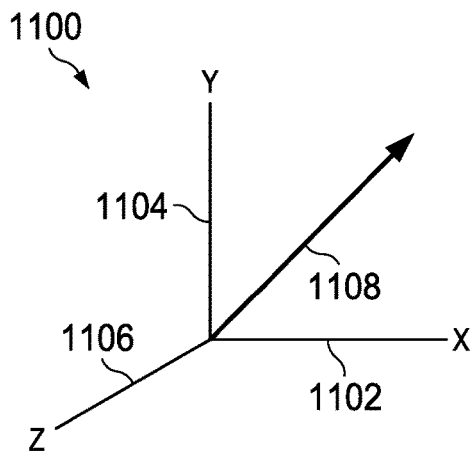
FIGS. 11A-11C are illustrations of a comparison of the annotator point line to reference annotator point line(s), according to various embodiments.
Figure 11B:
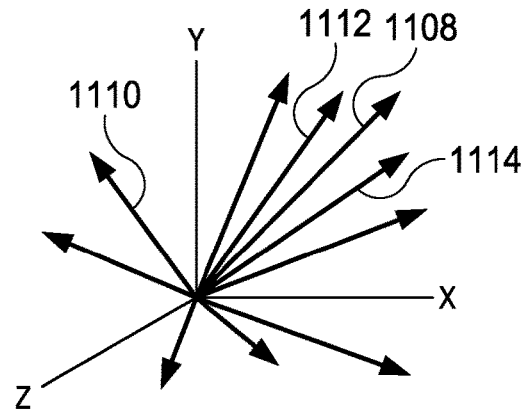
Figure 11C:
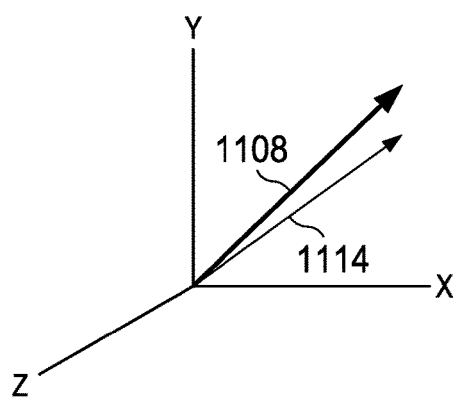

In FIGS. 11A-11C, illustrations of a comparison of the annotator point line to a reference annotator point line are shown, according to various embodiments. Reference FIG. 11A, a graph 1100 includes an X-axis 1102, a Y-axis 1104, a Z-axis, and an annotator line 1108. In FIG. 11B, the annotator line 1108 is compared to a plurality of reference annotator lines 1100. The communication monitoring system examines all of the plurality of reference annotator lines and may select one or more reference annotator lines 1100 which are within a predetermined and/or dynamic threshold of the annotator line 1108. In this example, a first reference annotator line 1112 and an Nth annotator line 1114 may be within the predetermined and/or dynamic threshold. In FIG. 11C, the communication monitoring system has selected the Nth annotator line 1114 based on predetermined procedures, dynamic procedures, machine learning, and/or a combination of one or more therein. It should be noted that the graphs may be two-dimensional and/or three-dimensional. Further, the graphs may be 2-100 dimensions or 1-Nth dimensions.

Figure 12:
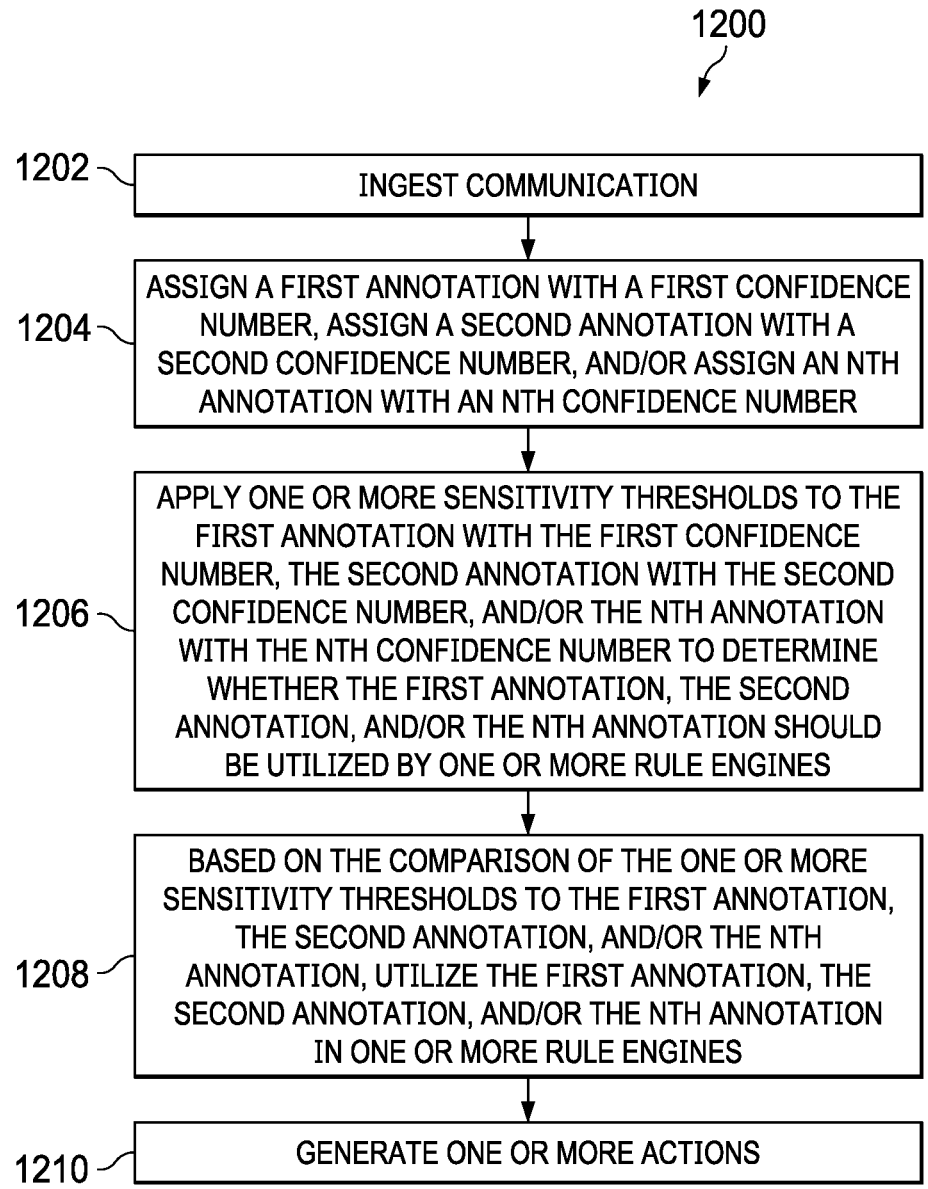
FIG. 12 is another procedural flow chart, according to one embodiment.

In FIG. 12, an annotation procedural flow chart is shown, according to one embodiment. A method 1200 may include via one or more processors ingesting a communication (step 1202). The method 1200 may include via one or more processors assigning a first annotation with a first confidence number, assigning a second annotation with a second confidence number, and/or assigning an Nth annotation with an Nth confidence number (step 1204). The method 1200 may include via one or more processors applying one or more sensitivity thresholds to the first annotation with the first confidence number, applying one or more sensitivity thresholds to the second annotation with the second confidence number, and/or applying one or more sensitivity thresholds to the Nth annotation with the Nth confidence number to determine whether the first annotation, the second annotation, and/or the Nth annotation should be utilized by one or more rule engines (step 1206). The method 1200 may include a step that based on the comparison of the one or more sensitivity thresholds to the first annotation, the second annotation, and/or the Nth annotation, utilizing via one or more processors the first annotation, the second annotation, and/or the Nth annotation in one or more rule engines (step 1208). The method 1200 may include via one or more processors generating one or more actions (step 1210). In one example, the communication monitoring system may apply a 20% confidence level to the word dog, a 50% confidence level to the word overweight, a 60% confidence level to the word fat, and/or an 80% confidence level to the word ugly. A harassment rule may have a 70% level to trigger a flag. Therefore, only the term ugly by itself would trigger this flag. However, the combination of do and overweight may have a combined confidence level of 65% which would not trigger the flag but a combination of dog and fat may have a combined confidence level of 72% which would trigger the flag.

In one example, the communication monitoring system architecture includes annotators (e.g., modules, devices, methods, and/or machines that add labels to text). The machines can be AI driven, a simple list of words, or language matchers which look for combinations of noun+ adjective, noun+verb, verb+adv. If an annotator is triggered, a piece of text gets a label, rules (e.g., rules are combinations of annotators). So, you could have a boasting language annotator, derogatory language annotator, a female subject annotator, etc. that would all be looking for somebody bragging about treating a female in the workplace inappropriately. This would comprise one rule and/or campaigns (e.g., combining rules to make campaigns). So, if you wanted to have a campaign about workplace culture, you would likely include a rule like the one above. This system allows companies to express any risk in the communication monitoring system. So, everything from financial bribery to foreign corrupt practices to sexism in the workplace to simple swearing. These campaigns can then be targeted to specific software platforms (e.g., emails only, or chats and emails, or customer service emails and chats, etc.). Further, these campaigns can be targeted to employee groups (e.g., apply campaign 1 to the sales team only or apply all campaigns to everybody, except the legal team, etc.).

One other piece of interesting technology is finding (and minimizing language pathways). A campaign can be expressed as a pathway between words (e.g., mathematically). Similarly, meaning can be expressed as a mathematical pathway (or relationship) between words as well. The communication monitoring system may minimize the distance between these pathways to: 1) better capture meaning/understanding and 2) map "meaning pathways" to "campaign pathways" to reduce false positives.

Figure 13:
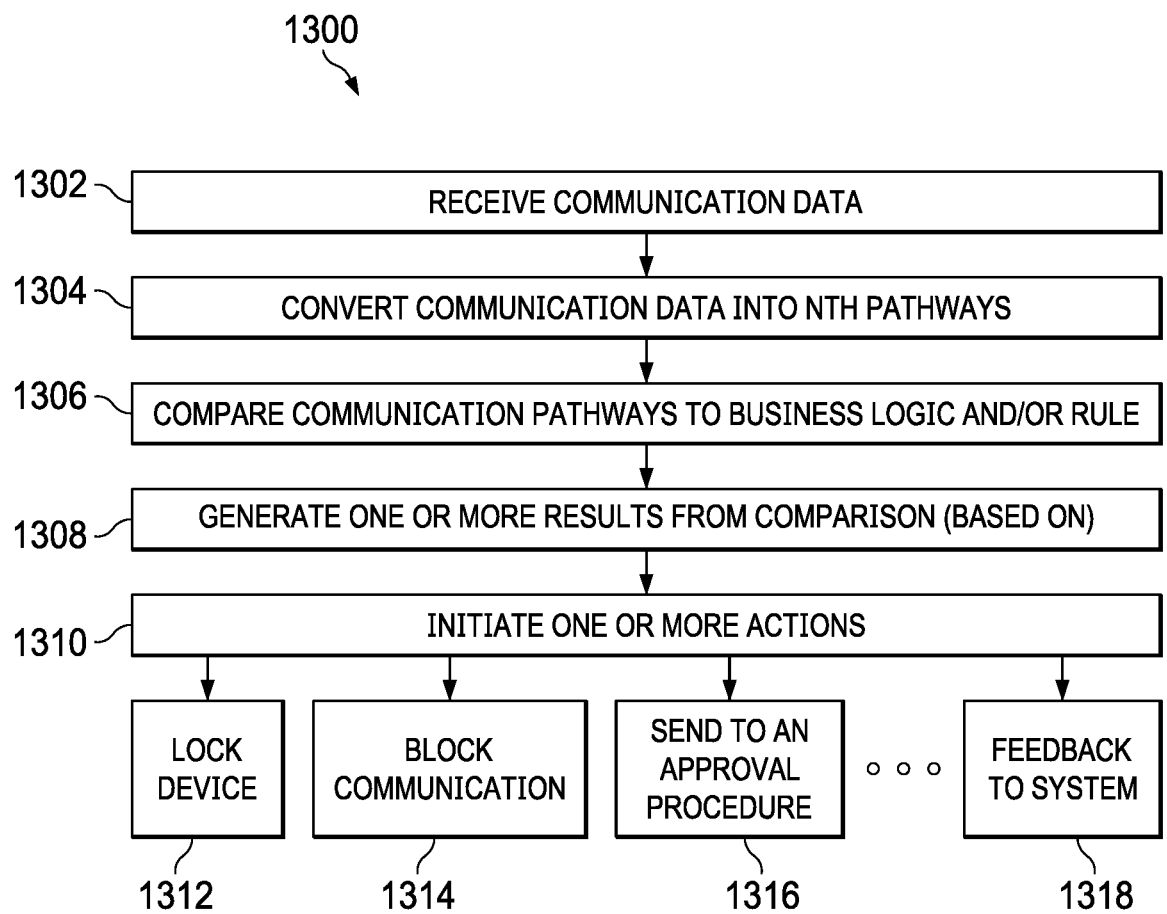
FIG. 13 is another procedural flow chart, according to one embodiment.

In FIG. 13, a communication pathways procedural flow chart is shown, according to one embodiment. A method 1300 may include via one or more processors receiving communication data (step 1302). The method 1300 may via one or more processors convert the communication data into Nth pathways (step 1304). The method 1300 may include via one or more processors comparing one or more communication pathways to business logic and/or rules (step 1306). The method 1300 may include via one or more processors generating one or more results from (based on) the comparison (step 1308). The method 1300 may include via one or more processors initiating one or more actions (step 1310). In one example, the system via one or more processors may lock one or more communication devices (step 1312). In another example, the system via one or more processors may block one or more communications (step 1314). In another example, the system via one or more processors may send one or more communications to an approval procedure (step 1316). In another example, the system via one or more processors may obtain feedback based on any of the steps (e.g., steps 1302-1316). In one example, a communication may include espionage potential and the communication monitoring system would lock the device. In another example, a communication may include profanity and the communication monitoring system may block or erase the profanity. In another example, a communication may include an offer to purchase a company which would be flagged and move to an approval level.

Figure 14A:
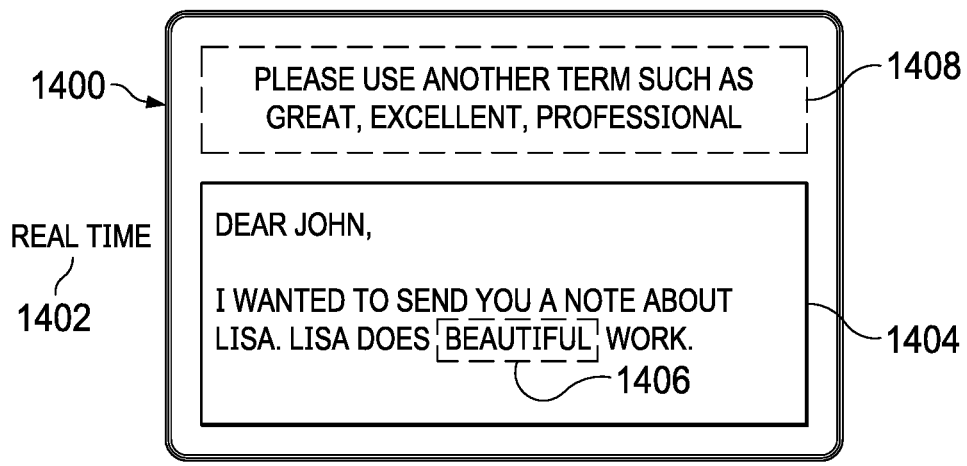
FIGS. 14A-14C are illustrations of actions taken by the communication monitoring system, according to various embodiments.
Figure 14B:
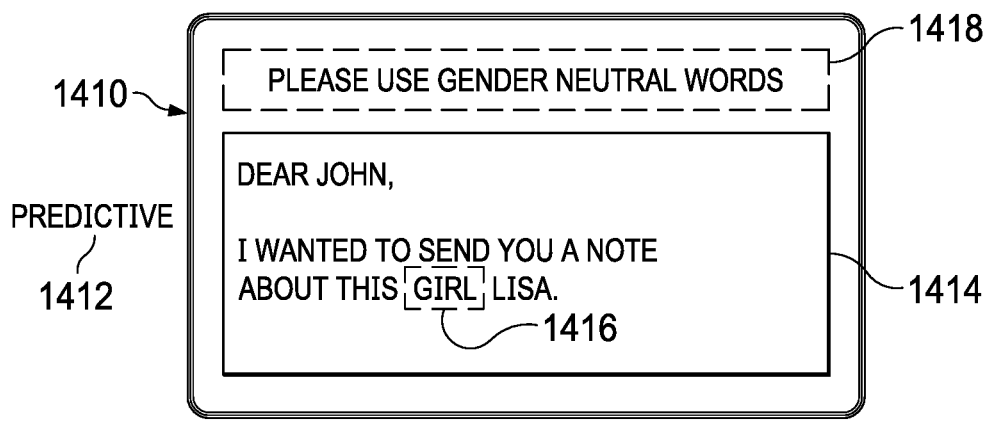
Figure 14C:
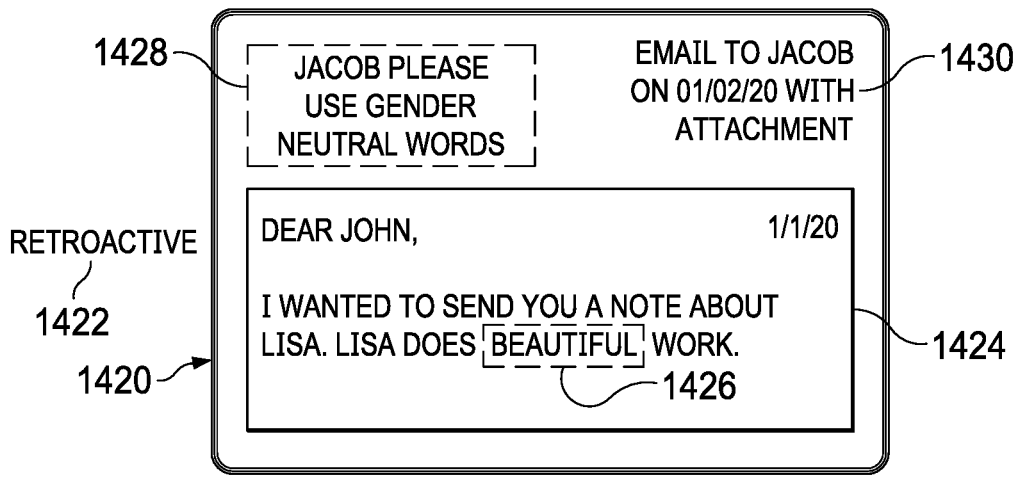

In FIGS. 14A-14C, illustrations of actions taken by the communication monitoring system are shown, according to various embodiments. A first communication monitoring situation 1400 may include a first time period 1402 (e.g., real-time), a first message 1404, a first issue area 1406, and a first remedy action 1408. In this example, the feedback occurs in real time and the first message 1404 includes the phrase "Lisa does beautiful work." In this example, the monitoring system (in real time) has flagged the term beautiful as being the first issue area 1406. Based on flagging this first issue area 1406, the monitoring system generates the first remedy action 1408 which is a message and/or replacement option that states "Please use another term such as great, excellent, professional, etc." A second communication monitoring situation 1410 may include a second time period 1412 (e.g., predictive), a second message 1414, a second issue area 1416, and a second remedy action 1418. In this example, the feedback occurs in a predictive manner (e.g., before the sentence and/or word is finished) and the first message 1404 includes the phrase "a note about the girl Lisa." In this example, the monitoring system (in a predictive manner) has flagged the term girl as being the second issue area 1416. Based on flagging this second issue area 1416, the monitoring system generates the second remedy action 1418 which is a message and/or replacement option that states "Please use gender neutral words". An Nth communication monitoring situation 1420 may include an Nth time period 1422 (e.g., retroactive), an Nth message 1424, an Nth issue area 1426, an Nth remedy action 1428, and a time stamp of the communication. In this example, the feedback occurs in a retroactive manner (e.g., after the communication has been sent) and the Nth message 1420 includes the phrase "Lisa does beautiful work." In this example, the monitoring system (in a retroactive manner) has flagged the term beautiful as being the Nth issue area 1426. Based on flagging this Nth issue area 1426, the monitoring system generates the Nth remedy action 1428 which is a message and/or report replacement option that states "Please use gender neutral words". In this example, the communication is time stamped 1430 to provide better feedback information and/or record keeping.

Figure 15:
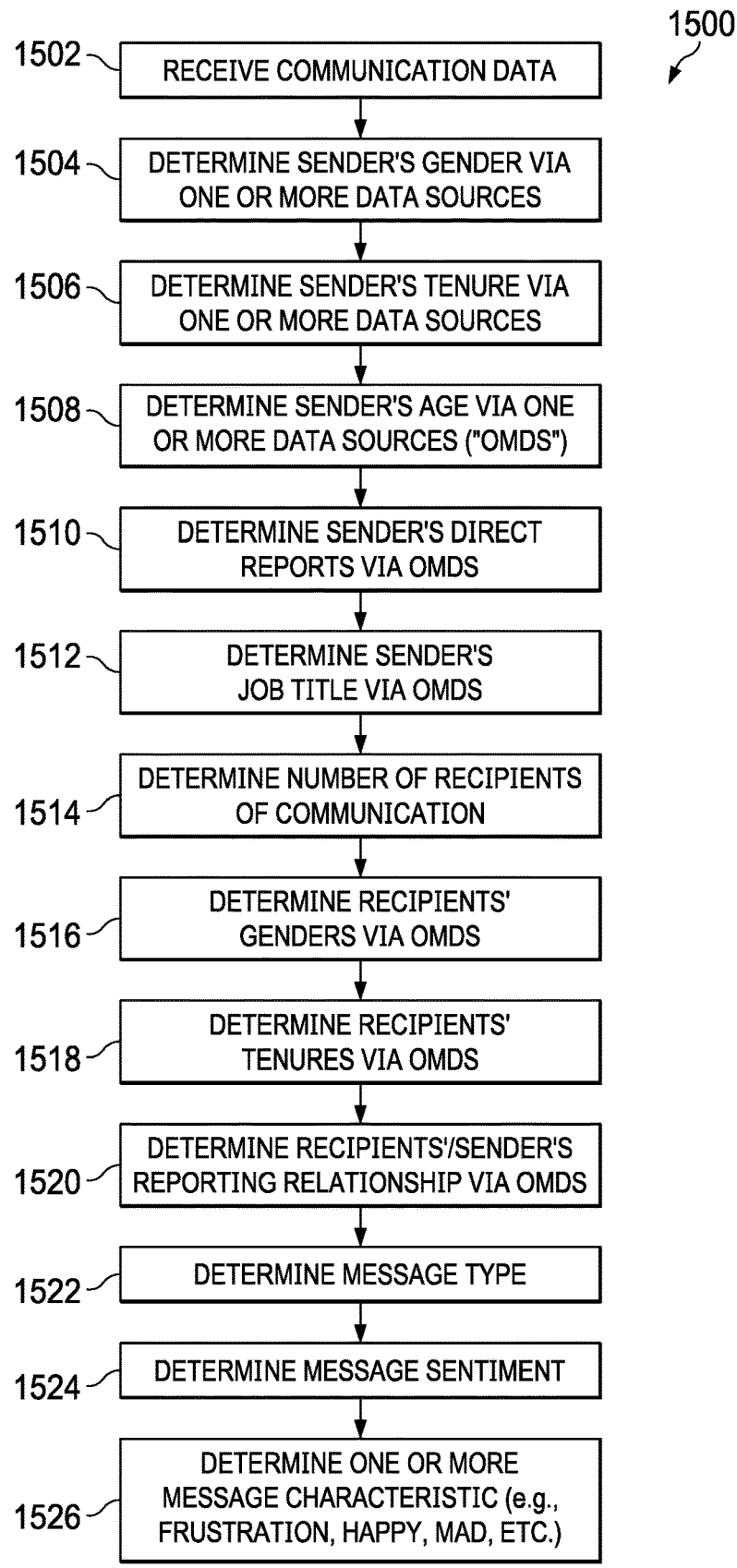
FIG. 15 is another procedural flow chart, according to one embodiment.

In FIG. 15, a communication classification procedural flow chart is shown, according to one embodiment. A method 1500 may include via one or more processors receiving communication data (step 1502). The method 1500 may include via one or more processors determining a sender's gender via one or more data sources (step 1504). The method 1500 may include via one or more processors determining a sender's tenure via one or more data sources (step 1506). The method 1500 may include via one or more processors determining a sender's age via one or more data sources (step 1508). The method 1500 may include via one or more processors determining the sender's direct reports via one or more data sources (step 1510). The method 1500 may include via one or more processors determining a sender's job title via one or more data sources (step 1512). The method 1500 may include via one or more processors determining the number of recipients of the communication data (step 1514). The method 1500 may include via one or more processors determining one or more recipients' gender via one or more data sources (step 1516). The method 1500 may include via one or more processors determine one or more recipients' tenures via one or more data sources (step 1518). The method 1500 may include via one or more processors determining one or more recipients'/sender's reporting relationship via one or more data sources (step 1520). The method 1500 may include via one or more processors determining a message type (step 1522). The method 1500 may include via one or more processors determining a message sentiment (step 1524). The method 1500 may include via one or more processors determining one or more message characteristics (e.g., frustration, happy, mad, etc.) (step 1526).

There can be numerous relationships between the one or more communicator characteristics and one or more recipient characteristics. Some potential characteristics are age, gender, seniority level, tenure, title, underrepresented groups, organization (e.g., Engineering, Marketing, Operations, Manufacturing, Logistics, Sales, etc.), internal group, external group, home country, current country, place of origin, salary, count of direct reports (e.g., size of organization), military or service record, past employment history (e.g., External to Client Company), external government employee, entity of recipient, history of HR issues for the person(s) involved (including ongoing litigation), status of legal holds, past titles/positions (employee or contractor, full time or temp), past positions or former relationships, social capital, and/or any other characteristics disclosed in this document. The communication monitoring system may have the ability to detect words (or phrases, or sentiment, etc.) used in written, oral, or physical communications which can be utilized to determine one or more of the characteristics above.

The communication monitoring system may have access to user information (e.g., demographic, age, gender, protected class) from any source disclosed in this document. In addition, the communication monitoring system may have access to the organizational charts. Further, the communication monitoring system can determine who the communicator (composer, speaker, sender, initiator, etc.) of a missive is. In another example, the communication monitoring system can determine the recipients of a missive. Further, the communication monitoring system can determine that there are multiple recipients of the missive. In addition, the communication monitoring system can analyze whether communication changes depending on the number of recipients. In another example, the communication monitoring system can analyze whether communication changes depending on the age of the recipient(s). Further, the communication monitoring system can determine one or more relationships of the communicator and/or communicator characteristics and recipients and/or recipient characteristics. In addition, the communication monitoring system can analyze whether communication changes depending on the relationship of the communicator (composer, speaker, sender, initiator, etc.) and/or communicator characteristics and recipients and/or recipient characteristics. In one example, this is called "Context".

In one example relating to age, when Bill (age 64) sends an email to William (age 24), the communication monitoring system can identify how older employees speak to younger employees. This is useful because the communication monitoring system can tag this information in training models. Further, this tag can be used to validate whether older employees are communicating effectively with younger employees and vice versa. This effectiveness measure can be a machine learning model.

In one example relating to gender, if a male communicator (composer, speaker, sender, initiator, etc.) sends an email to a female recipient, the communication monitoring system can determine these user characteristics and run special validations for high risk issues like harassment language. the communication monitoring system may also determine if a male communicator (composer, speaker, sender, initiator, etc.) communicates differently when the recipient is female (or male, or if the recipients are a mix of male and female or other gender identities).

In one example relating to seniority level, when a communicator (composer, speaker, sender, initiator, etc.) communicates to a recipient, the communication monitoring system may evaluate the communicator's position in the organization as it relates to seniority. With this information, it is possible to train a model around sentence structure (or phrase, or sentiment, etc.) choice, technical jargon, body language, tone, etc. This information can be evaluated against other individual (or groups of) communications from other communicators (composer, speaker, sender, initiator, etc.) with different seniority. The communication monitoring system may highlight irregularities from senior communicators (composer, speaker, sender, initiator, etc.) or may determine and make available insights on how senior users communicate whether for training purposes or other business uses.

In one example relating to tenure, when a communicator (composer, speaker, sender, initiator, etc.) who has a long tenure (of any length along a distribution), the communication monitoring system may determine the typical characteristics of the communicator's communications. This recipient(s)' tenure may also be evaluated to identify differences, irregularities, similarities, effectiveness, length of communication, tone, body language, sentence structure, etc. of the communication. This can be used to identify risk of employee (or contractor churn). This information can also be used to evaluate a communicator's comfort level in his/her job. This information may be used to develop training materials (for less tenured employees or the communicator him/herself) or identify potential risks to improve overall organizational communication effectiveness.

In one example relating to title, the communication monitoring system may evaluate the title of a communicator or recipient. Relationships based on the titles of the parties involved may be used to determine if titling at the company might have an effect on communication. This information may be used by human resources or people operations to create more effective organizational structures. Moreover, effective communicators of a particular title can be benchmarked against under-performers to improve overall communications within (internal and external) an organization.

In one example, relating to underrepresented groups, the communication monitoring system may identify if a communicator or a recipient is a member of one or more underrepresented groups (whether within the organization or within the broader population). The communication monitoring system may analyze specific communication tendencies of users to identify areas of opportunity when it comes to effectiveness. Further, the communication monitoring system can prevent verbiage that is discriminatory. The communication monitoring system may also identify cases where members of an underrepresented group are unintentionally communicating in an imperfect way as a result of existing discomfort, feelings of uncertainty, and/or lack of psychological safety. These determinations may be made by comparing communications of underrepresented minorities against the majority. This can allow underrepresented groups to have improved voice or say within an organization creating more opportunity for diversity of opinions and overall more effective communications across the organization.

In one example relating to organizations (e.g., Engineering, Marketing, Operations, Manufacturing, Logistics, Sales, etc.), the communication monitoring system may evaluate the organization that a communicator is in. The system may evaluate the recipient(s)' organization as well. This information can highlight whether specific individuals are particularly effective when communicating across organizations. A communicator may be evaluated within his/her group and against other organizations as well as peers when it comes to communications. The insights provided by these evaluations may identify how well a sub-organization communicates as a whole, relative to partner or adjacent organizations, and across organizations. If an organization or individual is communicating in a sub-optimal manner to members inside or outside one's home organization, this may be highlighted. This may be used for training or performance management purposes.

In one example relating to internal group(s) vs. external group(s), the communication monitoring system may be aware of whether the recipient of a communication is internal or external to the client organization. This information may be used to apply specific analysis or rules to the communication. For example, if an internal user is communicating to an external user, specific phrases or information may be eliminated from the communication prior to it being recorded. If a user is using a particular application (e.g., zendesk ticketing client) and the user is speaking to external contractors, the system may prevent the user from communicating certain concepts or internal information (e.g., phrasing indicative of an employment relationship or proprietary or confidential information).

In one example relating to home country or current country or place of origin, the communication monitoring system may determine that a communicator is a resident of the United States and an employee of a US entity via one or more data sources disclosed in this document. The system may further identify that the recipient is a resident of a foreign country or an employee of a foreign entity. The system may apply special rules to the communication. For example, information that the US entity does not want to leave the country or being sent to foreign nationals may be redacted (or a user interface component warning the users of certain risks or a training module may be served in real time) to prevent entity (client) rules from being violated. This is particularly valuable for government contracting firms.

In one example relating to salary, the communication monitoring system may have access to the salary data of communicators and recipients via one or more data sources disclosed in this document. This information may be analyzed to determine the patterns and communication habits of high salaried individuals and/or low salaried individuals (across a spectrum). Machine learning models relating to how these individuals communicate can be extrapolated and applied for training or benchmarking purposes. Further, cultural biases that exist may be identified and the system may also determine whether they are toxic to internal culture (and highlight as much to management).

In one example relating to count of direct reports (e.g., size of organization), the communication monitoring system may have knowledge of how large or small a communicator's organization is (count of direct reports, seniority of direct reports, and other characteristics, etc.) via one or more data sources disclosed in this document. This information may be used to identify the communication characteristics of individuals with managerial duties. The system may highlight patterns to management or identify opportunities for training using this information.

In one example relating to military or service record or past employment history (external to client's company), the communication monitoring system may have knowledge of a communicator or recipient's past employment history. Communications involving these parties may be analyzed and evaluated for effectiveness. This information may be used to create a more beneficial environment for veterans or may be used to create training modules to help organizations take advantage of veterans' vast experience in the business world. Furthermore, if certain organizations have over-representation from specific past companies, the system may evaluate how well these individuals are being incorporated in the cultural communication of the larger organization (especially valuable post acquisition or post-M&A activity).

In one example relating to external government employee, the communication monitoring system may have knowledge of whether a communication is directed towards an employee of the United States government (federal, state, or other) via one or more data sources disclosed in this document. This information may be used to apply specific rules to the communication based on automated rules or rules that have been established by the client. The system may highlight risks to management, prevent the communication, alter the communication, or provide immediate (or after-the-fact) warnings, trainings, or other user interface components to improve the communication.

In one example relating to entity of recipient, the communication monitoring system may have knowledge of a recipient's parent organization (if external). For example, if the recipient is an employee or is affiliated with a competing organization, the system may apply specific rules to the communication. For example, if a member of Yahoo's search team is communicating with an employee of Google or a similar competitor in the industry, the system may apply specific rules to the communication, may prevent it entirely, may display a warning message, may make recommendations to the communicator at the time of communication, before sending, or after the fact.

In one example relating to history of human resource issues for the person(s) involved (including past and/or ongoing litigation), the communication monitoring system may have information relating to the past job performance of the communicator or recipient. This information may be used to aid in the communication's effectiveness. If Bill has a history of performance issues when he receives communications that are demanding, the system may nudge the communicator to choose alternative language to improve overall effectiveness and create a more productive workplace.

In one example relating to status of legal holds, the communication monitoring system may have knowledge of whether persons involved are subject to ongoing litigation holds. This information may be used to apply specific rules to communication. For example, if an individual is on a legal hold involving entity X, that individual may be prevented from sending communications using specific troubled language, or may be prevented from communicating with counterparties in the litigation (including lawyers). The system may also apply logic that promotes the use of attorney client privilege at the discretion of the super administrator or the specific configuration requirements of the client.

In one example relating to past titles/positions (employee or contractor, full time or temporary), the communication monitoring system may be aware of a communicator(s)' or recipient(s)' past relationships with the client entity via one or more data sources disclosed in this document. This information may be used to apply specific rules or logic based on client preferences or automated rules. For example, if a recipient is a former employee but now acts as a contractor, the system may nudge the communicator to avoid specific language that would violate the client entity's wishes as it relates to employee/contractor relationships and the language used with those relationships. Furthermore, the system may be aware of an individual's former employment with a government entity. The system may apply specific rules as it relates to the transmission of proprietary information in the current capacity of the communicator or recipient.

In one example relating to past positions or former relationships, the communication monitoring system may be aware of an individual's past positions, employment relationships, etc. The system may use this information to enforce client rules around the transmission of proprietary information and what is appropriate to send. For example, if a past government employee has been recently hired and sends him/herself information that may be deemed to be proprietary to the government (or past entity), the system can highlight this information, prevent the transmission, or take other measures to de-risk the situation.

In one example relating to social capital, the communication monitoring system may have knowledge of the communicator(s)' or recipient(s)' social capital. This may include social followers (twitter, LinkedIn, Facebook, web page hits, status within social organization, internet "verified" status, Instagram followers, potential reach of communications, number of twitter posts, use of hashtags, etc.). This information may be used to alert individuals (or management) to the potential implications of certain communications. For example, if a social media manager is communicating with a known troll or a journalist or an individual with a significant social following or a publicly elected official, the system may provide some user interface component that alerts a communicator of this fact. Further, the system may apply special rules to the communication in either an automated or configured manner at the discretion of the client.

In another example, body health metrics, such as, body temperature, heart rate, eye dilation, etc. may be utilized by the communication monitoring system.

In FIG. 16, a confidence procedural flow chart is shown, according to one embodiment. A method 1600 may include generating a first noun, a first verb, a first adjective, and/or a first adverb with a first weight/confidence level (step 1602). The method 1600 may include generating a second noun, a second verb, a second adjective, and/or a second adverb with a second weight/confidence level (step 1604). The method 1600 may include generating an Nth noun, an Nth verb, an Nth adjective, and/or an Nth adverb with an Nth weight/confidence level (step 1606). In one example, the communication monitoring system may apply a 20% confidence level to the word dog (e.g., a first noun), a 70% confidence level to the word cow (e.g., a second noun), a 50% confidence level to the word overweight (e.g., a first adjective), a 60% confidence level to the word fat (e.g., a second adjective), an 80% confidence level to the word ugly (e.g., a third adjective), a 50% confidence level to the word wobble (e.g., a first verb), and/or 50% confidence level to the word slow (e.g., a first adverb).

In FIG. 17, a rules procedural flow chart is shown, according to one embodiment. A method 1700 may include developing a rule structure (step 1702). The method 1700 may include creating one or more annotations relating to one or more nouns (step 1704). The method 1700 may include creating one or more annotations relating to one or more verbs (step 1706). The method 1700 may include creating one or more annotations relating to one or more adjectives (step 1708). The method 1700 may include creating one or more annotations relating to one or more adverbs (step 1710). A harassment rule may have a 70% level to trigger a flag. Therefore, only the term ugly by itself would trigger this flag. However, the combination of do and overweight may have a combined confidence level of 65% which would not trigger the flag but a combination of dog and fat may have a combined confidence level of 72% which would trigger the flag. In addition, a combination of the terms slow, wobble, cow, and fat would obtain a 95% confidence level which would trigger a flag.

In FIG. 18, a communication monitoring procedural flow chart is shown, according to one embodiment. A method 1800 may include receiving communication data (step 1802). The method 1800 may include converting the received communication data into machine-readable representation (step 1804). The method 1800 may include tagging the machine-readable representation with one or more annotations (step 1806). The method 1800 may include applying one or more rule engines (step 1808). The method 1800 may determine via one or more processors whether an issue has occurred (step 1810). If there is no issue generated, then the method 1800 may include storing the data (step 1814). If there is an issue generated, then the method 1800 may include initiating one or more actions (step 1812).

Figure 19:
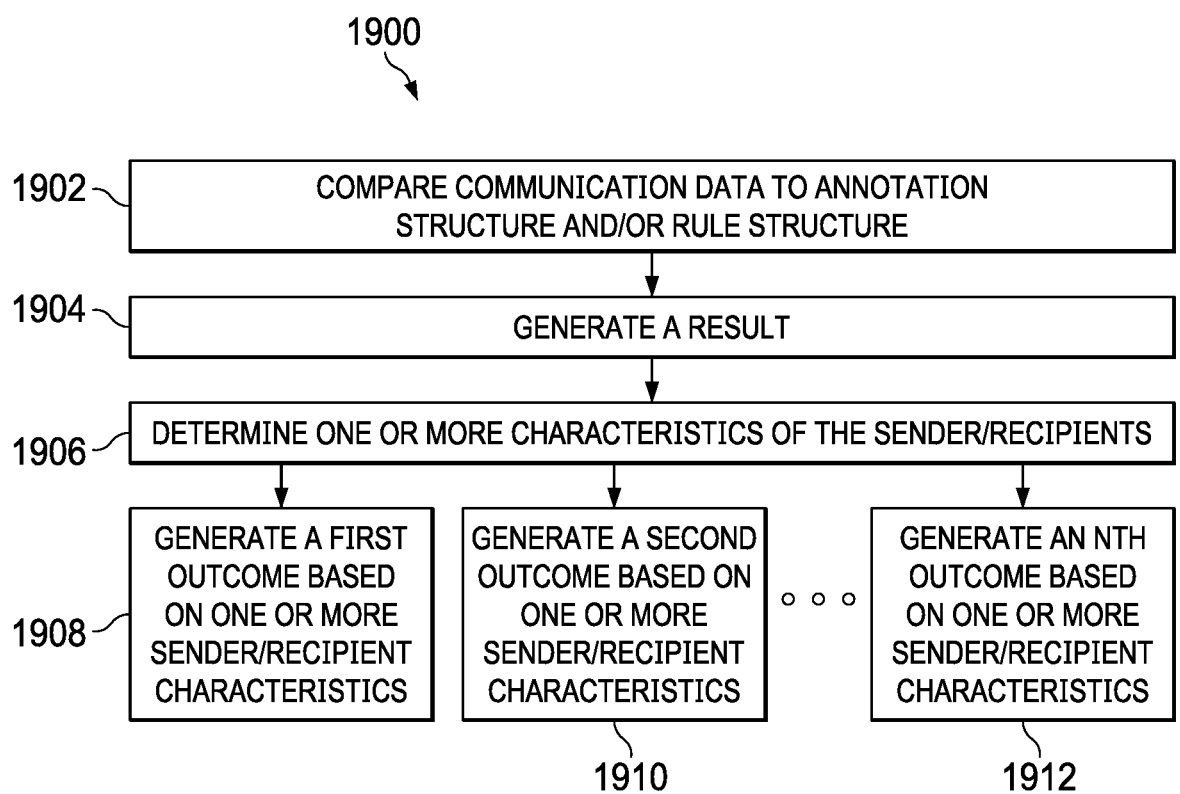
FIG. 19 is another procedural flow chart, according to one embodiment.

In FIG. 19, a communication monitoring procedural flow chart is shown, according to one embodiment. A method 1900 may include comparing communication data to annotation structure and/or rule structure (step 1902). The method 1900 may include generating a result (step 1904). The method 1900 may include determining one or more characteristics of the sender and/or recipients (step 1906). The method 1900 may include generating a first outcome based on one or more sender and/or recipient characteristics (step 1908). The method 1900 may include generating a second outcome based on one or more sender and/or recipient characteristics (step 1910). The method 1900 may include generating an Nth outcome based on one or more sender and/or recipient characteristics (step 1912). In various examples, a male worker may send a communication that states "Let's have a working dinner and/or go for drinks". Based on a first outcome (e.g., both the sender and the recipient being males), the message is sent without a warning. Based on a second outcome (e.g., the sender is male and the recipient is female), the message may generate a warning before being sent out. Based on an Nth outcome (e.g., the sender is male and the recipient is female and is in litigation for harassment against the sending mail), the message is not sent and flagged.

Figure 20A:
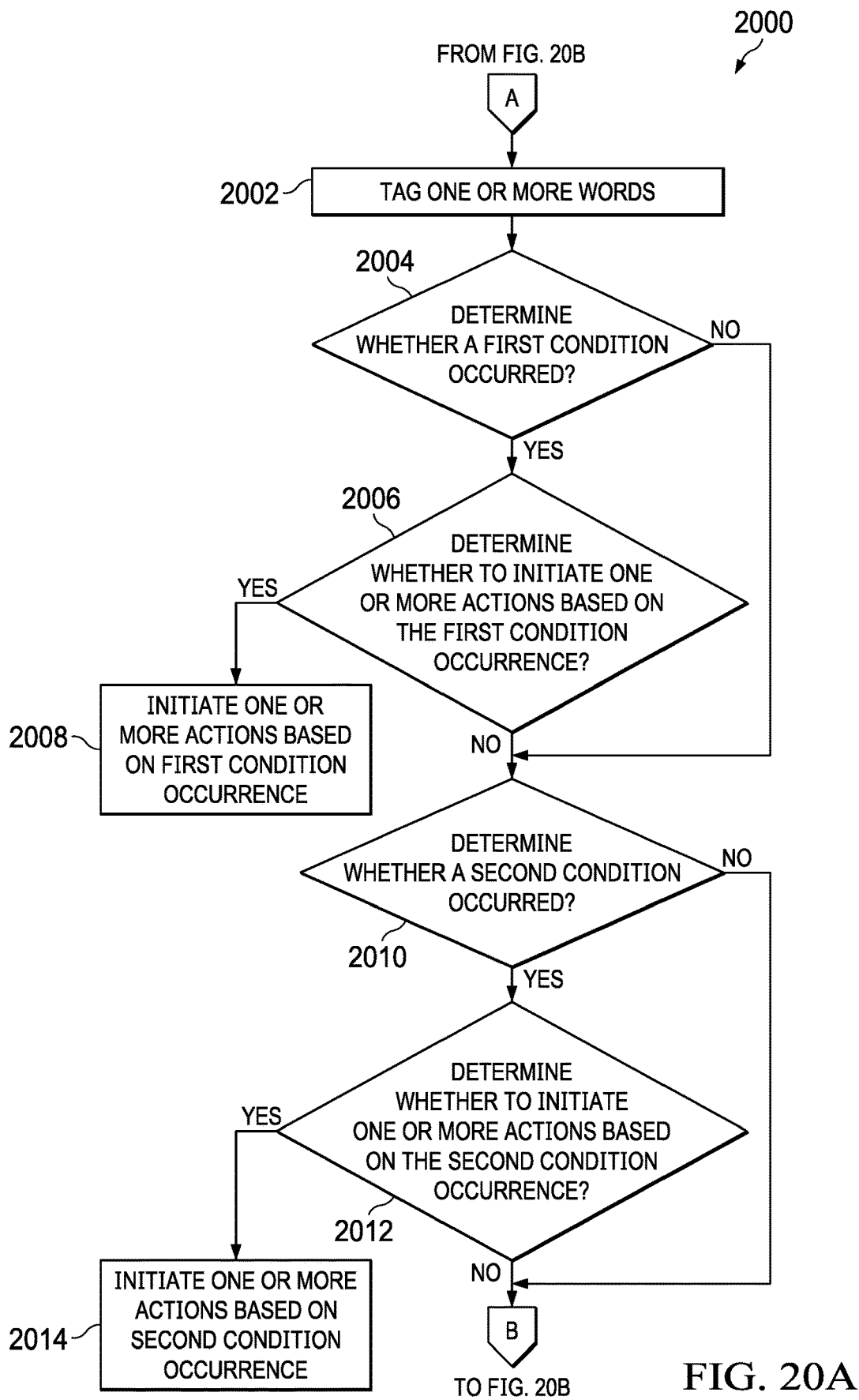
FIGS. 20A-20B is another procedural flow chart, according to one embodiment.
Figure 20B:
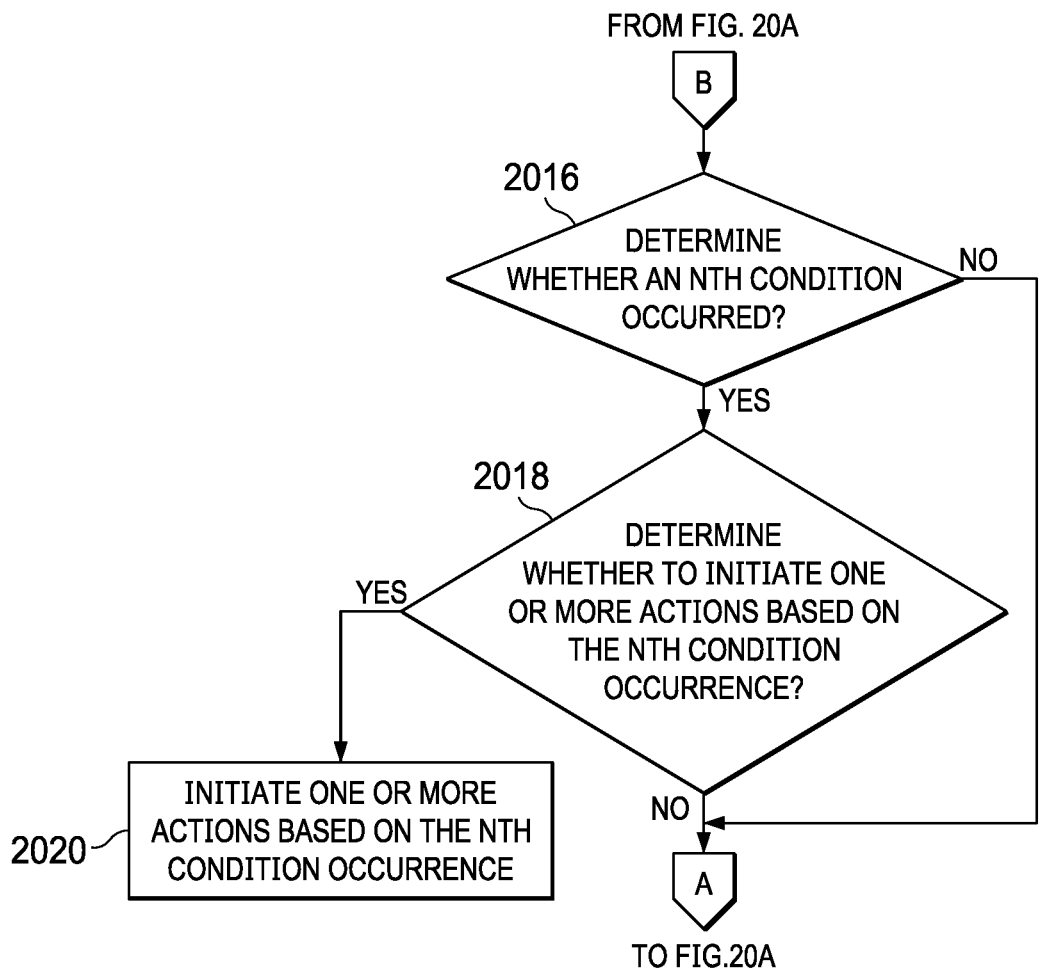

FIGS. 20A-20B, a communication monitoring procedural flow chart is shown, according to one embodiment. A method 2000 may include tagging one or more words (step 2002). The method 2000 may include determining via one or more processors whether a first condition has occurred (step 2004). If the first condition has not occurred, then the method 2000 moves to step 2010. If the first condition has occurred, then the method 2000 may include the one or more processors determining whether to initiate one or more actions based on the first condition occurring (step 2006). If the one or more actions are to be taken, then the method 2000 may include initiating one or more actions based on the first condition occurrence (step 2008). If the one or more actions should not be taken, then the method 2000 may include the one or more processors determining whether a second condition has occurred (step 2010). If the second condition has not occurred, then the method 2000 moves to step 2016. If the second condition has occurred, then the method 2000 may include determining whether to initiate one or more actions based on the second condition occurring (step 2012). If the one or more actions are to be taken, then the method 2000 may include initiating one or more actions based on the second condition occurrence (step 2014). If the one or more actions should not be taken, then the method 2000 may include the one or more processors determining whether an Nth condition has occurred (step 2016). If the Nth condition has not occurred, then the method 2000 moves to step 2002. If the Nth condition has occurred, then the method 2000 may include determining whether to initiate one or more actions based on the Nth condition occurring (step 2018). If the one or more actions are to be taken, then the method 2000 may include initiating one or more actions based on the Nth condition occurrence (step 2020). If the one or more actions should not be taken, then the method 2000 may move back to step 2002. In one example, a first condition is met because a recipient is an under-represented group but no action is taken. Further, a second condition is met because the communication monitoring system determines that the language utilized is belittling and a warning and/or flag is created. In addition, an Nth condition is met because the communication monitoring system determines that the message utilizes threating language. Therefore, the communication monitoring system may stop the communication, alter the communication, and/or flag the communication.

Figure 21:
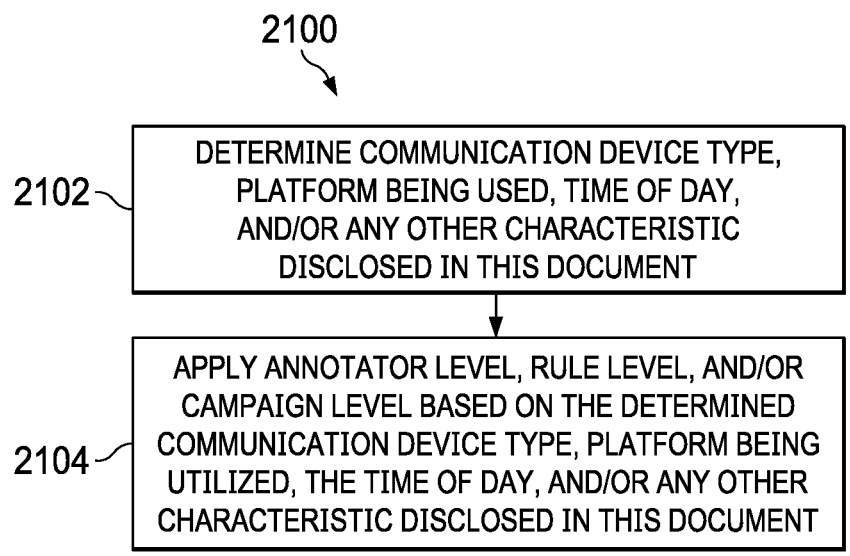
FIG. 21 is another procedural flow chart, according to one embodiment.

In FIG. 21, a communication monitoring procedural flow chart is shown, according to one embodiment. A method 2100 may include determining a communication device type, a location of the communication device, a platform being used, a time of day, and/or any other characteristic disclosed in this document (step 2102). The method 2100 may include applying an annotator level, rule level, and/or campaign level based on the determined communication device type, the platform being used, the time of day, and/or any other characteristic disclosed in this document (step 2104). In one example, a mobile device is being utilized at a bar via the texting function at 2 AM to a person of the opposite sex of the user of the device, the communication monitoring system may flag this communication, stop this communication, and/or take any other action disclosed in this document.

In one embodiment, a system may include: one or more processors and at least one memory device where the one or more processors may receive communication data and convert the received communication data into a machine representation of the received communication data. Further, the one or more processors may utilize one or more annotators with the machine representation of the received communication data to generate an annotated machine representation of the received communication data. In addition, the one or more processors may compare the annotated machine representation of the received communication data to one or more rule engines and transmit an initiation action signal based on the comparison of the annotated machine representation of the received communication data to the one or more rule engines.

In one example, the initiation action signal is implemented in a real time action. In other examples, the real time action includes a language suggestion, a warning, a quarantining of one or more messages, a disabling of a communication device, and/or any other action disclosed in this document. In another example, the initiation action signal is implemented in a retroactive action. Further, a sensitivity procedure and/or a confidence level procedure may be utilized as detailed in the specification. In other examples, the retroactive action includes a first time period report, an index communication list, a historical report, a training class option, a real-time training class, a scheduled training class, and/or any other action disclosed in this document. In another example, the initiation action signal is implemented in a predictive action. In other examples, the predictive action includes a language suggestion, a warning, a quarantining of one or more messages, an approval level requirement, a disabling of the one or more messages, a disabling of a communication device and/or any other action disclosed in this document. Further, the sensitivity procedure and/or the confidence level procedure as detailed in the specification may be utilized with any example disclosed in this document. In another example, based on the predictive action being one of the quarantining of one or more messages, the approval level requirement, the disabling of the one or more messages, or the disabling of the communication device, the one or more processors may transmit an approval requirement signal to a review process. This approval procedure may be automated and/or involve human interaction.

In another embodiment, an apparatus may include: one or more processors and at least one memory device where the one or more processors may receive communication data and convert the received communication data into a machine representation of the received communication data. Further, the one or more processors may obtain data from a contractor data source, a corporation data source, a court data source, a legal data source, a social capital data source, a human resources data source, a contract data source, Internet data, one or more sensors, one or more cameras, one or more body devices, one or more microphones, a governmental data source, and/or any other data source disclosed in this document. The one or more processors may utilize one or more annotators with the machine representation of the received communication data to generate an annotated machine representation of the received communication data. The one or more processors may compare the annotated machine representation of the received communication data to one or more rule engines. The one or more processors may transmit an initiation action signal based on the comparison of the annotated machine representation of the received communication data to the one or more rule engines.

In another example, a first annotator is a gender of a sender of the communication data. In another example, the first annotator was derived from data received from the human resources data source. In another example, a second annotator is a country of origin of a first recipient of the communication data. In various examples, the country of origin may be based on Internet Protocol (IP) address and/or other data source in specification. In another example, a third annotator is based on one or more characteristics of a message in the communication data. In another example, the one or more characteristics of the message may be determined via an annotator protocol applied to the communication data.

In another embodiment, a device may include: one or more processors; one or more memory devices including one or more modules; and a transceiver configured to receive communication data. The one or more processors may dissect the received communication data into one or more elements where the one or more elements are a subset of one or more communication elements. The one or more processors may obtain data from a contractor data source, a corporation data source, a court data source, a legal data source, a social capital data source, a human resources data source, a contract data source, Internet data, one or more sensors, one or more cameras, one or more body devices, one or more microphones, a governmental data source, and/or any other source disclosed in this document. The one or more processors may utilize one or more annotators with the one or more elements to generate an annotated representation of the one or more elements. The one or more processors may compare the annotated representation of the one or more elements to one or more rule engines. The one or more processors may transmit an initiation action signal based on the comparison of the annotated representation of the one or more elements to the one or more rule engines.

In another example, the one or more processors may initiate one or more actions from the device based on a time of day, a device location, a device type, a recipient data, a message type, a sender type, a sender's history, a sender's data, the sender type and sender location, a recipient type, a recipient's history, a recipient's data, the receipt type and a recipient location, and/or any other characteristic disclosed in this document. In another example, the one or more actions may include restricting communications which includes disabling the device, blocking a communication package, and/or transmitting the communication package to an approval level. In another example, the communication package is the received communication data. In another example, the communication package is a subset of the received communication data.

Figure 23:
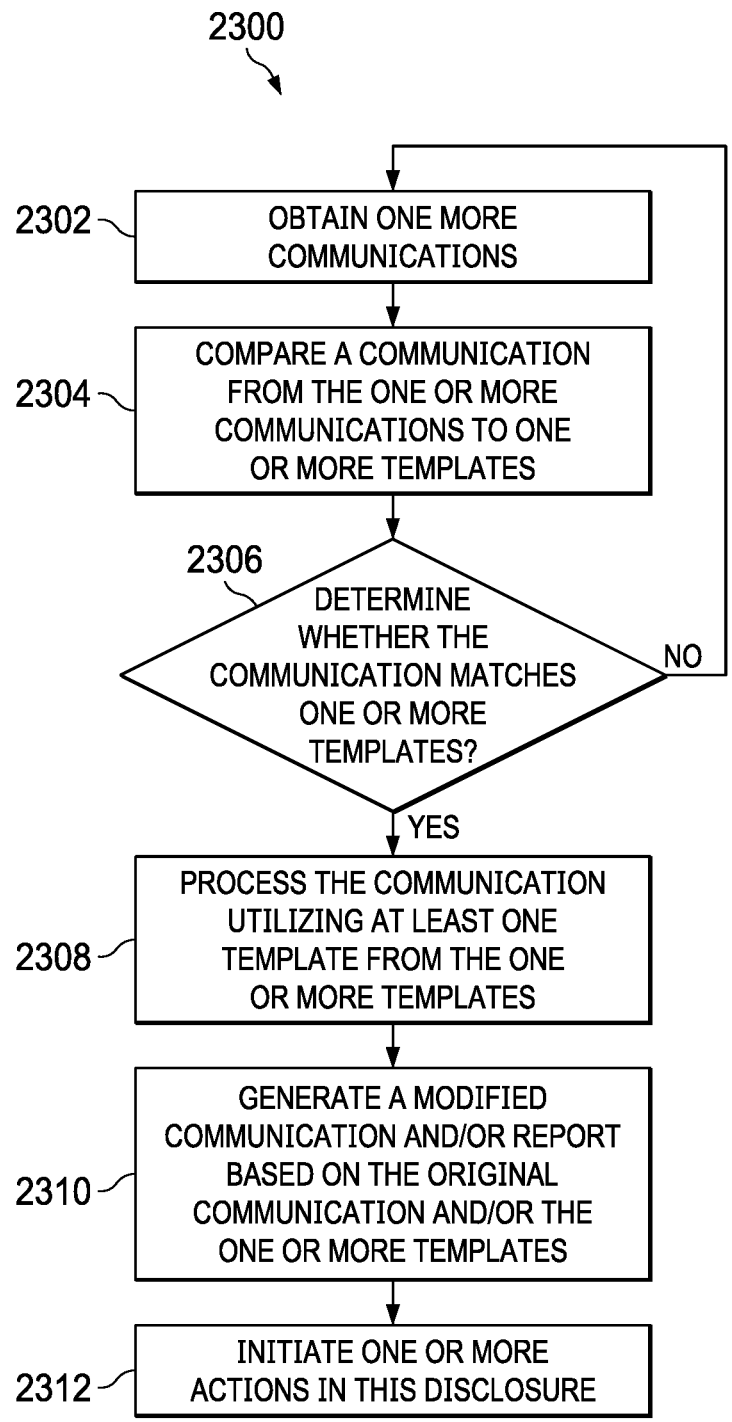
FIG. 23 is a flow diagram, according to one embodiment.

In FIG. 23, a flow diagram is shown, according to one embodiment. A method 2300 may include obtaining one or more communications (step 2302). The method may include comparing a communication from the one or more communications to one or more templates (step 2304). The method 2300 may include one or more processors determining whether the communication matches one or more templates (step 2306). If the communication does not match one or more templates, then the method 2300 moves back to step 2302. If the communication matches one or more templates, then the method 2300 may include processing the communication utilizing at least one template from the one or more templates (step 2308). The method 2300 may include generating a modified communication and/or report based on the original communication and/or the one or more templates (step 2310). The method 2300 may include initiating one or more actions disclosed in this disclosure (step 2312). In FIG. 23, an automatic template and extraction process is shown. Programmatic emails are sent and received from specific companies (emails and/or any other data may come from anywhere and the system is able to compare them to templates and to other emails to identify if a new template should be created). These emails are created by a computer and follow standard templates (for each company). The systems, devices, and/or methods in this disclosure are able to identify these emails and understand them as templates. For example, an email from Company A containing a list of available appointments will be identified as a "template" and a different email looking different from Company B also containing a list of appointments will similarly be identified as the same "template" (or form factor). The system's ability to identify these emails as fundamentally the same "template" allows the system to programmatically act on the emails. In another example, an email from Company A which details a purchase of item(s) can be matched up with an email from Company B which details a sale of the same purchased item(s) and/or a portion of the purchase item(s). In another example, Company A has a form for shipping items that Company A sells and Company B has a form for logistics for items it ships. In this example, the system can identify both forms and integrate them to have Company B pick up and deliver products that Company A sells.

Figure 24:
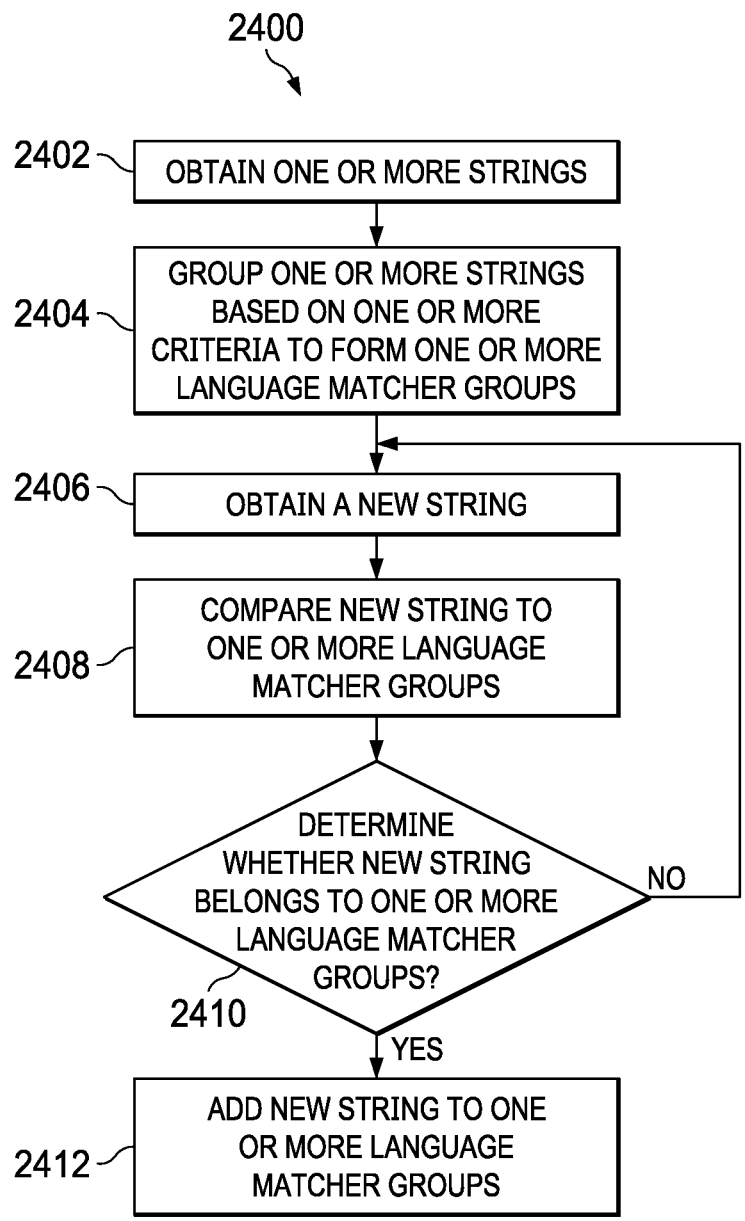
FIG. 24 is a flow diagram, according to one embodiment.

In FIG. 24, a flow diagram is shown, according to one embodiment. A method 2400 may include obtaining one or more strings (step 2402). The method 2400 may include grouping one or more strings based on one or more criteria to form one or more language matcher groups (step 2404). The method 2400 may include obtaining a new string (step 2406). The method 2400 may include comparing the new string to the one or more language matcher groups (step 2408). The method 2400 may include one or more processors determining whether the new string belongs to one or more language matcher groups (step 2410). If the new string does not belong to the one or more language matcher groups, then the method 2400 may move back to step 2406. If the new string does belong to the one or more language matcher groups, then the method 2400 may include adding the new string to one or more language matcher groups (step 2412). In FIG. 24, a language matcher procedure, according to one embodiment. In one example, a system for providing a representation of interhuman communication is utilized. In this example, the system identifies words or word groups or strings or string groups (that may be syntactically conceptually, or grammatically-related) that represent specific concepts or ideas. In this example, the system replaces the original language with a label representing the original concept or idea. Although the original language is left behind (intelligently removed) the syntactic structure is maintained, allowing the system to maintain an understanding of how the ideas interact with one another. In one example, the benefits of abandoning the original language come in the form of increased system speed and reduced computational requirements. In this example, this final representation may be referred to as an Idea Graph.

This example highlights several key points which are: the original language used to represent the idea is irrelevant (It does not matter what diction or even language (French, English, Spanish, etc.) is used or whether it is non-standard language (e.g., emoji's)); ideas are identified through a combination of strategies: a) language matchers—look for specific words/word groups; b) based on Lemma; c) part of speech; d) entity type which may include: 1) CARDINAL; 2) DATE; 3) EVENT; 4) FAC; 5) GPE; 6) LANGUAGE; 7) LAW; 8) LOC; 9) MONEY; 10) NORP; 11) ORDINAL; 12) ORG; 13) PERCENT; 14) PERSON; 15) PRODUCT; 16) QUANTITY; 17) TIME; 18) WORK_OF_ART; 19) any other entity type in this disclosure; and/or any combination thereof; e) Identifiers—aggregations of matchers; f) Artificial Intelligence—Using artificial intelligence to enable the identification of ideas based on prior training; g) any other procedure and/or item and/or feature disclosed in this document; and/or h) any combination thereof. The system can also decide whether an annotation should always happen, sometimes happen, persist for a very short while, persist for a long period of time, and/or any combination thereof. This may be selected and/or completed based on computational efficiency.

An example of using artificial intelligence may be if an author writes a list of beverages, (e.g., the list of beverages we sell includes Coke, Pepsi, Dr. Pepper, and Sprite), the system has an understand that the author has identified the below as a list, the classification of said list is "beverages," and the system may have an understanding that Coke, Pepsi, and Dr. Pepper are beverages and can intelligently speculate that Sprite should be added to that understanding. The system can also evaluate other uses of the word "Sprite" to increase (or decrease) the system's confidence of Sprite being a beverage. For example, the sentence he behaves like a sprite would decrease the confidence that sprite is a beverage. Whereas, I drink Sprite would increase the confidence that sprite is a beverage. Further, the system may be able to store the ideas represented in a communication without storing the original language. For example, the sentence "the list of beverages we sell includes Coke, Pepsi, Dr. Pepper, and Sprite" can be represented as a mention of a beverage even after the original sentence has been deleted. In another example, the idea graph may allow business rules to be applied to human communication without understanding the language that was used. In addition, the idea graph allows humans to construct models without any specialized training.

In another embodiment, the system may build idea graphs that represent all key ideas in a communication or only identify specific pre-configured ideas. For example, a system administrator may desire to evaluate a specific communication using a specific set of rules from the rules engine. In this example, the idea graph can represent the communication within the bounds of the user's requirements as dictated by the rules engine. Further, the same communication can be visualized through different rules "lenses." For example, review communication data alpha utilizing lenses 1 (e.g., specific criteria 1 defines lenses 1) or the reviewing of communication data alpha can be accomplished by using lenses Nth (e.g., specific criteria Nth defines lenses Nth which is different than the specific criteria 1 which defined lenses 1).

In addition, the system may allow users (or automatically—acting on its own) to evaluate/review the idea graph for relevance, privilege, or meaning while obfuscating the original language, which can protect the privacy or anonymity of the author and recipients. More acutely, we can use the rules engine to DEFINE or mark "privileged, responsive, or relevant".

In one example, the system may be built using the following steps: Text normalization which is the process by which the system transforms the text into its component parts as represented by a canonical list of words or forms; Tokenization which is the process by which the system splits the communication into smaller, more digestible units; Spelling Normalization which is the process by which the system identifies spelling abnormalities and represents them as related to (or the same as) the correct spelling of a word, phrase, or token; Lemmatization which is the process of morphologically analyzing words and representing them in their base or dictionary forms (the Lemmatization process often includes removing inflectional endings of words); Named Entity Recognition which is the process by which the system identifies named entities (for example, proper nouns); Idea Identification (Annotation) which is the process by which the system identifies ideas or concepts present in the communication; Information Removal (Remove all non-essential information); Original Language which is the process by which the system operates on the idea graph (the original language need not be stored or saved for the future needs of the system); Non-Relevent structure which is the process by which the system removes "filler" words (or other information that is not needed—punctuation, improper spacing, etc.) that may or may not be grammatically correct, but do not alter the meaning of the communication or add value in a meaningful way; Storage which is the process by which the system, after analyzing and affecting the communication, stores only the relevant information for future operations; and/or any other process disclosed in this document.

In another example, match language may be based on words or parts of words or strings or part of stings. For example, when given a list of words, the system can find those words in communications and annotate appropriately. Using basic word matching on the word "war" will trigger an alert on the word "software" because it contains the word "war" which is a false positive.

In another example, match language may be based on token(s). For example, when given a list of tokens (words or phrases) the system can find those tokens in communications and annotate appropriately.

In another example, match language may be based on entity type(s). For example, the system can annotate that "Wells Fargo" is a bank.

In another example, match language may be based on part of speech(es). For example, the system can annotate that "Wells Fargo" is a proper noun.

In another example, match language and/or rules may be based on relationship(s). For example, the system can annotate that "Wells Fargo" operates on the token "money" in the sentence "Wells Fargo loans money."

In another example, various types can be used which can be: adjacent_tokens; keyword; regex; token; token_with_modifier; url; and/or any other data in this disclosure.

In another example, match language may be based on identifiers. In this example, the system may convert words and/or replace language with an "Annotation". For example, the system strips away the original communication and operates only on the annotations that have been added.

In another example, match language may be based on annotation. In various examples, Firing_language: represents the idea of firing an employee (technically, the verb firing and the noun contractor and their relationship represents this idea); Scolding_language: represents the idea of scolding someone; and/or any other communication interaction in this disclosure. These represent an idea in inter human communication.

In another example, match language (and/or match decision) may be based on links which may represent the relationship between annotations. The system looks for the presence of A, the presence of B, and the link between A and B (e.g., C), then evaluates the totality. For example, (ANNOTATION_A, NOUN) is the subject of a sentence with (ANNOTATION_B,VERB).

Figure 37:
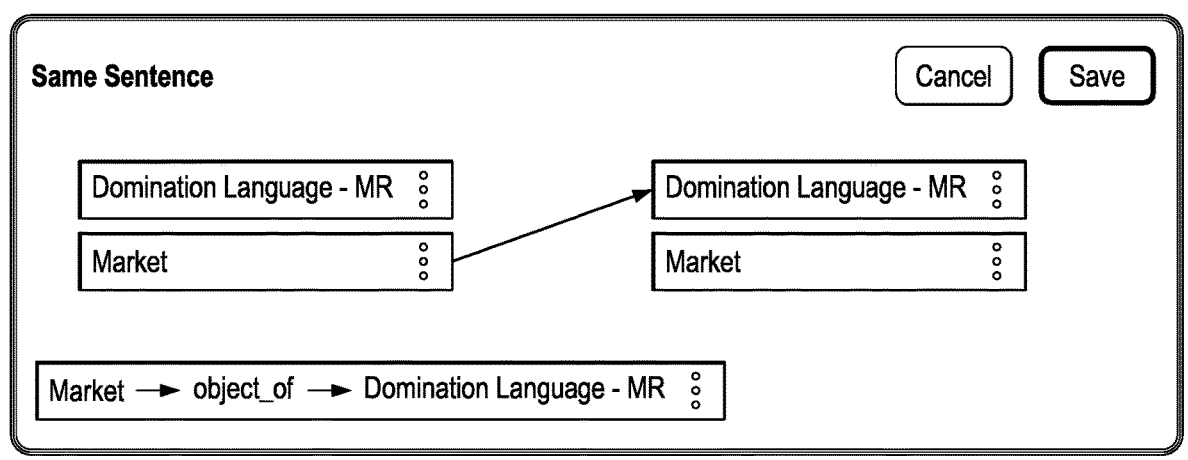
FIG. 37 is an example of a language matcher relationship, according to one embodiment.

An Example of a Language Matcher Relationship may be the concept of a "market" is expressed as a language matcher. A number of tokens (words/phrases) that represent ideas relating to a specific type of market (e.g., currency market) where as domination language is a number of tokens that represent the concept of "dominating." In this relationship example, the concept of a market is the object of the dominating language. FIG. 37 is an example of a language matcher relationship, according to one embodiment.

Another example of the process shown in FIG. 24 is a sentence of we fly to Ashville, Houston, Reno, Boston, and Portland. The system may already know that Company A flies to Houston, Reno, Boston, and Portland which are all cities. However, Ashville was not in this language matcher group before but will now be added (with a varying level of confidence) to the language matcher group of cities and the language matcher group of cities Company A files to.

Figure 25:
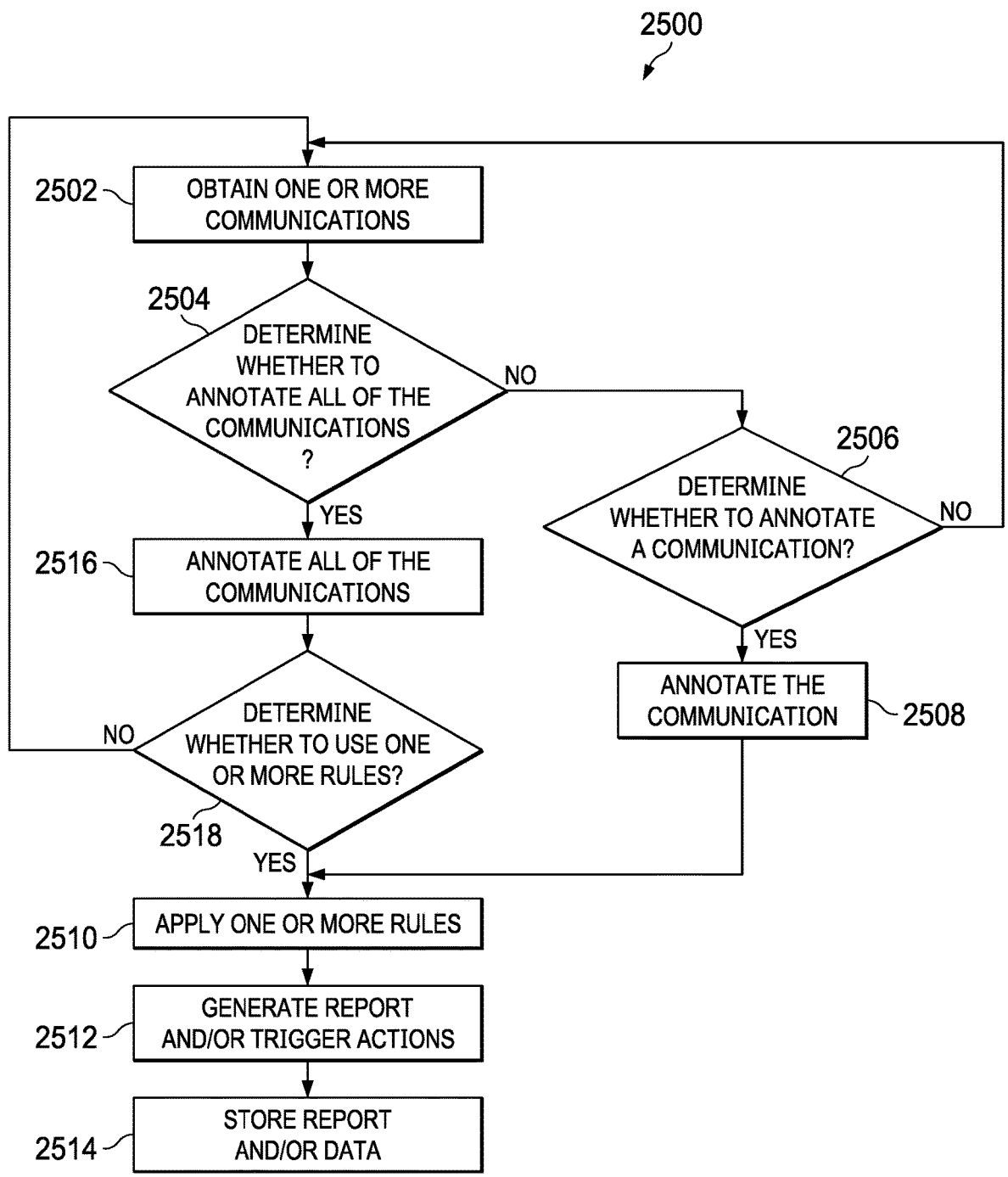
FIG. 25 is a flow diagram, according to one embodiment.

In FIG. 25, a flow diagram is shown, according to one embodiment. A method 2500 may include obtaining one or more communications (step 2502). The method 2500 may include determining via one or more processors whether to annotate all of the obtained communications (step 2504). If the one or more processors determines that all of the obtained communications should not be annotated, then the method 2500 may include determining via the one or more processors whether to annotate any communications (step 2506). If no communications should be annotated, then the method 2500 may move back to step 2502. If a communication should be annotated, then the method 2500 may include annotating via one or more processors the communication (step 2508). The method 2500 may include applying one or more rules to the annotated communication (step 2510). The method 2500 may include generating a report(s) and/or triggering any action disclosed in this document (step 2512). The method 2500 may include store the report(s) and/or any other data (step 2514). Referring to step 2504, if the one or more processors determines that all of the communications should be annotated, then the method 2500 may include annotating all of the communications (step 2516). The method 2500 may include determining via one or more processors whether to utilize one or more rules on all of the annotated communications (step 2518). If the one or more processors determines that no rules should be utilized on all of the annotated communications, then the method 2500 may move back to step 2502. If the one or more processors determines that one or more rules should be utilized on all of the annotated communications, then the method 2500 may include applying one or more rules to all of the annotated communications (and/or a portion thereof) (step 2510). The method may include generating a report(s) and/or triggering any action in this disclose to all of the annotated communications (and/or a portion thereof) (step 2512). The method 2500 may include storing the report(s) and/or data relating to all of the annotated communications (and/or a portion thereof) (step 2514).

Figure 26:
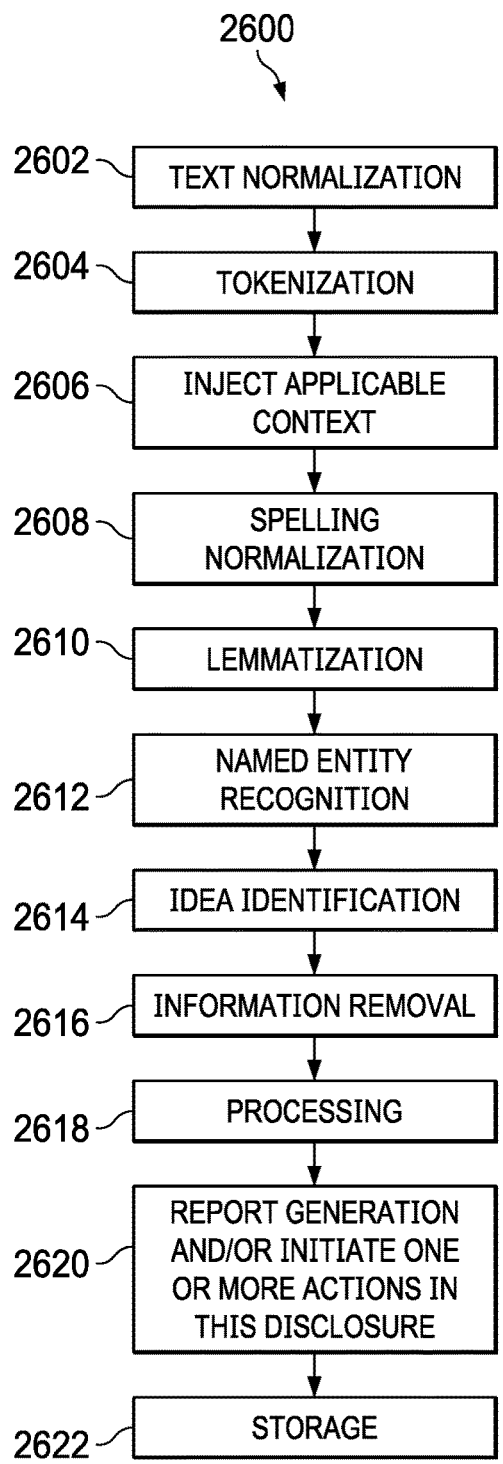
FIG. 26 is a flow diagram, according to one embodiment.

In FIG. 26, a flow diagram is shown, according to one embodiment. A method 2600 may include the function of text normalization of one or more strings, one or more words, one or more documents, one or more communications, one or more data, any other information in this disclosure, and/or any combination thereof (step 2602). The method 2600 may include the function of tokenization of one or more strings, one or more words, one or more documents, one or more communications, one or more data, any other information in this disclosure, and/or any combination thereof (step 2604). The method 2600 may include the function of injecting applicable context (step 2606). The method 2600 may include the function of spelling normalization of one or more strings, one or more words, one or more documents, one or more communications, one or more data, any other information in this disclosure, and/or any combination thereof (step 2608). The method 2600 may include the function of lemmatization of one or more strings, one or more words, one or more documents, one or more communications, one or more data, any other information in this disclosure, and/or any combination thereof (step 2610).

The method 2600 may include the function of named entity recognition of one or more strings, one or more words, one or more documents, one or more communications, one or more data, any other information in this disclosure, and/or any combination thereof (step 2612). The method 2600 may include the function of idea identification of one or more strings, one or more words, one or more documents, one or more communications, one or more data, any other information in this disclosure, and/or any combination thereof (step 2614). The method 2600 may include the function of information removal of one or more strings, one or more words, one or more documents, one or more communications, one or more data, any other information in this disclosure, and/or any combination thereof (step 2616). The method 2600 may include a processing function for one or more strings, one or more words, one or more documents, one or more communications, one or more data, any other information in this disclosure, and/or any combination thereof (step 2618). The method 2600 may include a report generation function and/or to initiate one or more actions in this disclosure (step 2620). The method 2600 may include storing data from the report generation function and/or any initiated actions (step 2622). In one example, the system may be built using the following steps: Text normalization which is the process by which the system transforms the text into its component parts as represented by a canonical list of words or forms; Tokenization which is the process by which the system splits the communication into smaller, more digestible units; injection of applicable context which is the process of inserting context that is applicable to the communication data [for example, the system can look for "whether a question is seeking legal advice" and then evaluate whether the recipient of said email is a lawyer]; Spelling Normalization which is the process by which the system identifies spelling abnormalities and represents them as related to (or the same as) the correct spelling of a word, phrase, or token; Lemmatization which is the process of morphologically analyzing words and representing them in their base or dictionary forms (the Lemmatization process often includes removing inflectional endings of words); Named Entity Recognition which is the process by which the system identifies named entities (for example, proper nouns); Idea Identification (Annotation) which is the process by which the system identifies ideas or concepts present in the communication; Information Removal (Remove all non-essential information); Original Language which is the process by which the system operates on the idea graph (the original language need not be stored or saved for the future needs of the system); Non-Relevent structure which is the process by which the system removes "filler" words that may or may not be grammatically correct, but do not alter the meaning of the communication or add value in a meaningful way; Storage which is the process by which the system, after analyzing and affecting the communication, stores only the relevant information for future operations; and/or any other process disclosed in this document.

Figure 27:
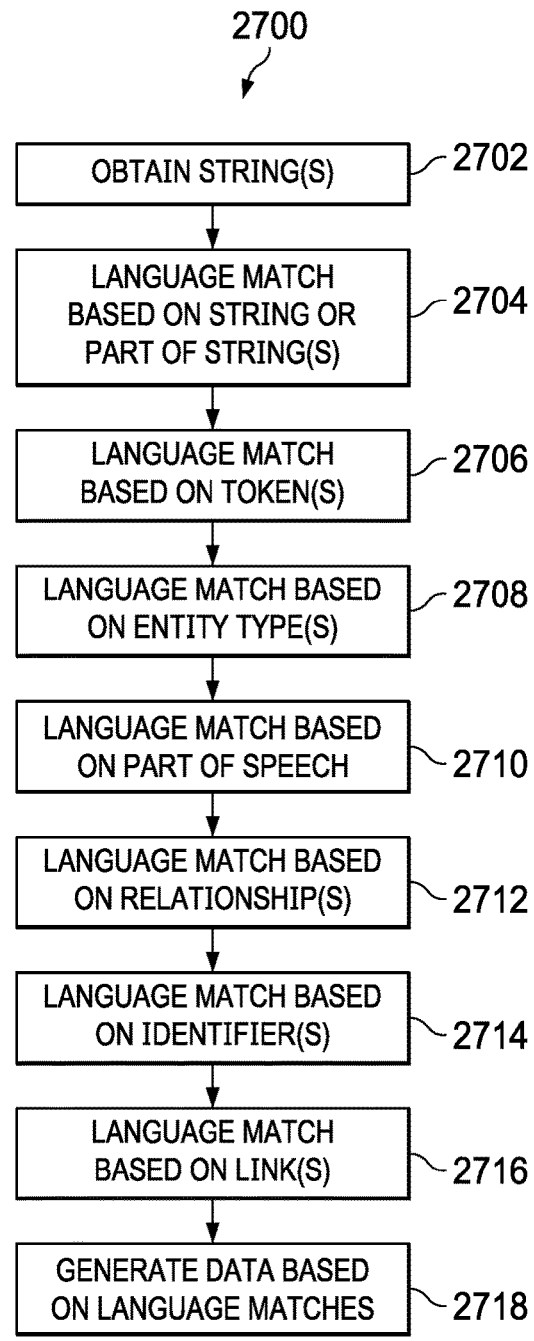
FIG. 27 is a flow diagram, according to one embodiment.

In FIG. 27, a flow diagram is shown, according to one embodiment. A method 2700 may include obtaining a string(s) (step 2702). The method 2700 may include initiating a language matching process based on the string(s) and/or a part of the string(s) (step 2704). The method 2700 may include initiating a language matching process based on one or more tokens (step 2706). The method 2700 may include initiating a language matching process based on one or more entity types (step 2708). The method 2700 may include initiating a language matching process based on a part of speech (step 2710). The method 2700 may include initiating a language matching process based on one or more relationships (step 2712). The method 2700 may include initiating a language matching process based on one or more identifiers (step 2714). The method 2700 may include initiating a language matching process based on one or more links (step 2716). The method 2700 may include generating data based on one or more of the languages matches and/or initiating any action in this disclosure based on one or more of the languages matches (step 2718).

In another example, match language may be based on words or parts of words or strings or part of stings. For example, when given a list of words, the system can find those words in communications and annotate appropriately. Using basic word matching on the word "vice" will trigger an alert on the word "service" because it contains the word "vice" which is a false trigger.

In another example, match language may be based on token(s). For example, when given a list of tokens (words or phrases) the system can find those tokens in communications and annotate appropriately.

In another example, match language may be based on entity type(s). For example, the system can annotate that "Walmart" is a store.

In another example, match language may be based on part of speech(es). For example, the system can annotate that "Selling" is a verb.

In another example, match language may be based on relationship(s). For example, the system can annotate that "Walmart" operates on the token "products" in the sentence "Walmart sells products."

In another example, various types can be used which can be: adjacent_tokens; keyword; regex; token; token_with_modifier; url; and/or any other data in this disclosure.

In another example, match language may be based on identifiers. In this example, the system may convert words and/or replace language with an "Annotation". For example, the system strips away the original communication and operates only on the annotations that have been added.

In another example, match language may be based on annotation. In various examples, Firing_language: represents the idea of firing an employee; Scolding_language: represents the idea of scolding someone; and/or any other communication interaction in this disclosure. These represent an idea in inter human communication.

In another example, match language may be based on links which may represent the relationship between annotations. For example, (ANNOTATION_A, NOUN) is the subject of (ANNOTATION_B,VERB).

An Example of a Language Matcher Relationship may be the concept of a "market" is expressed as a language matcher. A number of tokens (words/phrases) that represent ideas relating to a specific type of market (e.g., grain market) where as domination language is a number of tokens that represent the concept of "dominating." In this relationship example, the concept of a market is the object of the dominating language.

Figure 28:
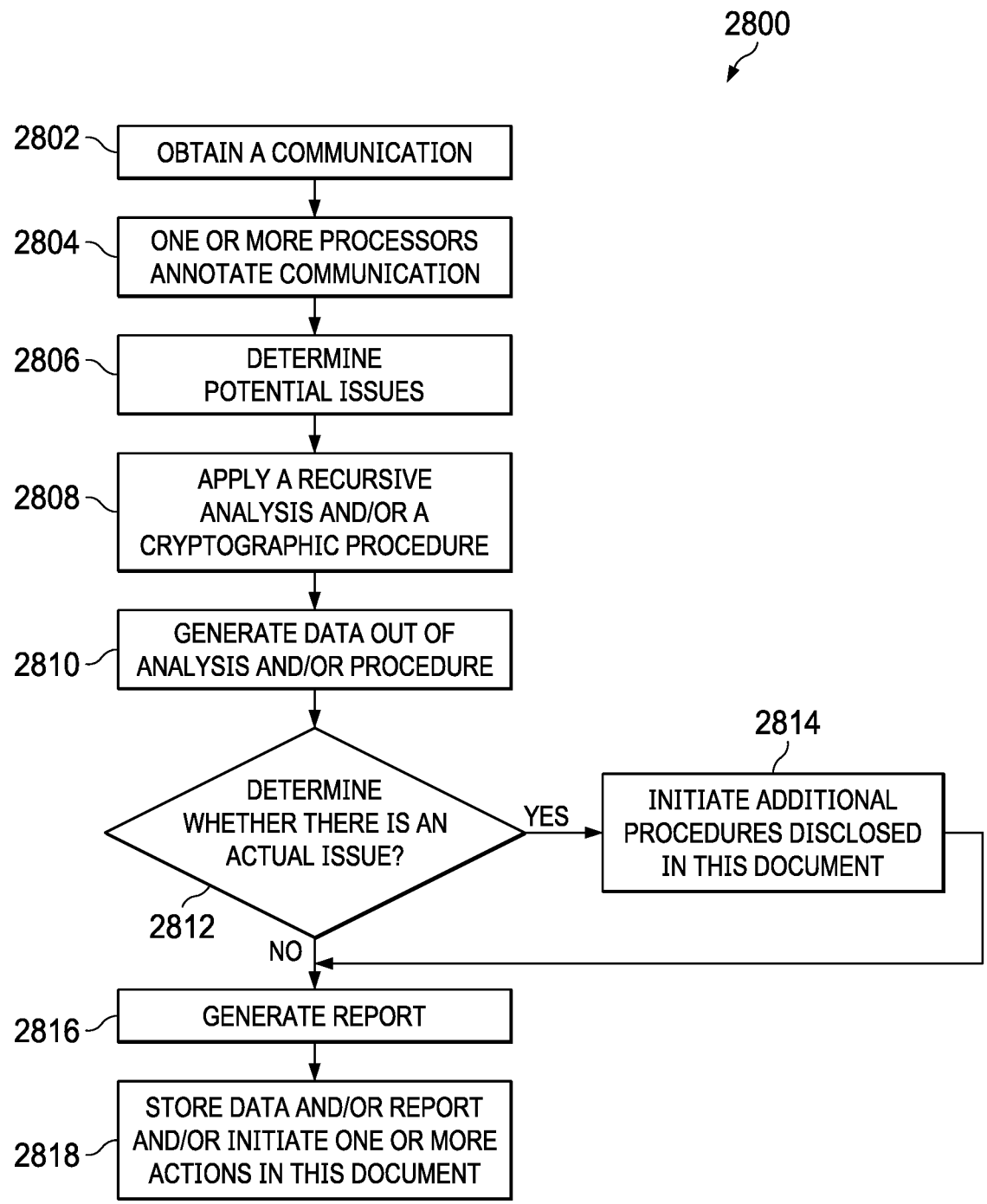
FIG. 28 is a flow diagram, according to one embodiment.

In FIG. 28, a flow diagram is shown, according to one embodiment. A method 2800 may include obtaining a communication(s) (step 2802). The method 2800 may include one or more processors annotating the communication(s) (step 2804). The method 2800 may include determining one or more potential issues (step 2806). The method 2800 may include applying a recursive analysis and/or a cryptographic procedure (step 2808). The method 2800 may include generating data out of the recursive analysis and/or the cryptographic procedure (step 2810). The method 2800 may include determining via one or more processors whether there are any actual issues (step 2812). If there are no actual issues, then the method 2800 may include generating a report(s) (step 2816). The method 2800 may further include storing data and/or report(s) and/or initiating one or more actions in this disclosure (step 2818). If there is an actual issue, the method 2800 may include initiating additional procedures disclosed in this document (step 2814). The method 2800 may then include generating a report(s) (step 2816). The method 2800 may further include storing data and/or report(s) and/or initiating one or more actions in this disclosure (step 2818).

In another embodiment, the systems, devices, and/or methods may identify unknowns in communications with context, recursive guessing, and cryptographic techniques. In one example, a system for predicting risk associated with communications may run a first level annotation process that identifies all language that needs annotation based on existing AI annotators or the complex rules engine. In this example, the presence of relevant annotations, their location in the document, and the context of the author and recipients provides a mechanism for isolating (or escalating) certain excerpts for level 2 systematic review (e.g., pronoun guessing). After the first level annotation, the system identifies language that has all the indications of being potentially problematic, but for the lack of an identifiable subject (possibly due to the presence of a pronoun, encoded language, or misspelling). The system identifies these potentially problematic communications and applies a recursive analysis and cryptographic techniques by replacing the implied or obfuscated subject with potential subjects from nearby text or previous conversations. Similar to cryptography, the system is optimized to solve for efficiency in this process. For example, identifying the most recent "n" nouns used by an author within a time period (t), with recipients (r), serves as an ideal method for identifying potential "subject" substitutions (the same is true for objects, verbs, or other component concepts within a communication). In one example, "We have a group of us here that think we can manipulate teh asdf overnight if given enough horsepower."

The above sentence would be annotated as follows: The pronouns "we" and "us" are identified as first person plural. The system recognizes that "the" is misspelled. The system recognizes that "asdf," despite being meaningless, is present in the sentence in the location of what would be a noun. Further "asdf" is the object of the verb "manipulate." The system recognizes that "asdf" is not closely related to another similar word (e.g., it is more than a mere misspelling). The subject of the sentence "we" is indicative of multiple people because the author is human and speaking in the first person plural. The system has the ability to create groupings from previous communications that may potentially be the targeted reference of the pronoun. The sentence recognized to be contingent on the presence of the noun "horsepower." The system is temporally aware as indicated by the presence of the word "overnight," which indicates that the intended, contingent action will occur "overnight." The system is aware of the title and job function of the sender and recipient. The system is aware of all previous subjects and objects used in messages sent by both parties. As a result, the system (in this embodiment) can recursively test those subjects or objects in the place of "asdf," which can lead to the evaluation of a number of suspect sentence variations. If one of the sentence variations is a clear violation of policy or has an elevated risk profile (e.g., indicative of illegal activity), the system has the ability to initiate an outcome or action that would benefit the organization. The system in this example, due to the presence of a number of flagged annotators, intelligently decides that recursive guessing should be applied to this sentence.

The key points in this example may include the fact that pronoun guessing may only happen on sentences that have been quarantined for reasons dictated by the first-level review (via one or more processors) and the ability to retroactively identify subjects and/or previously used subjects.

When the system ingests a document or communication, the system is aware of context (including the author, platform, recipient(s), etc.). As such, there is a link to, for example, previous documents or communications with the same author. These are called related documents (i.e., any document that shares context with another document). The system has the ability to recall all the annotations in previous related documents. These annotations could be subject discussed in the documents (even specific tokens/words/phrases used as the subject of sentences or paragraphs). The system creates a connection between the annotations in these previous documents and the current document.

Because the system is aware of context and related documents and because the system can intelligently recall previous subjects used, the system can be utilized this contextual information to determine what the potential possibilities of subject could be in a current document or sentence being evaluated.

In another embodiment, the systems, devices, and/or methods may utilize Pronoun Guessing. For example, the system has the ability to recursively try a number of differing potential subjects to evaluate a sentence's meaning.

In another example, the systems, devices, and/or methods may utilize Group Identification. In one example, the system has the ability to build communication maps (social graphs) between interconnected users. For example, if Bob talks to a lot of engineers, Bob is likely to an engineer. In another example, if Bob communicates with risky individuals (e.g., individuals with a high risk score), then Bob is more likely to be a risky individual also. In an example, these social graphs can be overlaid with information relating to the strength of interconnectedness amongst users (e.g., how often individuals communicate with one another 1 on 1 or how often they communicate with each other in groups). These groups can be fluidly, dynamically updated in real time (see FIG. 29 reference numbers 2904 and 2906).

In one example, identifying the self-identification of individuals acting in concert can be performed by monitoring communication language (e.g., the use of the pronoun "us" or "we"), but also by evaluating the recency, frequency, and depth (depth may be based on longer communications with more topics) with which the individuals have communicated with each other or related individuals (as defined by the social graph). In another example of depth, a Frank may have a first depth score of 2 with Mary based on sending a weekly email asking how she is doing. Whereas, Clark has a second depth score of 8 based on sending detail emails (e.g., 10 paragraphs) on 5 different issues on the same weekly basis. It should be noted that recency, frequency, and/or depth may be utilized to develop an overall linkage score between individuals. For example, a person with a recency score of 1, a frequency score of 1, and a depth score of 10 may have a different overall linkage score then a second person with a recency score of 10, a frequency score of 9, and a depth score of 4.

In one example, a comparison of Pronoun Guessing vs. Encoded Language Guessing is disclosed. For example, the systems, devices, and/or methods use antecedent comparison to ensure that pronouns match the plurality of known. For example, "Them"—proper noun plural nouns, entity type, singularity. In another example, "He, her, him",—the systems, devices, and/or methods only match on people and if they're singular.

In another example, jargon identification can be utilized by the systems, devices, and/or methods. For example, using similar techniques to encoded language guessing, the system has the ability to identify evolving jargon based on the authors' context. The system may examine when a new word or an existing word gets used in a new way. For example, if X has a verb and a couple bad annotators, we know we don't know what a piece of jargon is. The system has the ability to ingest existing lists of jargon words and phrases and diagram the sentences they are used in. With this ingested knowledge, the system can use sentence context to identify when new words are introduced as jargon and surface/escalate them to human reviewers for identification. The system, given enough confidence, can also append these newly learned words/phrases to the existing concepts of known jargon.

In one example relating to jargon detection, the communication monitoring system may evaluate the sentence that a suspected code-word/phrase or jargon phrase is being used. The system may evaluate the context in which the sentence is being used including sender and recipient(s)' previous messages, relationship, title, etc. This information can highlight a logic web that contains specific topics of conversation amongst similar participants. A sentence may be evaluated alongside other sentences the system previously ingested. The insights provided by these evaluations may identify jargon usage and code-word usage to pinpoint the meaning (or when in history a certain word may have been substituted in as a code-word. If an organization or individual is communicating in an encoded manner, this may be highlighted. This may be used for training or performance management purposes.

In one example relating to jargon detection and code-phrase detection, the communication monitoring system may identify the ratio of typos (and the repetition thereof) within an author's past communications. This information may be used to apply specific analysis or rules to the communication. Further, this information may be used to decide whether further automated analysis is needed. This allows the system to be intelligent with regard to compute costs. For example, if an internal user is communicating to another user, and repeatedly misspells a word or phrase (appending a certain character to a word or leaving a certain character out of a word, or combining two acronyms or words together), the system may identify this behavior as intentional and apply further analysis on the communication.

Figure 29:
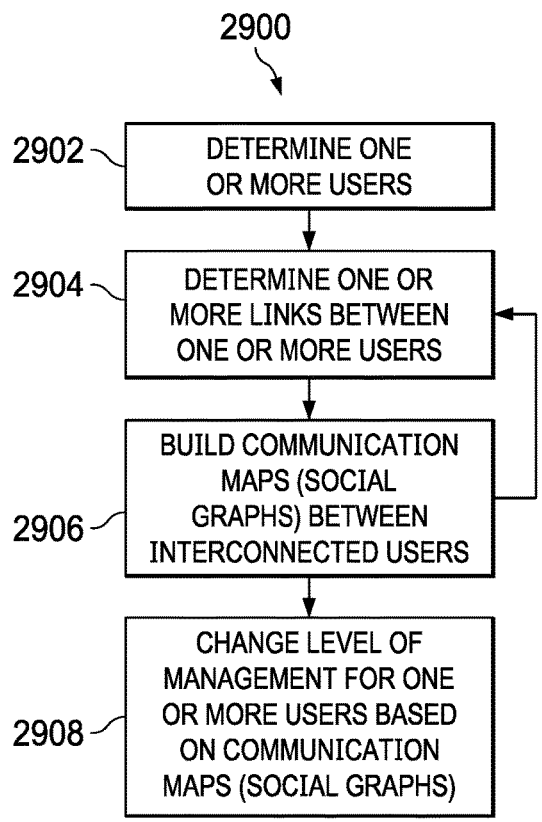
FIG. 29 is a flow diagram, according to one embodiment.

In FIG. 29, a flow diagram is shown, according to one embodiment. A method 2900 may include determining one or more users (step 2902). The method 2900 may include determining one or more links between the one or more users (step 2904). The method 2900 may include building communication maps (and/or social graphs) between interconnected users (step 2906). The method 2900 may include changing the level of management for one or more users based on the communications maps and/or social graphs (step 2908). In one example, Bob talks to a first group of people with a frequency score of 1. Whereas, Michael talks to a first group of people with a frequency score of 10. The social graph of Bob to the first group of people may have a link score of 1 whereas the social graph of Michael to the first group of people may have a link score of 10. Therefore, if the first group of people has one or more risky actors in it, then Michael's management level may increase but Bob's management level may not increase. In this example, the management level determination where based on a frequency of communication level score but any data in this disclosure may be utilized. In another example, Bob talks to a first group of people with a frequency score of 1 and a depth score of 3. Whereas, Michael talks to a first group of people with a frequency score of 10 and a depth score of 5. The social graph of Bob to the first group of people may have a link score of 1 whereas the social graph of Michael to the first group of people may have a link score of 10. Therefore, if the first group of people has one or more bad actors in it, then Michael's management level may increase but Bob's management level may not increase. In this example, the management level determination where based on a frequency of communication level score and the depth score but any data in this disclosure may be utilized.

Figure 30:
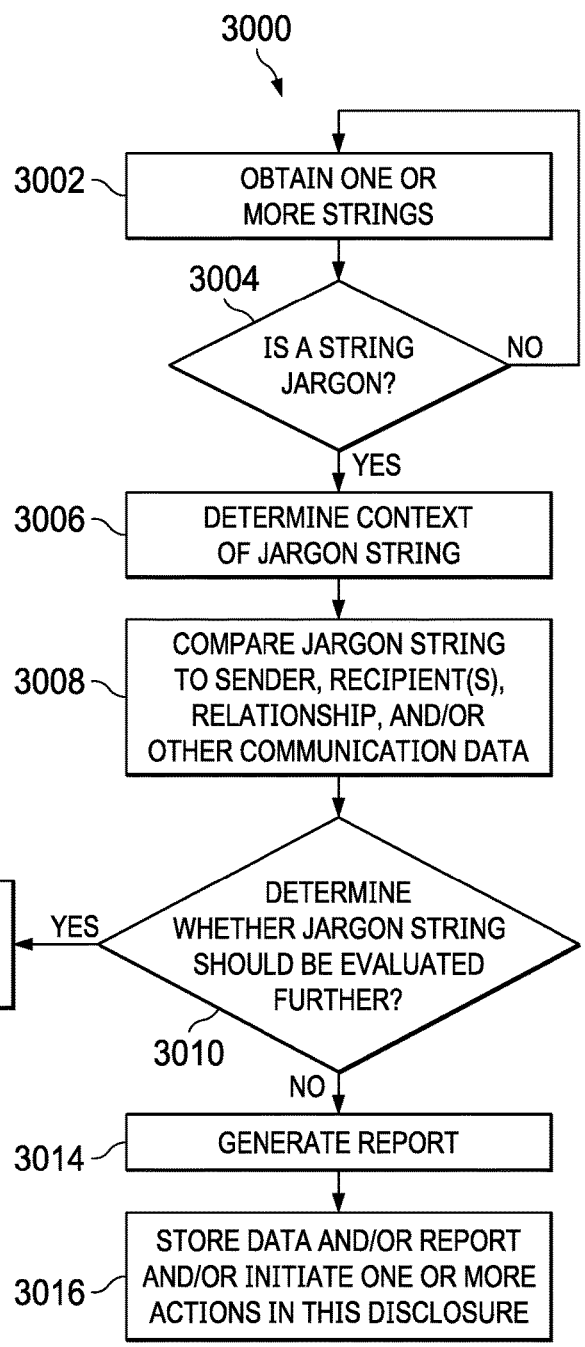
FIG. 30 is a flow diagram, according to one embodiment.

In FIG. 30, a flow diagram is shown, according to one embodiment. A method 3000 may include obtaining one or more strings (step 3002). The method 3000 may include determining via one or more processors whether a string is jargon (step 3004). If the string is not known jargon, then the method 3000 may move back to step 3002. If the string is jargon, then the method 3000 may include determining the context of the jargon string (step 3006). The method 3000 may include comparing the jargon string to sender data, recipient(s)' data, one or more relationships, and/or any other communication data disclosed in this document (step 3008). The method 3000 may include determining via one or more processors whether the jargon string should be evaluated further (step 3010). If the jargon string should be evaluated further, then the method 3000 may include transmitting the jargon string for additional evaluations and/or initiating additional analysis processes and/or additional procedures disclosed in this document (step 3012). If the jargon string should not be evaluated further, then the method 3000 may generate a report(s) (step 3014). The method 3000 may include storing data and/or report(s) and/or initiating one or more actions in this disclosure (step 3016).

In another example, jargon identification can be utilized by the systems, devices, and/or methods. For example, using similar techniques to encoded language guessing, the system has the ability to identify evolving jargon based on the authors' context. The system may examine when a new word or an existing word gets used in a new way. For example, if X has a verb and a couple annotators that indicate "business risk", we know we don't know what a piece of jargon is. The system has the ability to ingest existing lists of jargon words and phrases and diagram the sentences they are used in. In other words, replace the unknown risky words with other words to determine whether an issue is present. With this ingested knowledge, the system can use sentence context to identify when new words are introduced as jargon and surface/escalate them to human reviewers for identification. The system, given enough confidence, can also append these newly learned words/phrases to the existing concepts of known jargon.

In one example relating to jargon detection, the communication monitoring system may evaluate the sentence that a suspected code-word/phrase or jargon phrase is being used. The system may evaluate the context in which the sentence is being used including sender and recipient(s)' previous messages, relationship(s), title, location within the sentence or document, or other data in this disclosure. This information can highlight a logic web that contains specific topics of conversation amongst similar participants. A sentence may be evaluated alongside other sentences the system previously ingested. The insights provided by these evaluations may identify jargon usage and code-word usage to pinpoint the meaning (or when in history a certain word may have been substituted in as a code-word. If an organization or individual is communicating in an encoded manner, this may be highlighted. This may be used for training or performance management purposes.

In one example relating to jargon detection and code-phrase detection, the communication evaluation system may identify the ratio of typos (and the repetition thereof) or common patterns within an author's past communications. This information may be used to apply specific analysis or rules to the communication. Further, this information may be used to decide whether further automated analysis is needed. This allows the system to be intelligent with regard to compute costs. For example, if an internal user is communicating to another user, and repeatedly misspells a word or phrase (appending a certain character to a word or leaving a certain character out of a word, or combining two acronyms or words together) or switching languages, or offering alternative communication platforms, the system may identify this behavior as intentional and apply further analysis on the communication.

Figure 31:
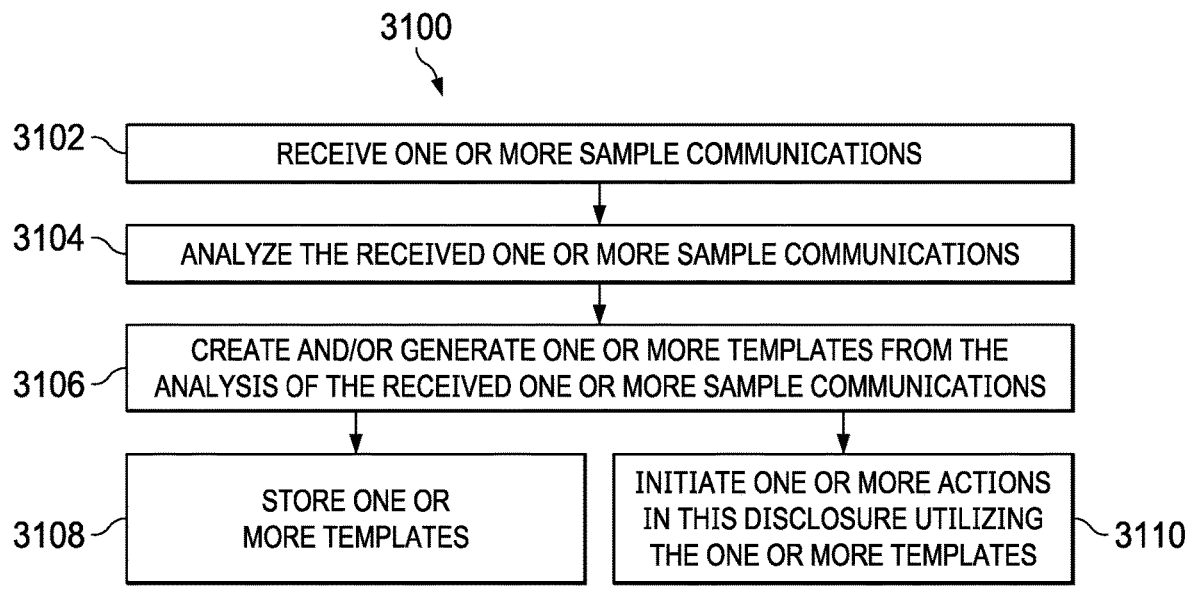
FIG. 31 is a flow diagram, according to one embodiment.

In FIG. 31, a flow diagram is shown, according to one embodiment. A method 3100 may include receiving one or more sample communications (step 3102). The method 3100 may include analyzing the received one or more sample communications (step 3104). The method 3100 may include creating and/or generating one or more templates from the analysis of the received one or more sample communications (step 3106). The method 3100 may include storing one or more templates (step 3108). The method 3100 may include initiating one or more actions in this disclosure utilizing the one or more templates (step 3110). In one example, a Company A's scheduling function may be updated (as indicated by one or more sample communications). Therefore, the system may need to create a new template based on Company A changing its scheduling function.

Figure 32:
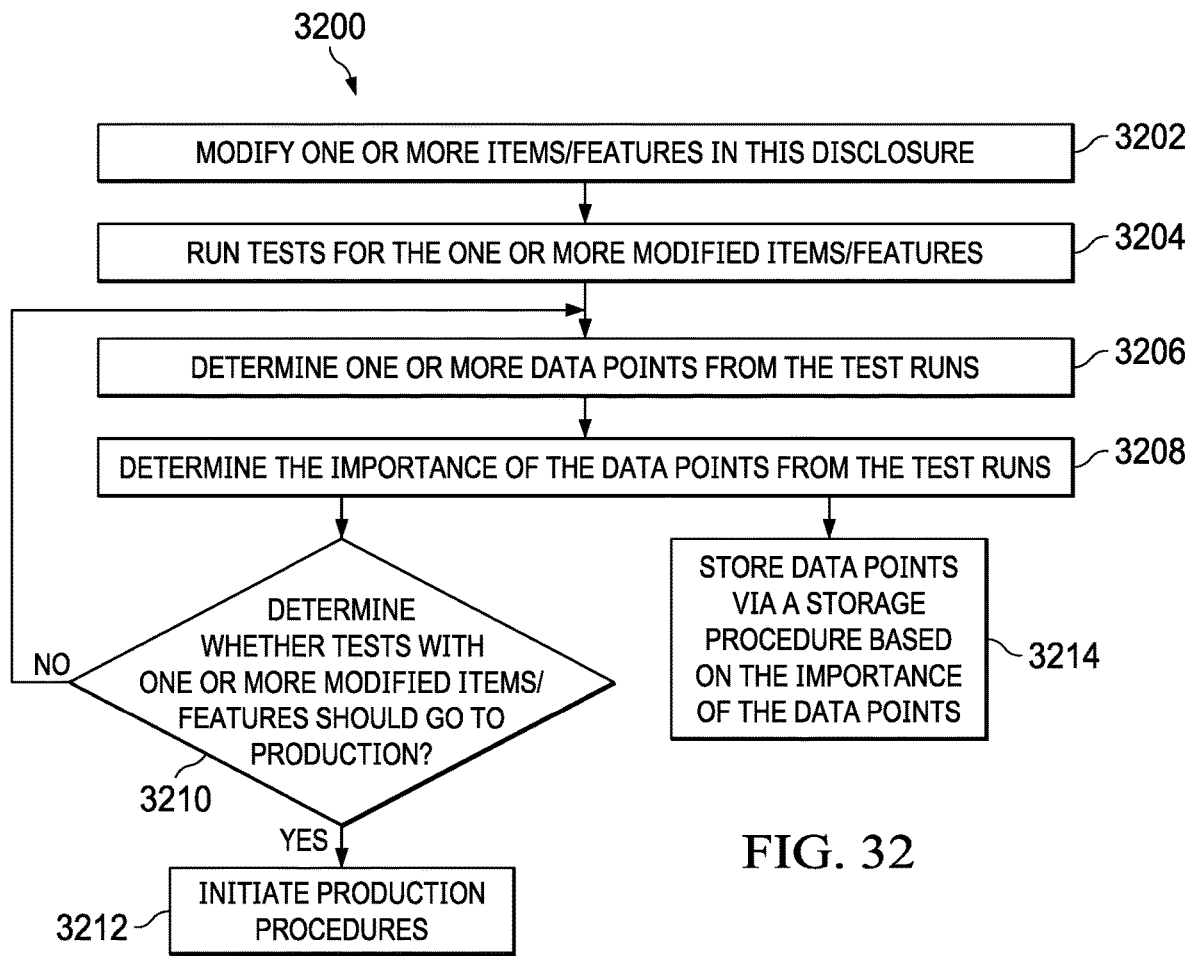
FIG. 32 is a flow diagram, according to one embodiment.

In FIG. 32, a flow diagram is shown, according to one embodiment. A method 3200 may include modifying one or more items and/or features in this disclosure (step 3202). The method 3200 may include running one or more tests for the one or more modified items and/or features (step 3204). The method 3200 may include determining one or more data points from the one or more test runs (step 3206). The method 3200 may include determining the importance of the data points from the one or more test runs (step 3208). The method 3200 may include storing the data points via a storage procedure based on the importance of the data points (step 3214). Different storage time periods based on importance etc. The method 3200 may include determining via one or more processors whether a test(s) with one or more modified items and/or features should go to production (step 3210). If the test(s) dictate that the model should not go to production, then the method 3200 moves back to step 3206). If the test(s) dictate that the model should go to production, then the method 3200 initiates one or more production procedures (step 3212). In one example, the data may be stored for a zero time period, a 30 days time period, a one year time period, and/or any other time period.

Figure 33:
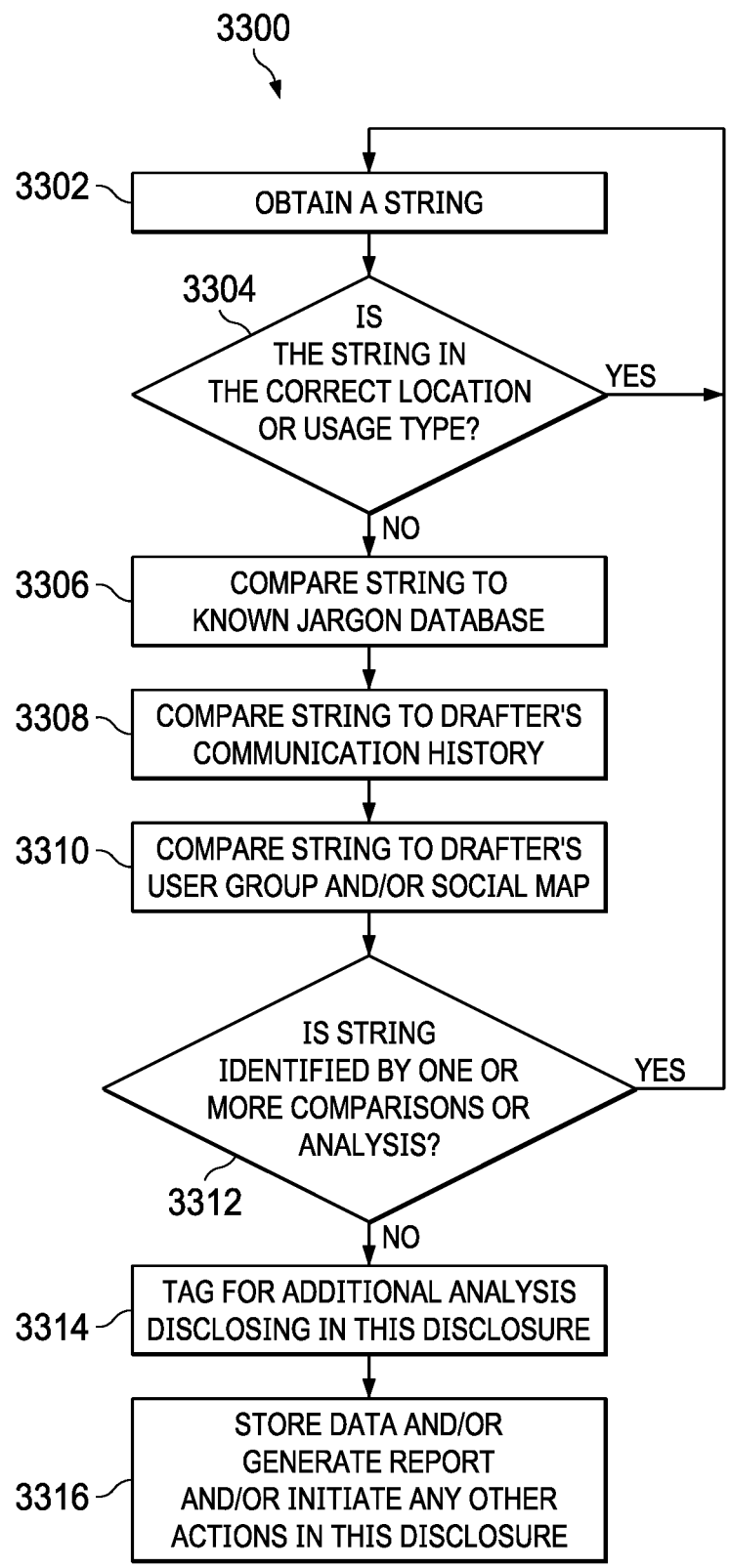
FIG. 33 is a flow diagram, according to one embodiment.

In FIG. 33, a flow diagram is shown, according to one embodiment. A method 3300 may include obtaining a string(s) (step 3302). The method 3300 may include determining via one or more processors whether the string is in the correct location, usage type, and/or any other string criteria disclosed in this document (step 3304). If there are no issues with the string, then the method 3300 goes back to step 3302. If there is at least one issue with the string, then the method 3300 may include comparing the string to a known jargon database (step 3306). The method 3300 may include comparing the string to drafter's communication history (step 3308). The method may include comparing the string to the drafter's user group and/or social map (step 3310). The method 3300 may include determining via one or more processors whether the string is identified by the one or more comparisons (step 3312). If the string is identified by the one or more comparisons, then the method 3300 moves back to step 3302. If the string is not identified by the one or more comparisons, then the method 3300 may include tagging the string for additional analysis and/or procedures disclosed in this document (step 3314). The method 3300 may include storing data and/or generating report(s) and/or initiating any other actions in this disclosure (step 3316).

In one example, the location within a document may be utilized by the system. When the annotation process occurs on a document or communication, the system ingests the language and then annotates it with meaning. These annotations are not simply assigned to the document or communication as a whole, but rather are particular to a location in the document. As a result, the annotations are "location aware" and the relative location of individual annotations, can add value to the extrapolated meaning.

Figure 34A:
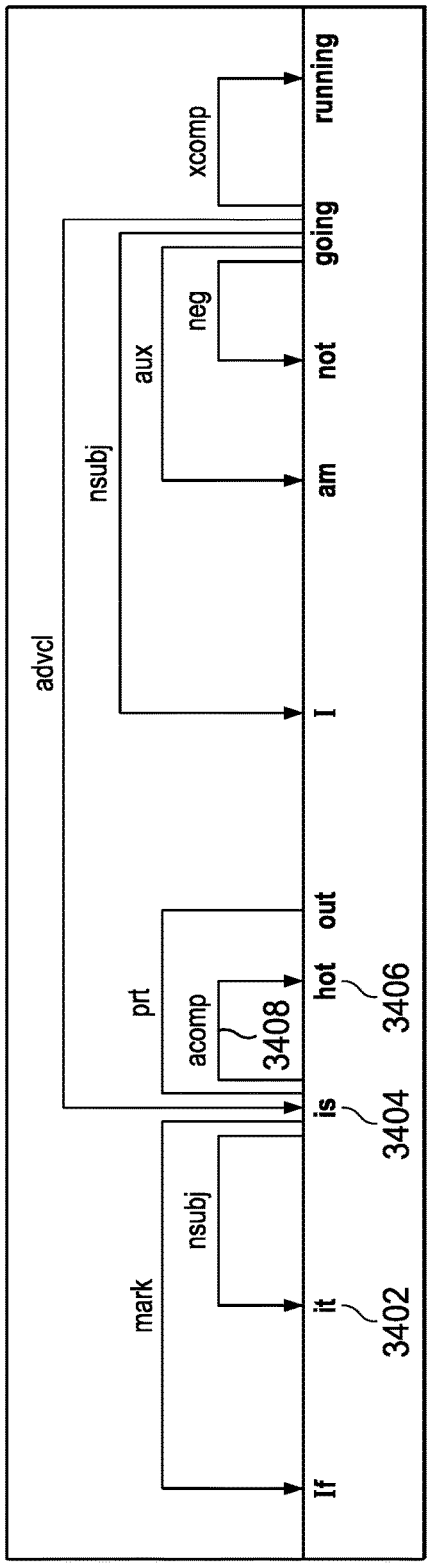
FIG. 34A is a diagram of a sentence structure, according to one embodiment.

In FIG. 34A, a diagram of a sentence structure is shown, according to one embodiment. In this example, a sentence of "If it is hot out I am not going running" is shown. In this example, a first word 3402, a second word 3404, and a third word 3406 are highlighted. In this example, there is a link 3408 between the second word 3404 and the third word 3406 but there is no link between the first word 3402 are the third word 3406. This critical link between the first word 3402 and the third word 3406 is missing.

Figure 34B:
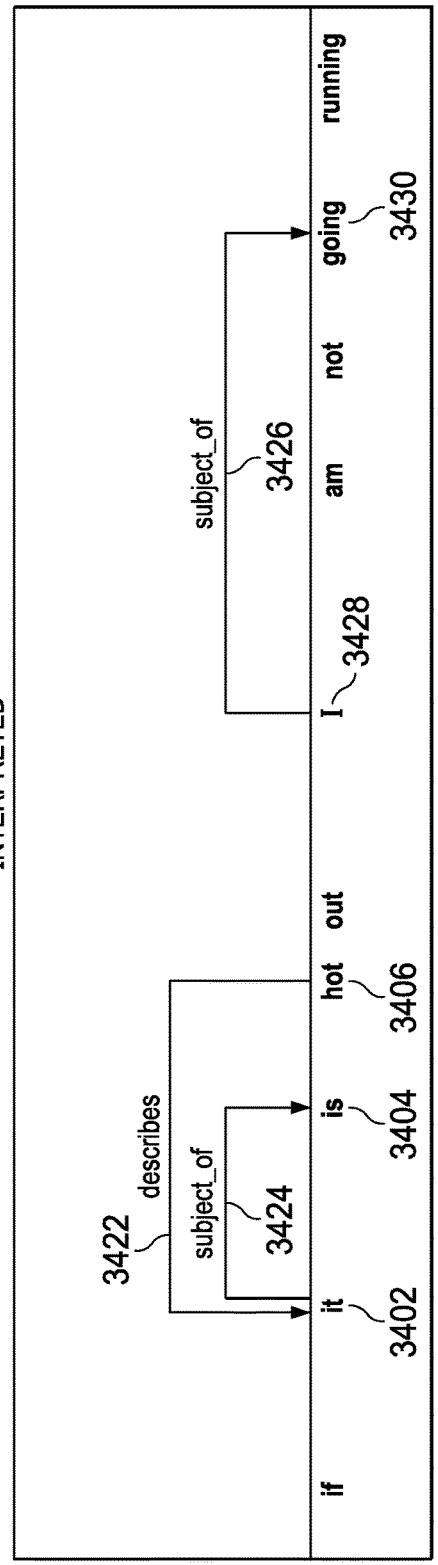
FIG. 34B is an interpretation diagram and analysis of a sentence structure, according to one embodiment.

In FIG. 34B, an interpretation diagram and analysis of a sentence structure is shown, according to one embodiment. In this example, a sentence of "If it is hot out I am not going running" is shown. In this example, the first word 3402, the second word 3404, and the third word 3406 are highlighted. In this example, there is a first link 3422 between the first word 3402 and the third word 3406. In this example, the first link 3422 has a describing function where hot (the third word 3406) describes it (the first word 3402) which is not present in FIG. 34A. In this example, there is a second link 3424 between the first word 3402 and the second word 3404 which is the exact opposite of the link between the first word 3402 and the second word 3404 shown in FIG. 34A. In this example, the second link 3424 has a subject of function where it (the first word 3402) is the subject of is (the second word 3404). For clarity, in this example, the second link 3424 goes from it to is in FIG. 34B whereas the link in FIG. 34A goes from is to it. In other words, the exact opposite direction (see arrows). In another example, a fourth word 3428 and a fifth word 3430 are highlighted. In this example, a third link 3426 is generated between the fourth word 3428 and the fifth word 3430. In this example, the third link 3426 has a subject of function where I (the fourth word 3428) is the subject of going (the fifth word 3430). The end result is that the representation is more human understandable.

Figure 35A:
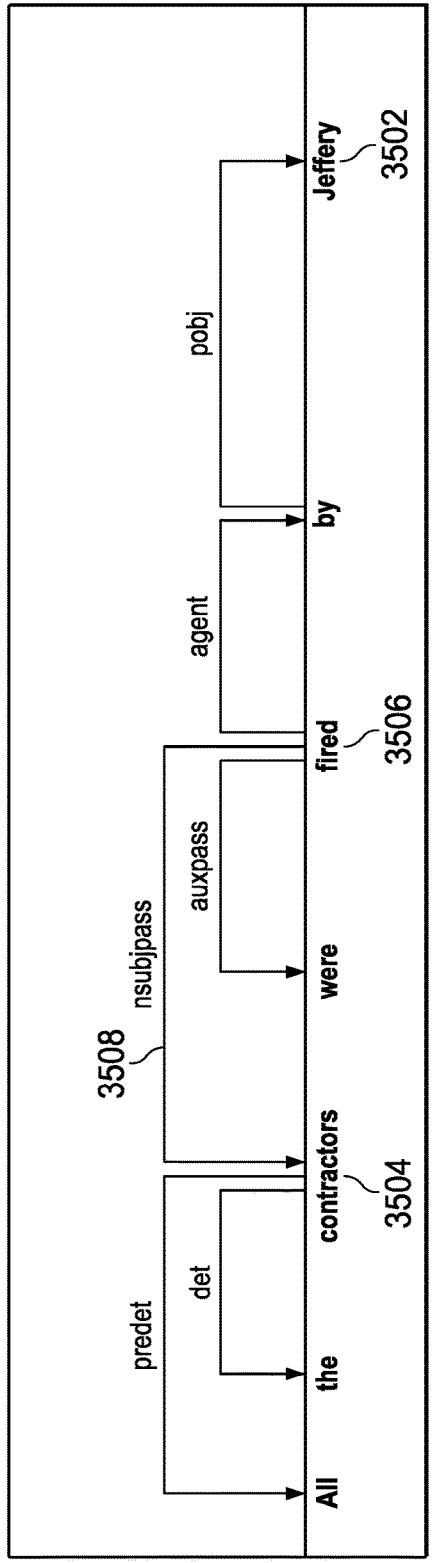
FIG. 35A is a diagram of a sentence structure, according to one embodiment.

In FIG. 35A, a diagram of a sentence structure is shown, according to one embodiment. In this example, a sentence of "All the contractors were fired by Jeffery" is shown. In this example, a first word 3504, a second word 3506, and a third word 3502 are highlighted. In this example, there is a link 3508 between the first word 3504 and the second word 3506 but there is no link between the first word 3504 are the third word 3502. This critical link between the first word 3504 and the third word 3502 is missing.

Figure 35B:
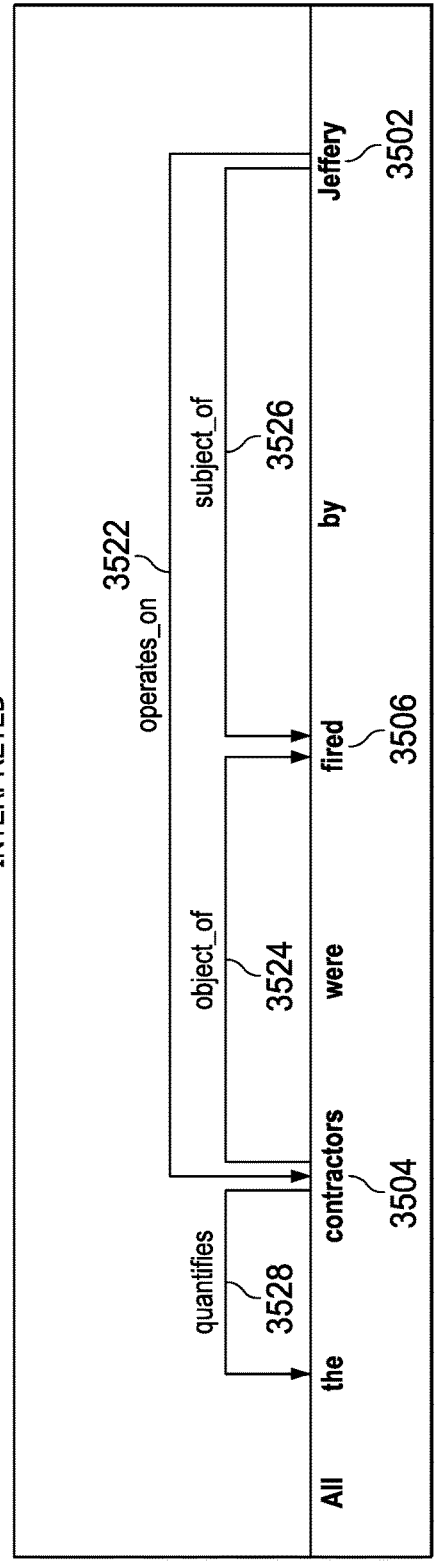
FIG. 35B is an interpretation diagram and analysis of a sentence structure, according to one embodiment.
Figure 38:
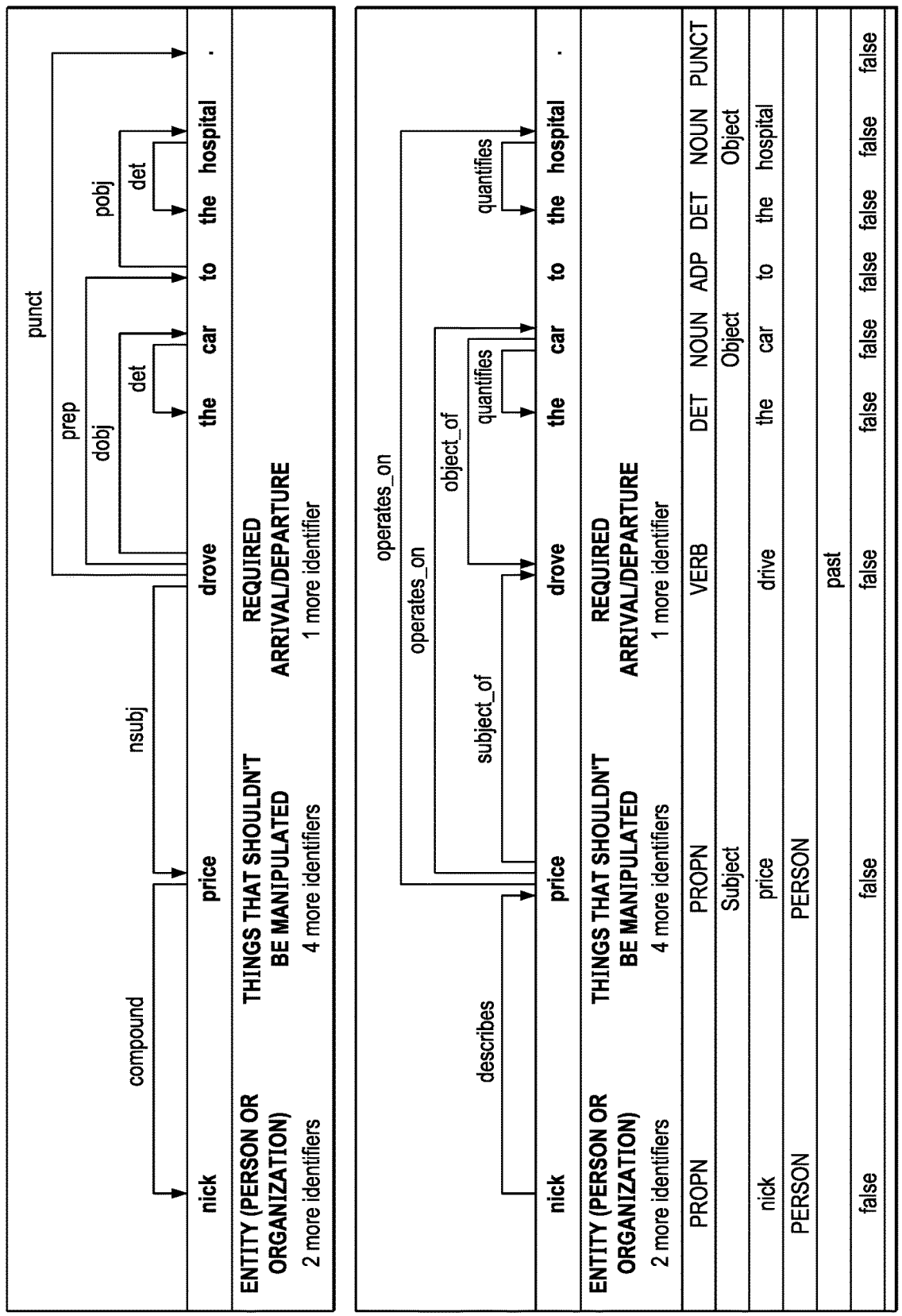
FIG. 38 is an example of utilizing aggregation to reduce false positives, according to one embodiment.

In FIG. 35B, an interpretation diagram and analysis of a sentence structure is shown, according to one embodiment. In this example, a sentence of "All the contractors were fired by Jeffery" is shown. In this example, the first word 3504, the second word 3506, and the third word 3502 are highlighted. In this example, there is a first link 3522 between the first word 3504 and the third word 3502. In this example, the first link 3522 has an operates on function where Jeffrey (the third word 3502) operates on contractors (the first word 3504) which is not present in FIG. 35A. In this example, there is a second link 3524 between the first word 3504 and the second word 3506. In this example, the second link 3524 has an object of function where contractors (the first word 3504) is the object of fired (the second word 3506) which is not present in FIG. 35A. For clarity, in this example, the second link 3524 goes from contractors to fired in FIG. 35B whereas the link in FIG. 35A goes from fired to contractors. In other words, the exact opposite direction (see arrows). In this example, there is a third link 3526 between the second word 3506 and the third word 3502. In this example, the third link 3526 has a subject of function where Jeffery (the third word 3502) is the subject of fired (the second word 3506). In another example, the word "the" is utilized. In this example, a fourth 3528 is generated between the first word 3504 and "the". In this example, the fourth link 3528 has a quantifying function where contractors (the first word 3504) quantifies "the". The end result is that the representation is more human understandable. FIG. 38 is an example of utilizing aggregation to reduce false positives, according to one embodiment.

In one example, the systems, devices, and/or methods may utilize aggregation to reduce false positives. In a legacy system, basic search functionality (e.g., keyword searching) leads to less risk coverage and a plethora of false positives. In one example, the system utilized an aggregate procedure which can be done by author, recipient, communication type, source department, receiving department, entity type, any other information in this document, and/or any combination thereof.

In one example, the system may aggregate these by author/recipient mapping, which provides a group overlay. In one example, when you actually report an author, you need to score the events and limit them (e.g., 10), so review happens at almost a package level. In another example, the system may utilize meaning clustering procedure. For example, when people are talking about a subject and the system is confident about the subject, the system can give a higher amount of confidence to their discussions when evaluating and improving our understanding of that subject. This allows the system to use a confidence procedure to the benefit of training models.

In another example, the system can utilize jargon detection, authorship confidence, and/or jargon aggregation. For example, when the system has confidence that somebody is wonky, the system can use their data as a different level of confidence with respect to jargon switching. For example, if an author regularly writes in a way that is statistically different from his/her peers, the system can identify this. For example, if an individual uses jargon or encoded language in more sentences as a percent of all communications, the system can flag this author with that characteristic. The system can then treat his/her communications with more weight when deciding how to increment the system's understanding of jargon. This situation itself, i.e., the use of jargon as a percent of communications) can be deemed an indicator for somebody trying to disguise their behavior (or may be an indication that an author is an expert in terminology or acronyms or are very familiar with Acronyms or some other indicator of experience). The system can automatically annotate words and phrases that are not in a typical "vocabulary" or corpus.

In another example, the system may utilize spelling suggestions and misspelling identification procedures. If an author misspells a word, the system may evaluate that input in relation to the top n most common misspellings. The system also takes into account the context (e.g. where/how it is used) to better target spelling corrections. If the system fails to recognize the word/phrase, the system can annotate it as "previously unseen." Tracking the presence of previously unseen words and their trends can lead to the identification of new terms.

In another example, the system may utilize intent and timing procedures. The system has the ability to understand intentions and timing. For example, if an author refers to a date and the verb is not past tense, you're talking about the future.

In another example, the system may utilize gender identification procedures. The system has the ability to express a gender identity with a level of confidence. For example, the system is aware of the commonality of given names in a specific language with historical inputs. Furthermore, the system has the ability to identify when individuals with specific names are referred to by specific pronouns as a means of increasing the confidence in both the proper pronoun usage and the appropriate preference of the individual.

For example, if an author wrote "Kelly is a 6 time world champion and he is also a philanthropist." The system would recognize that the pronoun "he" modifies Kelly and recognize that Kelly is being referred to with a masculine pronoun. The system is also capable of identifying Kelly's last name. Future references to Kelly by last name only are understood by the system as representing the same person. Furthermore, if a different Kelly is mentioned in the same document (perhaps referenced with a feminine pronoun) the system would understand that this individual is distinct from the first Kelly.

In one embodiment, the system utilizes a hybrid approach (Mix traditional AI approaches with Rules based approaches). In the AI approaches, the system may utilize: Deep learning; BERT; NER; etc. In the rules based approaches, the system may utilize: Keyword matching; Regex; Token matching; N-gram Analysis; Syntactic N-grams, etc.

In one example, the system may utilize a communication segmentation procedure. The system may break communications up into the smallest logical pieces that can be processed in parallel across a cluster of computers.

In another example, the system may utilize a method for displaying visually relationships (including intersection handling).

In another example, compound relationships may have lines which need to extend. In one example, compound relationships convert the near infinite number of ways concepts can be related to one another in a straightforward reusable way. Some examples are Subject_of and object_of.

In another example, the system may utilize the concept of negation in compound relationship. In another example, the system may mix together deep learned concepts with rules engine concepts (threatening language DIRECTED at an entity or Toxic language directed at a female). In another example, the system may use of specific words only as verbs (cheat (verb) vs. "cheat sheet") which reduces false positives.

Specific concepts may be important except when describing other specific concepts (sensitive is a naughty word, but not when it describes "time" e.g., time sensitive). Something is hard, but not work e.g. "hard work".

Entity recognition as a means of pulling out unimportant things (e.g., system has the ability to recognize capitalization, context and other deep learning things in common names that "We drove Nick Price up the hill," the system understands that this sentence does not relate to the concept of moving or manipulating a price).

The system has the ability to identify templated commonly forwarded types of information (e.g., press releases are known to be public information). The business logic of that is that a press release is known to be public information, so the sharing of it is not problematic.

In one example, the system uses automatic template identification and content extraction. The system can automatically detect communications that follow a template by comparing multiple communications. Using multiple communications that follow the same template we can automatically create a "template extractor" to: Identify future communications and extract information from future communications In one example, the system has a library of identifier types. In another example, the system identifies irrelevant text in communication. In another example, the system identifies text in communication that was not authored by the creator of the communication (so it is not attributed to them). In another example, the system identifies: Email thread in reply; Email Signature; Email Footer; Reply subject; Disclaimer; any other communication information in this disclosure; and/or any combination thereof.

In one embodiment, a system may include one or more processors and at least one memory device where the one or more processors may receive communication data and initiate a procedure to the received communication data to generate a machine representation of the received communication data. The one or more processors may utilize one or more idea mapping functions on the machine representation to generate one or more idea links for the machine representation. The one or more processors may generate an interpreted communication data based on the one or more idea links and the one or more processors may transmit an initiation action signal based on the one or more idea links.

In another example, the initiation action signal may implement a real time action where the real time action includes a language suggestion, a warning, a quarantining of one or more messages, a disabling of a communication device, any action disclosed in this document, and/or any combination thereof.

In another example, the initiation action signal may implement a relationship determination function where the relationship determination function may determine an attorney-client relationship; an employee to employer relationship; a contractor to company relationship; a supervisor to subordinate relationship; a marketing to sales relationship; an engineering to product development relationship; an engineering to manufacturing relationship; an engineering to sales relationship; an engineering to marketing relationship; an engineering to legal relationship; a manufacturing to shipping relationship; a sales to shipping relationship; an engineering to procurement relationship; any other relationship disclosed in this document; and/or any combination thereof.

In another example, the initiation action signal may implement a retroactive action where the retroactive action may include a first time period report, an index communication list, a historical report, a training class option, a real-time training class, a scheduled training class, any other retroactive action disclosed in this document; any other action disclosed in this document; and/or any combination thereof.

In another example, the initiation action signal may implement a predictive action where the predictive action may include a language suggestion, a warning, a quarantining of one or more messages, a change in a level of management for a user, an approval level requirement, a disabling of the one or more messages, a disabling of a communication device, any other predictive action disclosed in this document, any other action disclosed in this document, and/or any combination thereof.

In another example, based on the predictive action being one of the quarantining of one or more messages, the change in a level of management for the user, the approval level requirement, the disabling of the one or more messages, the disabling of the communication device, any other action in this disclosure, and/or any combination thereof, the one or more processors may transmit an approval requirement signal to a review process.

In another embodiment, an apparatus may include one or more processors and at least one memory device where the one or more processors may receive a string. The one or more processors may receive a token; an entity type; a part of speech; a relationship; an identifier; a regex or language/character patterns; and a link; any other data in this disclosure; and/or any combination thereof. The one or more processors may perform a language matching function based on the string; a portion of the string; the token; the entity type; the part of speech; the relationship; the identifier; a regex or language/character patterns; and the link; any other data in this disclosure; and/or any combination thereof. The one or more processors may generate language matching data based on one or more language matches determined by the language matching function and the one or more processors may transmit an initiation action signal based on the language matching data. In one example a regex or language/character patterns may be a regular expression (shortened as regex or regexp—also referred to as rational expression). This regular expression is a sequence of characters that specifies a search pattern. Usually such patterns are used by string-searching algorithms for "find" or "find and replace" operations on strings, or for input validation. It is a technique developed in theoretical computer science and formal language theory. In another example, a string is traditionally a sequence of characters, either as a literal constant or as some kind of variable. The latter may allow its elements to be mutated and the length changed, or it may be fixed (after creation). A string is generally considered as a data type and is often implemented as an array data structure of bytes (or words) that stores a sequence of elements, typically characters, using some character encoding. String may also denote more general arrays or other sequence (or list) data types and structures. In another example, Unicode is an information technology standard for the consistent encoding, representation, and handling of text expressed in most of the world's writing systems. The standard, which is maintained by the Unicode Consortium, defines 143,859 characters covering 154 modern and historic scripts, as well as symbols, emoji, and non-visual control and formatting codes.

In another example, the initiation action signal may initiate a comparison of the string to a known jargon database. In another example, the initiation action signal may initiate a comparison of the string to a drafter's communication history data. In another example, the initiation action signal may initiate a comparison of the string to a drafter's user group or social group. In another example, the initiation action signal may initiate a comparison of the string to a frequency or timing information of communications between the drafter and the recipients. In another example, the initiation action signal may initiate an analysis procedure based on a drafter context and/or one or more recipients' context. For example, a phone company may add context to communications. In this example, anytime the communication states an unlimited plan the system automatically adds the various footnotes (e.g., terms and conditions) to the unlimited plan, such as, the speed may slow down, etc. In another example, the one or more processors may convert the language matching data into an idea for the string.

In another embodiment, a device may include one or more processors and at least one memory device where the one or more processors may receive one or more strings and initiate a procedure to the received one or more strings to generate a machine representation of the received one or more strings. The one or more processors may utilize one or more idea kernel functions on the machine representation to generate one or more idea links for the machine representation. The one or more processors may generate a core idea representation based on the one or more idea links and the one or more processors may transmit an initiation action signal based on the core idea representation.

In another example, the one or more processors may determine an issue based on the core idea representation and/or the one or more idea links. In another example, the one or more processors may determine a context around the issue. In another example, the one or more processors may compare the issue to a sender's information, a recipient's information, a relationship information, communication data, a jargon database, any other information in this disclosure, and/or any combination thereof. In another example, the one or more processors may determine a part of speech for the issue. In another example, the one or more processors may insert one or more strings at an issue location based on the part of speech to determine a solution to the issue.

While the communication monitoring and/or evaluation system has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," "another example," and/or similar language, should be considered to mean that the particular features, structures, or characteristics may be combined in one or more examples. Any combination of any element in this disclosure with any other element in this disclosure is hereby disclosed and only not listed for clarity and brevity.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

It should be noted that any of the elements in any figure and/or any line may be combined with other elements in any other figure and/or any other line. In other words, an element from FIG. 2 may be combined with an element from FIG. 8, and/or FIG. 7A, and/or FIG. 6, and/or FIG. 5, and/or FIG. 4, and/or FIG. 3, and/or FIG. 9A, and/or FIG. 9B, and/or FIG. 1. Any figure and/or line may replace FIG. 2 in the above-referenced analysis. For example, one or more of the elements disclosed on page 6, lines 2-5 could be combined with one or more of the elements disclosed on page 6, lines 7-11 and/or any element disclosed on page 9.

The invention claimed is:

1. A system comprising:
one or more processors and at least one memory device;
the one or more processors configured to receive communication data containing original language and to initiate a procedure to the received communication data to generate a machine representation of the received communication data, the one or more processors configured to utilize one or more idea mapping functions on the machine representation to generate one or more identifiers and one or more idea links for the machine representation, the one or more processors configured to generate an interpreted communication data of an issue based on the one or more idea links; and the one or more processors configured to transmit an initiation action signal based on the one or more idea links,
wherein the machine representation of the communication data comprises a graph of one or more tokens contained in the received communication data, and wherein the one or more tokens are connected by a plurality of pathways, wherein the plurality of pathways define logical relationships between tokens, and wherein the original language of the communication data is removed from the machine representation, and
wherein the one or more idea links comprise language-agnostic representations of relationships between ideas in the communication data,
wherein the initiation action signal implements a real time action where the real time action includes at least one of a language suggestion, a warning, a quarantining of one or more messages, or a disabling of a communication device.

2. The system of claim 1, wherein the initiation action signal implements a relationship determination function.

3. The system of claim 2, wherein the relationship determination function determines at least one of an attorney-client relationship; an employee to employer relationship; a contractor to company relationship; a supervisor to subordinate relationship; a marketing to sales relationship; an engineering to product development relationship; an engineering to manufacturing relationship; an engineering to sales relationship; an engineering to marketing relationship; an engineering to legal relationship; a manufacturing to shipping relationship; a sales to shipping relationship; and an engineering to procurement relationship.

4. The system of claim 1, wherein the initiation action signal implements a retroactive action where the retroactive action includes at least one of a first time period report, an index communication list, a historical report, a training class option, a real-time training class, or a scheduled training class.

5. The system of claim 1, wherein the initiation action signal implements a predictive action where the predictive action includes at least one of a language suggestion, a warning, a quarantining of one or more messages, a change in a level of management for a user, an approval level requirement, a disabling of the one or more messages, or a disabling of a communication device.

6. The system of claim 5, wherein based on the predictive action being one of the quarantining of one or more messages, the change in a level of management for the user, the approval level requirement, the disabling of the one or more messages, or the disabling of the communication device, the one or more processors are configured to transmit an approval requirement signal to a review process.

\* \* \* \* \*